(12) United States Patent
Sugiura et al.

(10) Patent No.: US 7,429,411 B2
(45) Date of Patent: Sep. 30, 2008

(54) CHROMAN COMPOUND, LIQUID CRYSTAL COMPOSITION INCLUDING THE COMPOUND AND LIQUID CRYSTAL DISPLAY ELEMENT INCLUDING THE LIQUID CRYSTAL COMPOSITION

(75) Inventors: Teruyo Sugiura, Chiba (JP); Makoto Ushioda, Chiba (JP)

(73) Assignees: Chisso Petrochemical Corporation, Tokyo (JP); Chisso Corporation, Osaka (JP)

(*) Notice: Subject to any disclaimer, the term of this patent is extended or adjusted under 35 U.S.C. 154(b) by 224 days.

(21) Appl. No.: 10/873,275

(22) Filed: Jun. 23, 2004

(65) Prior Publication Data

US 2005/0247910 A1   Nov. 10, 2005

(30) Foreign Application Priority Data

Jun. 23, 2003 (JP) .............................. 2003-177671

(51) Int. Cl.
C09K 19/34 (2006.01)
C09K 19/32 (2006.01)
C09K 19/30 (2006.01)
C09K 19/12 (2006.01)
C09K 19/20 (2006.01)
C07D 311/04 (2006.01)
C07D 311/76 (2006.01)

(52) U.S. Cl. .............. 428/1.1; 252/299.01; 252/299.61; 252/299.62; 252/299.63; 252/299.66; 252/299.67; 549/398; 549/399; 549/406; 549/407; 549/408

(58) Field of Classification Search ............ 252/299.01, 252/299.61, 299.62, 299.63, 299.66, 299.67; 428/1.1; 549/403, 469, 398, 399, 406, 407, 549/408

See application file for complete search history.

(56) References Cited

U.S. PATENT DOCUMENTS

| 7,226,644 B2* | 6/2007 | Matsumoto et al. ........... 428/1.3 |
| 7,247,355 B2* | 7/2007 | Sagou et al. .................. 428/1.1 |
| 2006/0163536 A1* | 7/2006 | Matsumoto et al. .... 252/299.61 |

FOREIGN PATENT DOCUMENTS

| EP | 4579 | * 10/1979 |
| JP | 5-25158 | 2/1993 |
| JP | 6-256337 | 9/1994 |
| JP | 6-256339 | 9/1994 |
| JP | 2001-316347 | 11/2001 |
| WO | WO 2005000995 | * 1/2005 |

OTHER PUBLICATIONS

CAPLUS 1980: 128727.*
Bianca F. Bonini, et al., "Chiral Mesogens Containing the 2,3-Dihydrobenzopyran Nucleus", Molecular Crystals and Liquid Crystals, 290, pp. 49-65, 1996.
Bianca F. Bonini et al., "Synthesis and Properties of a New Family of Chiral Mesogens Containing the 2-3-Dihydrobenzopyran Nucleus", Journal of Organic Chemistry, 59 (20), pp. 5930-5936, 1994.
Sadao Takehara et al., "New Chiral Dopants for FLC Materials: Optically Active Cyclic Ehters", Ferroelectrics, 148 (1-4), pp. 195-202, 1993.
von Urs H. Lauk et al., "Synthesis and Liquid-Crystal Properties of 2,6-Disubstituted Napthalene Derivatives", Helvetica Chimica Acta, 68(5), pp. 1406-1426, 1985.

* cited by examiner

Primary Examiner—Shean C Wu
(74) Attorney, Agent, or Firm—Wenderoth, Lind & Ponack, L.L.P.

(57) ABSTRACT

The compound (1) according to the invention has general solid-state properties necessary for a compound, stability against heat, light and the like, a suitable optical anisotropy, a suitable dielectric anisotropy, and excellent compatibility with other liquid crystalline compounds. The liquid crystal composition according to the invention contains at least one compound represented by formula (1). The liquid crystal display element according to the invention contains the composition. The compound (1) is represented by formula (1):

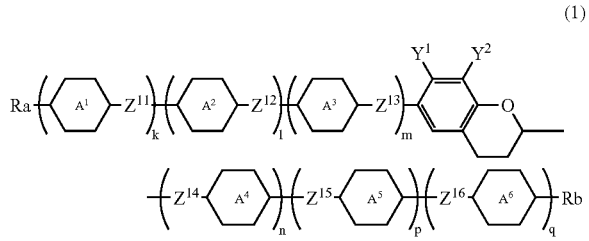

wherein Ra, Rb, $A^1$, $A^2$, $A^3$, $A^4$, $A^5$, $A^6$, $Z^{11}$, $Z^{12}$, $Z^{13}$, $Z^{14}$, $Z^{15}$, $Z^{16}$, $Y^1$, $Y^2$, k, l, m, n, p and q are as defined in the specification.

38 Claims, No Drawings

CHROMAN COMPOUND, LIQUID CRYSTAL COMPOSITION INCLUDING THE COMPOUND AND LIQUID CRYSTAL DISPLAY ELEMENT INCLUDING THE LIQUID CRYSTAL COMPOSITION

BACKGROUND OF THE INVENTION

1. Field of the Invention

The present invention relates to a liquid crystalline compound, a liquid crystal composition and a liquid crystal display element. More specifically, the invention relates to a chroman compound, a liquid crystal composition including the same and having a nematic phase, and a liquid crystal display element including the composition.

2. Related Art

On a liquid crystal display element, classification based on an operating mode of liquid crystals includes PC (phase change), TN (twisted nematic), STN (super twisted nematic), BTN (Bistable twisted nematic), ECB (electrically controlled birefringence), OCB (optically compensated bend), IPS (in-plane switching), VA (vertical alignment) and so forth. Classification based on drive systems of elements is PM (passive matrix) and AM (active matrix). The PM (passive matrix) is classified into static, multiplex and the like. The AM is classified into TFT (thin film transistor), MIM (metal insulator metal) and so forth.

These elements contain a composition having suitable physical properties. In order to improve the properties of elements, it is preferable that the composition has suitable physical properties. General physical properties necessary for a compound as an ingredient of the composition are as follows:

(1) chemical stability and physical stability;
(2) a high clearing point. The clearing point is the transition temperature of a liquid crystalline phase—an isotropic phase;
(3) a low lower limit temperature of a liquid crystalline phase. The liquid crystalline phase means a nematic phase, smectic phase and the like;
(4) a small viscosity;
(5) a suitable optical anisotropy;
(6) a suitable dielectric anisotropy. A composition having a large dielectric anisotropy often has a large viscosity; and
(7) a large specific resistance.

A composition is prepared by mixing many compounds. Accordingly, a compound is preferably sufficiently miscible with other compounds. The element may sometimes be used at a temperature below the freezing point, therefore compounds having good compatibility at low temperatures are preferable. A compound having a high clearing point or a low lower limit temperature of a liquid crystalline phase contributes to a wide temperature range of a nematic phase of the composition. A preferable composition has a small viscosity and an optical anisotropy suitable for the mode of the element. A large dielectric anisotropy of a compound contributes to a low threshold voltage of the composition. Such composition serves for obtaining an element having such properties as usability in a wide range of temperature, a short response time, a large contrast ratio, a low drive voltage, a low power consumption and a large voltage retention.

Conventionally, as a chroman compound, following compound (15) is reported for example (refer to JP H6-256339 A). However, compound (15) does not have a sufficiently large dielectric anisotropy.

(15)

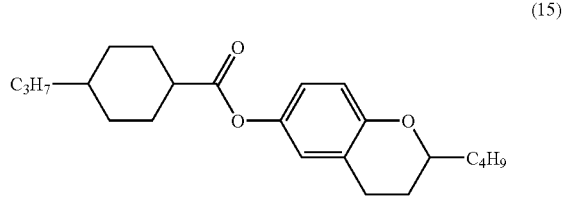

Conventional techniques are described in such documents as JP H6-256337 A/1994; JP H5-025158 A/1993; JP 2001-316347/2001; JP H6-256339 A/1994; Molecular Crystals and Liquid Crystals (1996), 290, 49-65; Journal of Organic Chemistry (1994), 59(20), 5930-5936; Ferroelectrics (1993), 148(1-4), 195-202 and Helvetica Chimica Acta (1985), 68(5), 1406-1426. However, a more preferable liquid crystalline compound, liquid crystal composition and liquid crystal display element are desired.

SUMMARY OF THE INVENTION

The present invention has a compound represented by formula (1).

(1)

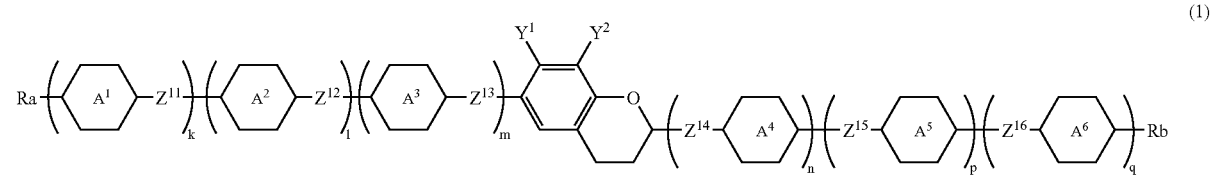

wherein Ra and Rb independently are hydrogen, alkyl having 1 to 20 carbons, halogen, —CN, —C≡C—CN, —NCO, or —NCS, any —CH$_2$— in the alkyl may be replaced with —O—, —S—, —CO— or —SiH$_2$—, any —(CH$_2$)$_2$— may be replaced by —CH═CH— or —C≡C—, and any of hydrogen may be replaced by halogen; rings A$^1$, A$^2$, A$^3$, A$^4$, A$^5$ and A$^6$ independently are 1,4-cyclohexylene, 1,4-phenylene, decahydronaphthalene-2,6-diyl, 1,2,3,4-tetrahydronaphthalene-2,6-diyl, or naphthalene-2,6-diyl and, any —CH$_2$— in these rings may be replaced by —O—, —S—, —CO— or —SiH$_2$—, any —(CH$_2$)$_2$— may be replaced by —CH═CH—, any —CH═ in 1,4-phenylene may be replaced by —N═, and any hydrogen in these rings may be replaced by halogen, —CF$_3$, —CHF$_2$, —CH$_2$F, —OCF$_3$, —OCHF$_2$, or —OCH$_2$F; Z$^{11}$, Z$^{12}$, Z$^{13}$, Z$^{14}$, Z$^{15}$ and Z$^{16}$ independently are a single bond or alkylene having 1 to 4 carbons and, any —CH$_2$— in the alkylene may be replaced by —O—, —S—, —CO—, or —SiH$_2$—, any —(CH$_2$)$_2$— may be replaced by —CH=CH— or —C≡C—, and any hydrogen may be replaced by halogen; $Y^1$ and $Y^2$ independently are hydrogen, halogen, —CN, —CF$_3$, —CHF$_2$, —CH$_2$F, —OCF$_3$, —OCHF$_2$, or —OCH$_2$F, and $Y^1$ and $Y^2$ are not hydrogen at the same time; k, l, m, n, p and q independently are 0 or 1, and the sum of k, l, m, n, p and q is 1, 2 or 3.

The present invention also has a composition including the compound described above.

The present invention also has a liquid crystal display element including the liquid crystal composition described above.

DETAILED DESCRIPTION

A first object of the present invention is to provide a liquid crystalline compound having general physical properties necessary for the compound, a small viscosity, a suitable optical anisotropy, a suitable dielectric anisotropy, and an excellent compatibility with other liquid crystalline compounds.

A second object of the invention is to provide a liquid crystal composition including the compound and having a wide temperature range of a nematic phase, a small viscosity, a suitable optical anisotropy and a low threshold voltage.

A third object of the invention is to provide a liquid crystal display element including the composition and having a short response time, a small power consumption, a large contrast and a high voltage retention.

The present invention has the following. Preferable examples of terminal groups, rings and bonding groups in compound (1) will also be described.

1. A compound represented by formula (1).

"any" means "at least one which is randomly selected". When stability of the compound is taken into consideration, CH$_3$—O—CH$_2$—O— where oxygen and oxygen are not adjacent is preferred over CH$_3$—O—O—CH$_2$— where oxygen and oxygen are adjacent.

Examples of Ra and Rb are hydrogen, alkyl, alkoxy, alkoxyalkyl, alkoxyalkoxy, alkylthio, alkylthioalkoxy, acyl, acylalkyl, acyloxy, acyloxyalkyl, alkoxycarbonyl, alkoxycarbonylalkyl, alkenyl, alkenyloxy, alkenyloxyalkyl, alkoxyalkenyl, alkynyl, alkynyloxy, silaalkyl and disilaalkyl. These groups in which at least one hydrogen is replaced by halogen are also preferable. A preferable halogen is fluorine and chlorine. More preferable halogen is fluorine. In these groups, a straight chain is preferable to a branched chain. Even when Ra and Rb are branched groups, they are preferable when they are optically active. Preferable Ra and Rb is also fluorine or chlorine, —CN or —C≡C—CN.

Preferable Ra and Rb are alkyl, alkoxy, alkoxyalkyl, alkenyl, polyfluoroalkyl, polyfluoroalkoxy, fluorine and —CN. More preferable Ra and Rb are alkyl, alkoxy, alkoxyalkyl, alkenyl, —OCF$_3$, —OCHF$_2$, —CF$_3$, —CHF$_2$, —CH$_2$F, —OCF$_2$CHF$_2$, —OCF$_2$CHFCF$_3$, fluorine, chlorine, and —CN. Most preferable Ra and Rb are alkyl, alkoxy, alkoxyalkyl, alkenyl, —OCF$_3$, —OCHF$_2$, —CF$_3$, —CHF$_2$, —CH$_2$F, —OCF$_2$CHF$_2$, —OCF$_2$CHFCF$_3$, fluorine and —CN.

Preferable configuration of —CH=CH— in the alkenyl depends on the position of a double bond. In the alkenyl having a double bond at an odd position such as —CH=CHCH$_3$, —CH=CHC$_2$H$_5$, —CH=CHC$_3$H$_7$, (1)

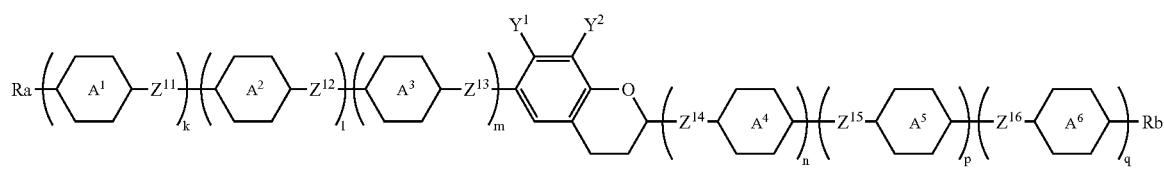

wherein Ra and Rb independently are hydrogen, alkyl having 1 to 20 carbons, halogen, —CN, —C≡C—CN, —NCO, or —NCS and, any —CH$_2$— in the alkyl may be replaced with —O—, —S—, —CO— or —SiH$_2$—, any —(CH$_2$)$_2$— may be replaced by —CH=CH— or —C≡C—, and any of hydrogen may be replaced by halogen; rings $A^1$, $A^2$, $A^3$, $A^4$, $A^5$ and $A^6$ independently are 1,4-cyclohexylene, 1,4-phenylene, decahydronaphthalene-2,6-diyl, 1,2,3,4-tetrahydronaphthalene-2,6-diyl, or naphthalene-2,6-diyl and, any —CH$_2$— in these rings may be replaced by —O—, —S—, —CO— or —SiH$_2$—, any —(CH$_2$)$_2$— may be replaced by —CH=CH—, any —CH= in 1,4-phenylene may be replaced by —N=, and any hydrogen in these rings may be replaced by halogen, —CF$_3$, —CHF$_2$, —CH$_2$F, —OCF$_3$, —OCHF$_2$, or —OCH$_2$F.

The meaning of the phrase "any —CH$_2$— in the alkyl may be replaced with —O— and so forth, any —(CH$_2$)$_2$— may be replaced by —CH=CH— and so forth" may be illustrated by an example. A part of the group where any —CH$_2$— in CH$_3$(CH$_2$)$_3$— is replaced with —O— or any —(CH$_2$)$_2$— is replaced —O— or an arbitrary —(CH$_2$)$_2$— with —CH=CH— are CH$_3$(CH$_2$)$_2$O—, CH$_3$—O—(CH$_2$)$_2$—, CH$_3$—O—CH$_2$—O—, H$_2$C=CH—(CH$_2$)$_2$—, CH$_3$—CH=CH—CH$_2$—, CH$_3$—CH=CH—O—. Thus, the term —CH=CHC$_4$H$_9$, —C$_2$H$_4$CH=CHCH$_3$ and —C$_2$H$_4$CH=CHC$_2$H$_5$, the trans-configuration is preferable. In the alkenyl having a double bond at an even position such as —CH$_2$CH=CHCH$_3$, —CH$_2$CH=CHC$_2$H$_5$ and —CH$_2$CH=CHC$_3$H$_7$, the cis-configuration is preferable.

Specific example of the alkyl is —CH$_3$, —C$_2$H$_5$, —C$_3$H$_7$, —C$_4$H$_9$, —C$_5$H$_{10}$, —C$_6$H$_{13}$, —C$_7$H$_{15}$ or —C$_8$H$_{17}$. Specific example of the alkoxy is —OCH$_3$, —OC$_2$H$_5$, —OC$_3$H$_7$, —OC$_4$H$_9$, —OC$_5$H$_{10}$, —OC$_6$H$_{13}$ or —OC$_7$H$_{15}$. Specific example of the alkoxyalkyl is —CH$_2$OCH$_3$, —CH$_2$OC$_2$H$_5$, —CH$_2$OC$_3$H$_7$, —(CH$_2$)$_2$OCH$_3$, —(CH$_2$)$_2$OC$_2$H$_5$, —(CH$_2$)$_2$OC$_3$H$_7$, —(CH$_2$)$_3$OCH$_3$, —(CH$_2$)$_4$OCH$_3$ or —(CH$_2$)$_5$OCH$_3$.

Specific example of the alkenyl is —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$CH=CH$_2$, —CH=CHC$_3$H$_7$, —CH$_2$CH=CHC$_2$H$_5$, —(CH$_2$)$_2$CH=CHCH$_3$ or —(CH$_2$)$_3$CH=CH$_2$. Specific example of the alkenyloxy is —OCH$_2$CH=CH$_2$, —OCH$_2$CH=CHCH$_3$ or —OCH$_2$CH=CHC$_2$H$_5$. Specific example of the alkynyl is —C≡C—CCH$_3$ or —C≡CC$_3$H$_7$.

Specific example of the alkyl in which at least one hydrogen has been replaced by halogen is —CH$_2$F, —CHF$_2$, —CF$_3$, —(CH$_2$)$_2$F, —CF$_2$CH$_2$F, —CF$_2$CHF$_2$, —CH$_2$CF$_3$, —CF$_2$CF$_3$, —(CH$_2$)$_3$F, —(CF$_2$)$_2$CF$_3$, —CF$_2$CHFCF$_3$ or —CHFCF$_2$CF$_3$. Specific example of the alkoxy in which at least one hydrogen has been replaced by halogen is —OCF$_3$, —OCHF$_2$, —OCH$_2$F, —OCF$_2$CF$_3$, —OCF$_2$CHF$_2$, —OCF$_2$CH$_2$F, —OCF$_2$CF$_2$CF$_3$, —OCF$_2$CHFCF$_3$ or —OCHFCF$_2$CF$_3$. Specific example of the alkenyl in which at least one hydrogen has been replaced by halogen is —CH=CHF, —CH=CF$_2$, —CF=CHF, —CH=CHCH$_2$F, —CH=CHCF$_3$ or —(CH$_2$)$_2$CH=CF$_2$.

Specific examples of preferable Ra or Rb independently are —CH$_3$, —C$_2$H$_5$, —C$_3$H$_7$, —C$_4$H$_9$, —C$_5$H$_{10}$, —OCH$_3$, —OC$_2$H$_5$, —OC$_3$H$_7$, —OC$_4$H$_9$, —OC$_5$H$_{10}$, —CH$_2$OCH$_3$, —(CH$_2$)$_2$OCH$_3$, —(CH$_2$)$_3$OCH$_3$, —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$CH=CH$_2$, —CH=CHC$_3$H$_7$, —CH$_2$CH=CHC$_2$H$_5$, —(CH$_2$)$_2$CH=CHCH$_3$, —(C$_{H2}$)$_3$CH=CH$_2$, —OCH$_2$CH=CH$_2$, —OCH$_2$CH=CHCH$_3$, —OCH$_2$CH=CHC$_2$H$_5$, —CF$_3$, —CHF$_2$, —CH$_2$F, —OCF$_3$, —OCHF$_2$, —OCH$_2$F, —OCF$_2$CF$_3$, —OCF$_2$CHF$_2$, —OCF$_2$CH$_2$F, —OCF$_2$CF$_2$CF$_3$, —OCF$_2$CHFCF$_3$, —OCHFCF$_2$CF$_3$, fluorine, chlorine, and —CN.

Specific examples of more preferable Ra or Rb independently are —CH$_3$, —C$_2$H$_5$, —C$_3$H$_7$, —C$_4$H$_9$, —C$_5$H$_{10}$, —OCH$_3$, —OC$_2$H$_5$, —OC$_3$H$_7$, —OC$_4$H$_9$, —OC$_5$H$_{10}$, —CH$_2$OCH$_3$, —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$CH=CH$_2$, —CH=CHC$_3$H$_7$, —CH$_2$CH=CHC$_2$H$_5$, —(CH$_2$)$_2$CH=CHCH$_3$, —(CH$_2$)$_3$CH=CH$_2$, —CF$_3$, —CHF$_2$, —CH$_2$F, —OCF$_3$, —OCHF$_2$, —OCH$_2$F, —OCF$_2$CF$_3$, —OCF$_2$CHF$_2$, —OCF$_2$CH$_2$F, —OCF$_2$CF$_2$CF$_3$, —OCF$_2$CHFCF$_3$, —OCHFCF$_2$CF$_3$, fluorine, chlorine, and —CN.

Specific examples of most preferable Ra or Rb independently are —CH$_3$, —C$_2$H$_5$, —C$_3$H$_7$, —C$_4$H$_9$, —C$_5$H$_{10}$, —OCH$_3$, —OC$_2$H$_5$, —OC$_3$H$_7$, —CH$_2$OCH$_3$, —CH=CH$_2$, —CH=CHCH$_3$, —(CH$_2$)$_2$CH=CH$_2$, —(CH$_2$)$_2$CH=CHCH$_3$, —OCF$_3$, —OCHF$_2$, —CF$_3$, —CHF$_2$, —CH$_2$F, —OCF$_2$CHF$_2$, —OCF$_2$CHFCF$_3$, fluorine and —CN.

Rings A$^1$, A$^2$, A$^3$, A$^4$, A$^5$ and A$^6$ independently are 1,4-cyclohexylene, 1,4-phenylene, decahydronaphthalene-2,6-diyl, 1,2,3,4-tetrahydronaphthalene-2,6-diyl, or naphthalene-2,6-diyl. Any —CH$_2$— in these rings may be replaced by —O—, —S—, —CO—, or —SiH$_2$—, and any —(CH$_2$)$_2$— may be replaced by —CH=CH—, any —CH= in 1,4-phenylene may be replaced by —N=, and any hydrogen in these ring may be replaced by halogen, —CF$_3$, —CHF$_2$, —CH$_2$F, —OCF$_3$, —OCHF$_2$, or —OCH$_2$F.

Preferable examples of the ring to which "any —CH$_2$— in these rings may be replaced by —O—, —S—, —CO—, or —SiH$_2$— and any —(CH$_2$)$_2$— may be replaced by —CH=CH—, any —CH= in 1,4-phenylene may be replaced by —N=" are applied following rings (15-1) to (15-53). More preferable examples are rings (15-1), (15-2), (15-3), (15-4), (15-15), (15-23), (15-31), (15-32), (15-33), (15-40), (15-43) and (15-48).

(15-1)

(15-2) 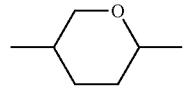

(15-3) 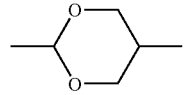

(15-4) 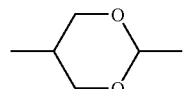

(15-5) 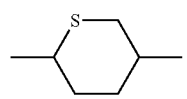

(15-6) 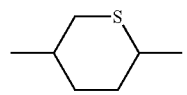

(15-7) 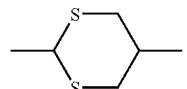

(15-8) 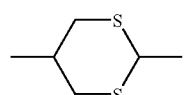

(15-9) 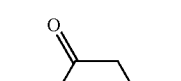

(15-10) 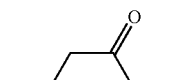

(15-11) 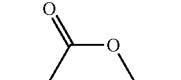

(15-12) 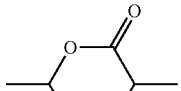

(15-13) 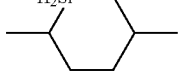

(15-14) 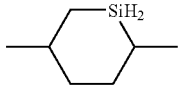

-continued
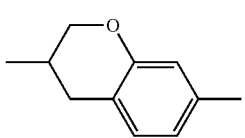 (15-15)
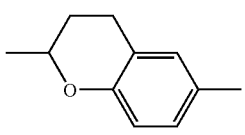 (15-16)
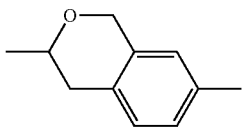 (15-17)
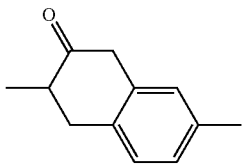 (15-18)
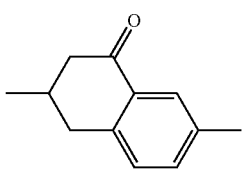 (15-19)
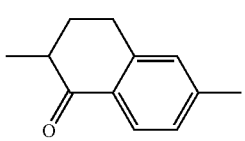 (15-20)
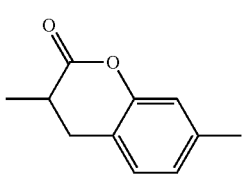 (15-21)
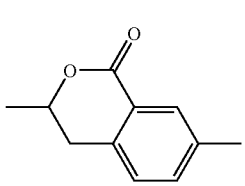 (15-22)
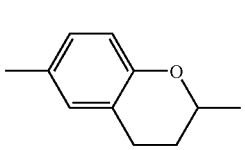 (15-23)
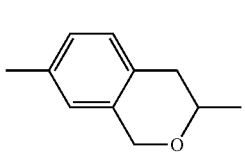 (15-24)
-continued
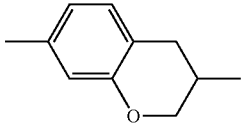 (15-25)
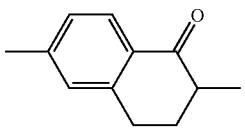 (15-26)
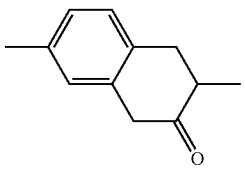 (15-27)
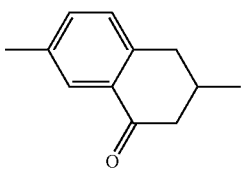 (15-28)
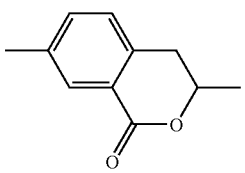 (15-29)
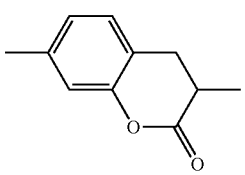 (15-30)
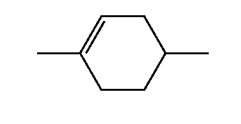 (15-31)
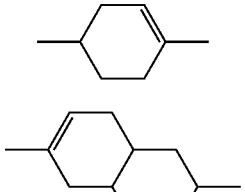 (15-32)
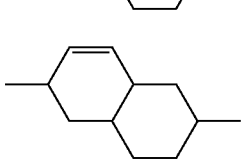 (15-33)
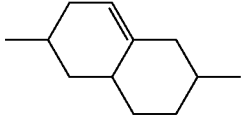 (15-34)
(15-35)

-continued
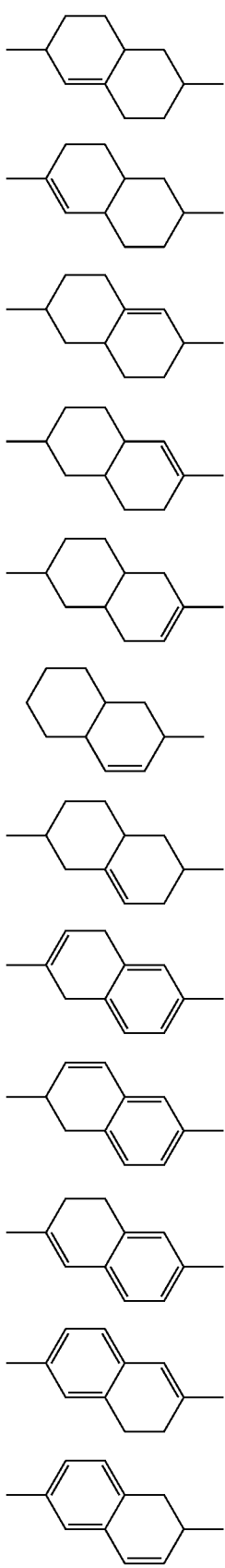
(15-36)
(15-37)
(15-38)
(15-39)
(15-40)
(15-41)
(15-42)
(15-43)
(15-44)
(15-45)
(15-46)
(15-47)
-continued
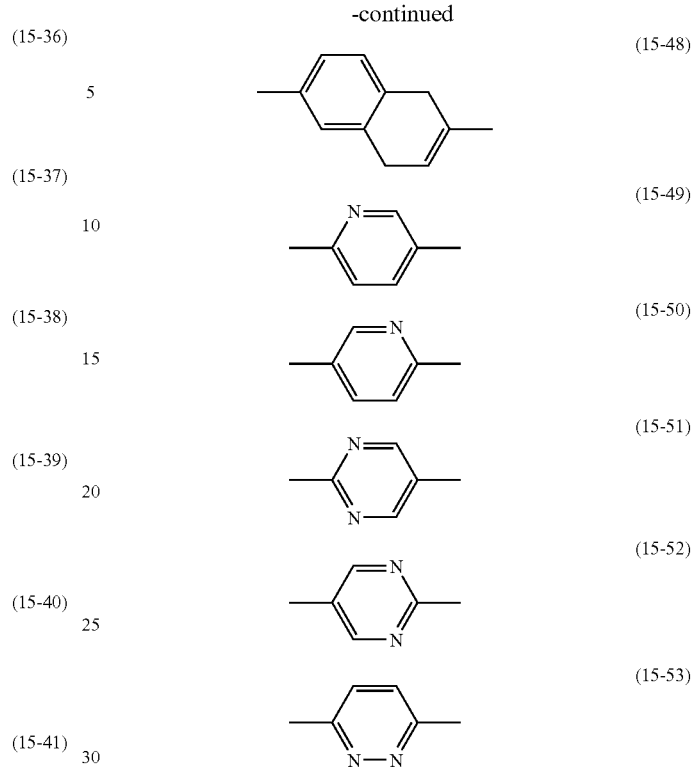
(15-48)
(15-49)
(15-50)
(15-51)
(15-52)
(15-53)
Preferable examples of "any hydrogen in these rings may be replaced by halogen, —$CF_3$, —$CHF_2$, —$CH_2F$, —$OCF_3$, —$OCHF_2$ or —$OCH_2F$" are following rings (16-1) to (16-71). More preferable examples are rings (16-1), (16-2), (16-3), (16-4), (16-6), (16-10), (16-11), (16-12), (16-13), (16-14), (16-15), (16-54), (16-55), (16-56), (16-57), (16-58) and (16-59).
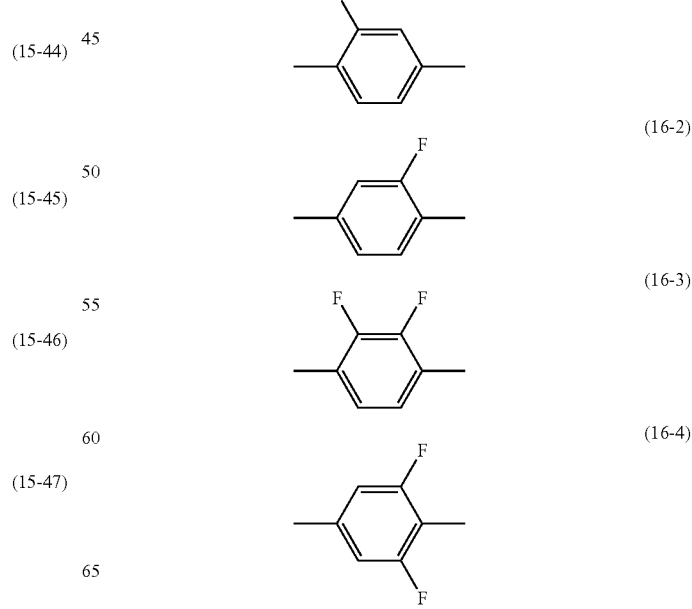
(16-1)
(16-2)
(16-3)
(16-4)

-continued
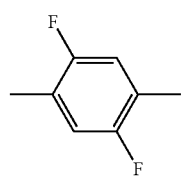 (16-5)
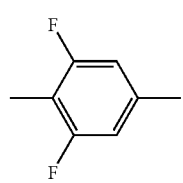 (16-6)
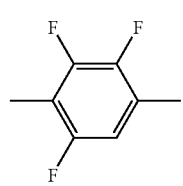 (16-7)
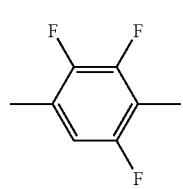 (16-8)
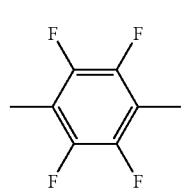 (16-9)
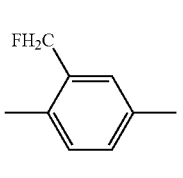 (16-10)
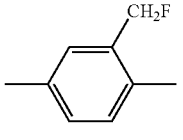 (16-11)
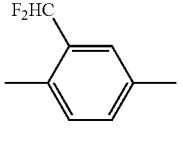 (16-12)
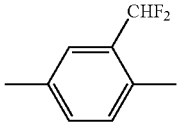 (16-13)
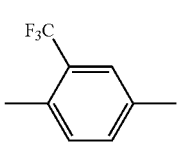 (16-14)
-continued
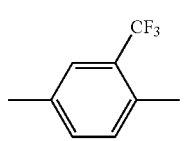 (16-15)
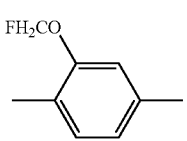 (16-16)
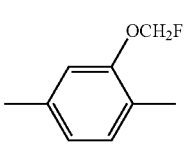 (16-17)
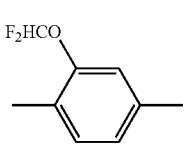 (16-18)
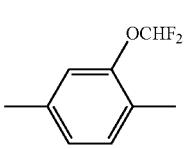 (16-19)
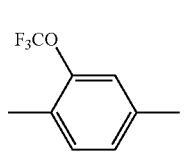 (16-20)
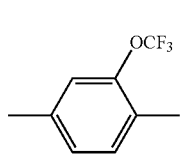 (16-21)
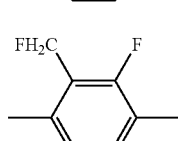 (16-22)
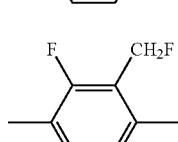 (16-23)
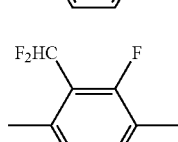 (16-24)
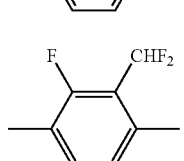 (16-25)

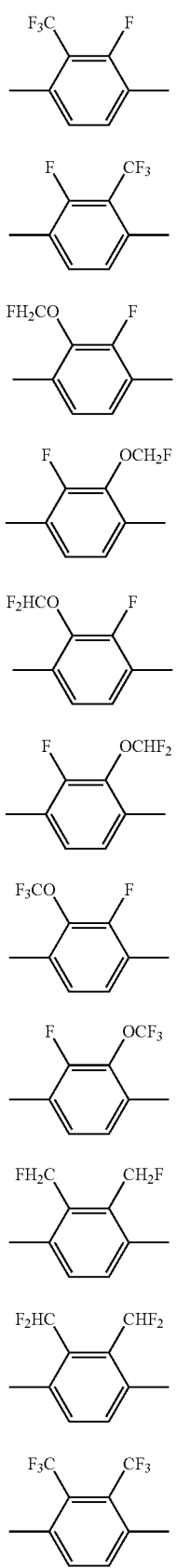
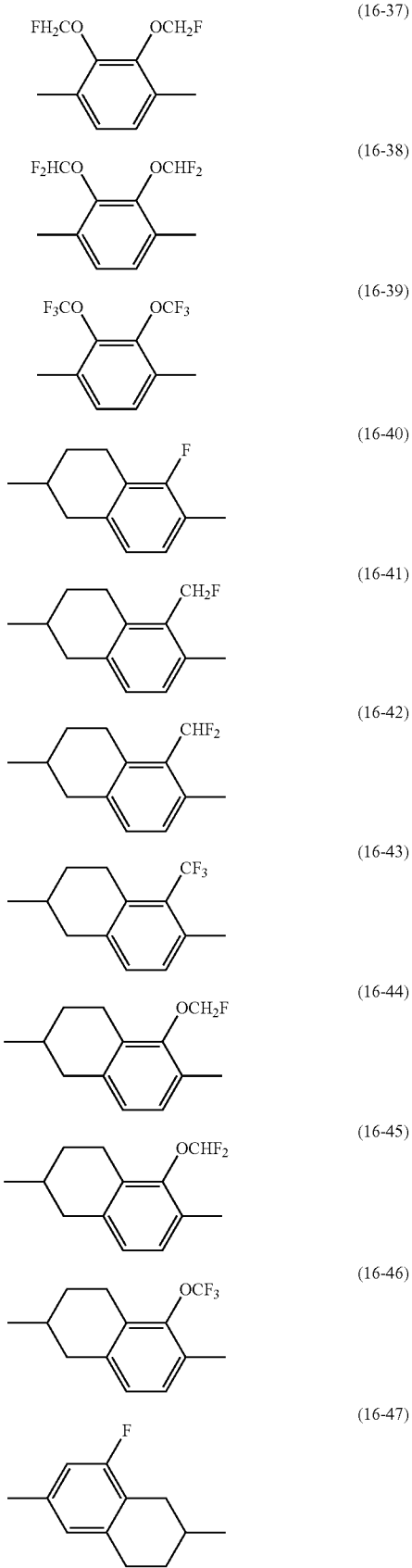

-continued
(16-48)
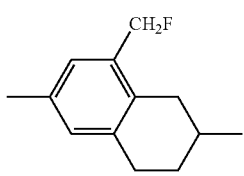
(16-49)
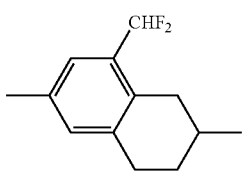
(16-50)
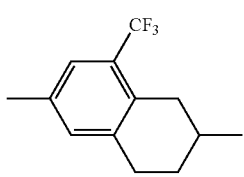
(16-51)
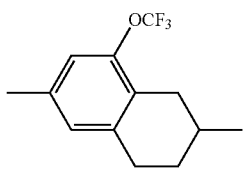
(16-52)
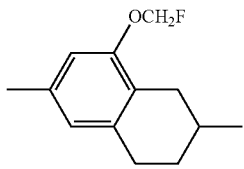
(16-53)
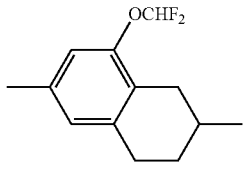
(16-54)
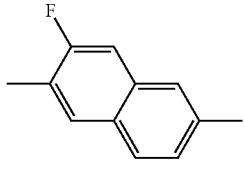
(16-55)
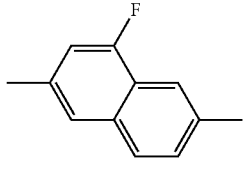
(16-56)
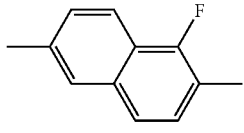
-continued
(16-57)
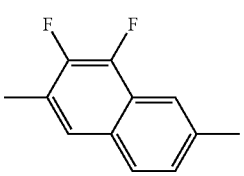
(16-58)
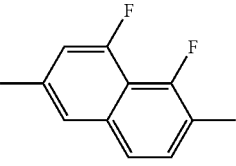
(16-59)
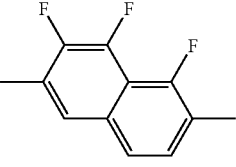
(16-60)
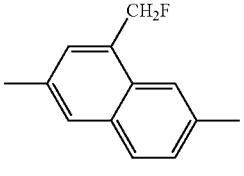
(16-61)
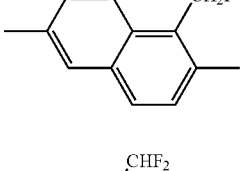
(16-62)
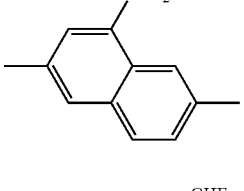
(16-63)
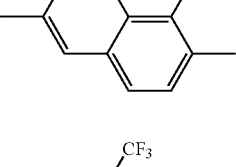
(16-64)
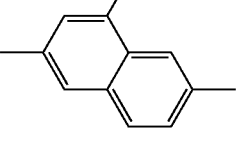
(16-65)
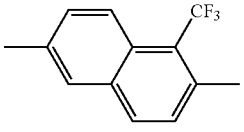

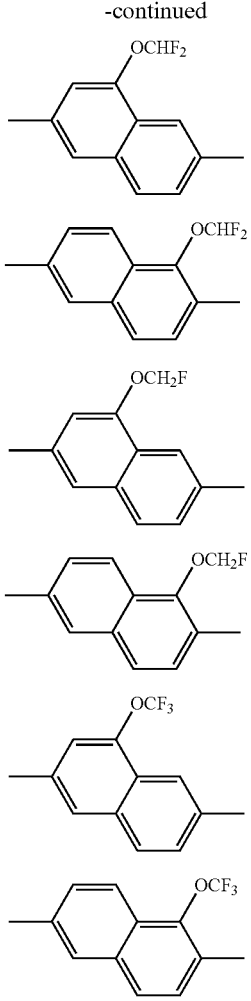

A preferable ring $A^1$, $A^2$, $A^3$, $A^4$, $A^5$, or $A^6$ is 1,4-cyclohexylene, 1,4-cyclohexenylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyridine-2,5-diyl, 3-fluoropyridine-2,5-diyl, pyrimidine-2,5-diyl, pyridadine-2,5-diyl, decahydronaphthalene-2,6-diyl, 1,2,3,4-tetrahydronaphthalene-2,6-diyl and naphthalene-2,6-diyl. As for 1,4-cyclohexylene and 1,3-dioxane-2,5-diyl, trans-configuration is preferable to cis-configuration. Since 1,3-dioxane-2,5-diyl is the same as 4,6-dioxane-2,5-diyl in structure, the latter is not exemplified. The rule can be applicable to the relation between 2-fluoro-1,4-phenylene and 2,6-difluoro-1,4-phenylene and so forth.

A more preferable ring $A^1$, $A^2$, $A^3$, $A^4$, $A^5$ or $A^6$ is 1,4-cyclohexylene, 1,3-dioxane-2,5-diyl, 1,4-phenylene, 2-flouro-1,4-phenylene, 2,3-difluoro-1,4-phenylene, 2,5-difluoro-1,4-phenylene, 2,6-difluoro-1,4-phenylene, pyridine-2,5-diyl, 3-fluoropyridine-2,5-diyl, pyrimidine-2,5-diyl and pyridadine-2,5-diyl.

Most preferable ring $A^1$, $A^2$, $A^3$, $A^4$, $A^5$ or $A^6$ is 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl and pyrimidine-2,5-diyl.

$Z^{11}$, $Z^{12}$, $Z^{13}$, $Z^{14}$, $Z^{15}$ and $Z^{16}$ independently are a single bond or alkylene having 1 to 4 carbons. Any —CH$_2$— in the alkylene may be replaced by —O—, —S—, —CO— or —SiH$_2$—, any —(CH$_2$)$_2$— may be replaced by —CH=CH— or —C≡C—, and any hydrogen may be replaced by halogen.

Preferable examples of $Z^{11}$, $Z^{12}$, $Z^{13}$, $Z^{14}$, $Z^{15}$ and $Z^{16}$ are a single bond, —(CH$_2$)$_2$—, —COO—, —OCO—, —CH$_2$O—, —OCH$_2$—, —CF$_2$O—, —OCF$_2$—, —CH=CH—, —CH=CF—, —CF=CH—, —CF=CF—, —C≡C—, —CH$_2$CO—, —COCH$_2$—, —CH$_2$SiH$_2$—, —SiH$_2$CH$_2$—, —(CH$_2$)$_4$—, —(CH$_2$)$_2$COO—, —OCO(CH$_2$)$_2$—, —(CH$_2$)$_2$CF$_2$O—, —OCF$_2$(CH$_2$)$_2$—, —CH=CH—CH$_2$O— and —OCH$_2$—CH=CH—. As for configuration regarding a double bond in bonding groups such as —CH=CH—, —CF=CF—, —CH=CH—CH$_2$O— and —OCH$_2$—CH=CH—, trans-configuration is preferable to cis-configuration.

More preferable examples of $Z^{11}$, $Z^{12}$, $Z^{13}$, $Z^{14}$, $Z^{15}$ and $Z^{16}$ are a single bond, —(CH$_2$)$_2$—, —COO—, —OCO—, —CH$_2$O—, —OCH$_2$—, —CF$_2$O—, —OCF$_2$—, —CH=CH—, —CF=CF—, —C≡C— and —(CH$_2$)$_4$—. Most preferable $Z^{11}$, $Z^{12}$, $Z^{13}$, $Z^{14}$, $Z^{15}$ and $Z^{16}$ are a single bond, —(CH$_2$)$_2$—, —COO—, —OCO—, —CH$_2$O—, —OCH$_2$—, —CF$_2$O—, —OCF$_2$—, —CH=CH— and —C≡C—.

$Y^1$ and $Y^2$ independently are hydrogen, halogen, —CN, —CF$_3$, —CHF$_2$, —CH$_2$F, —OCF$_3$, —OCHF$_2$, or —OCH$_2$F, and $Y^1$ and $Y^2$ are not hydrogen at the same time. A preferable halogen is fluorine and chlorine. A most preferable halogen is fluorine. Preferable $Y^1$ and $Y^2$ independently are hydrogen, fluorine, chlorine, —CN, —CF$_3$, —CHF$_2$, —CH$_2$F, —OCF$_3$, —OCHF$_2$, or —OCH$_2$F. More preferable $Y^1$ and $Y^2$ independently are hydrogen, fluorine, chlorine, —CN, —CF$_3$, —CHF$_2$, —CH$_2$F, or —OCF$_3$. Most preferable $Y^1$ and $Y^2$ independently are hydrogen or fluorine.

Preferable examples of chroman-2,6-diyl having $Y^1$ and $Y^2$ are rings (17-1) to (17-43). More preferable examples are rings (17-1), (17-2), (17-3), (17-16), (17-17), (17-18), (17-21), (17-22), (17-23), (17-26), (17-27) and (17-28). Most preferable examples are rings (17-1), (17-2) and (17-3).

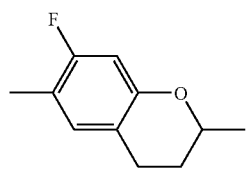
(17-1)

(17-2)

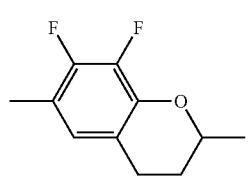
(17-3)

-continued
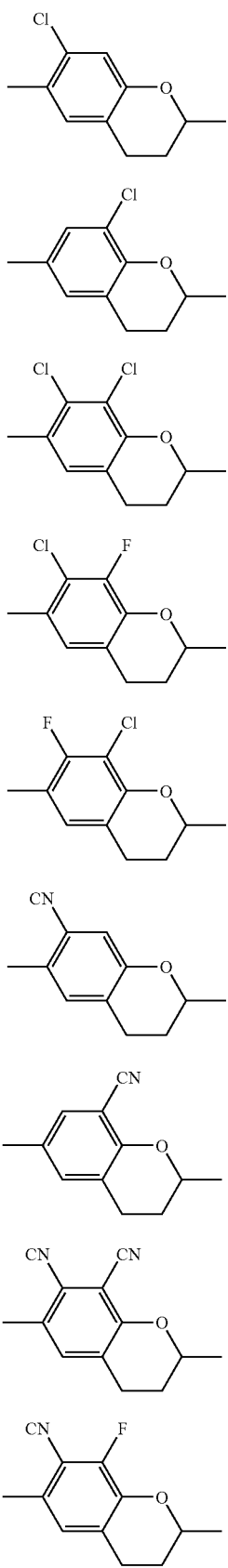
(17-4)
(17-5)
(17-6)
(17-7)
(17-8)
(17-9)
(17-10)
(17-11)
(17-12)
-continued
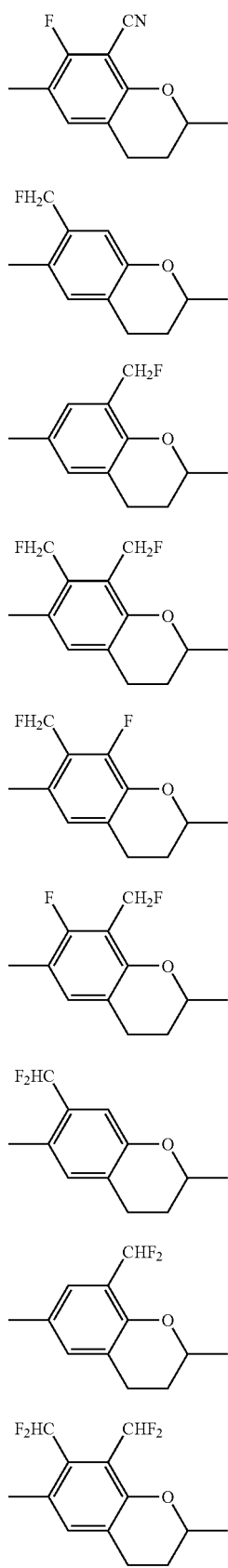
(17-13)
(17-14)
(17-15)
(17-16)
(17-17)
(17-18)
(17-19)
(17-20)
(17-21)

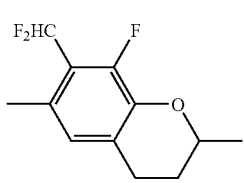 (17-22)
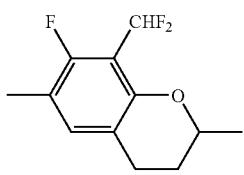 (17-23)
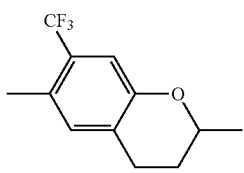 (17-24)
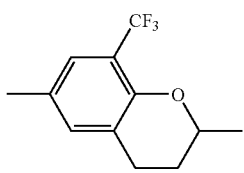 (17-25)
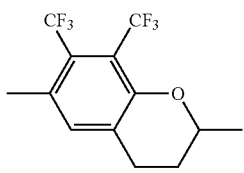 (17-26)
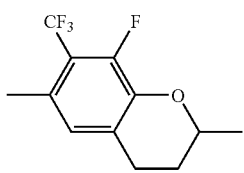 (17-27)
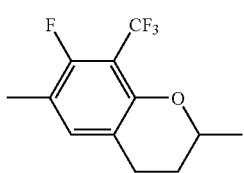 (17-28)
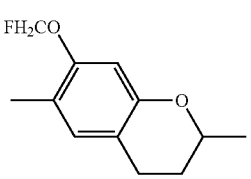 (17-29)
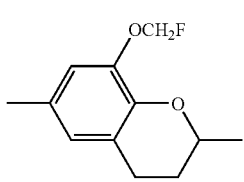 (17-30)
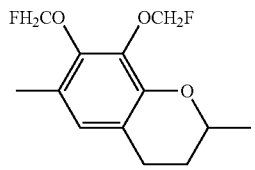 (17-31)
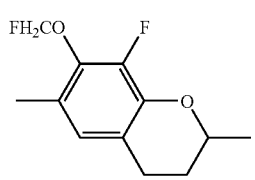 (17-32)
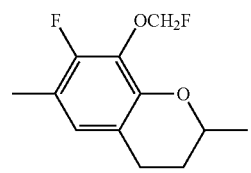 (17-33)
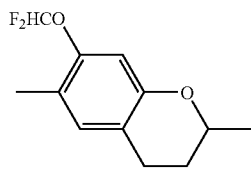 (17-34)
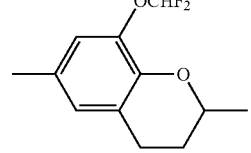 (17-35)
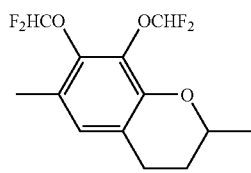 (17-36)
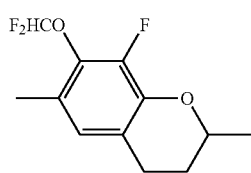 (17-37)
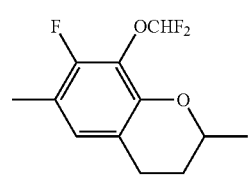 (17-38)
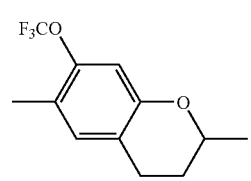 (17-39)

-continued

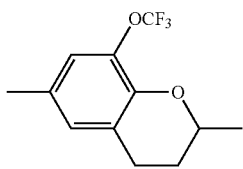 (17-40)

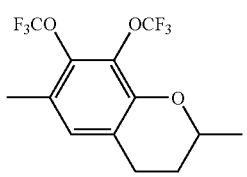 (17-41)

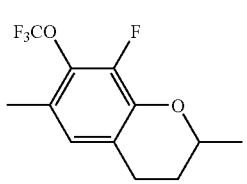 (17-42)

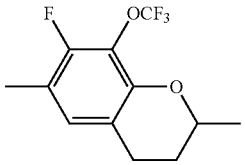 (17-43)

k, l, m, n, p and q independently are 0 or 1, and the sum of k, l, m, n, p and q is 1, 2 or 3. Since there are no large differences in physical properties of compounds, compound (1) may contain isotopes such as $^2H$ (deuterium) and $^{13}C$ by an amount more than natural abundance ratio.

2. The compound described in item 1 wherein, in formula (1), one of $Y^1$ and $Y^2$ is hydrogen and the other is halogen, —CN, —CF$_3$, —CHF$_2$, —CH$_2$F, —OCF$_3$, —OCHF$_2$, or —OCH$_2$F.

3. The compound described in item 1 wherein, in formula (1), $Y^1$ and $Y^2$ independently are halogen, —CN, —CF$_3$, —CHF$_2$, —CH$_2$F, —OCF$_3$, —OCHF$_2$, or —OCH$_2$F.

4. The compound described in item 1 wherein, in formula (1), one of $Y^1$ and $Y^2$ is hydrogen and the other is fluorine.

5. The compound described in item 1 wherein, in formula (1), $Y^1$ and $Y^2$ are fluorine.

6. A compound represented by any one of formulas (1-1) to (1-9):

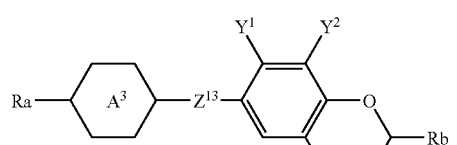

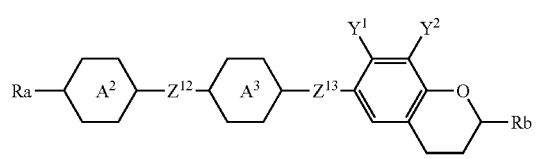

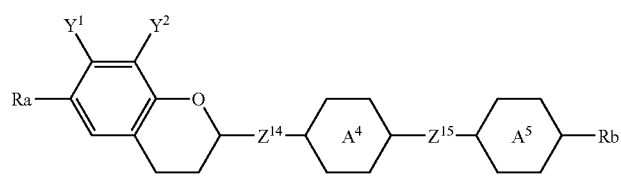

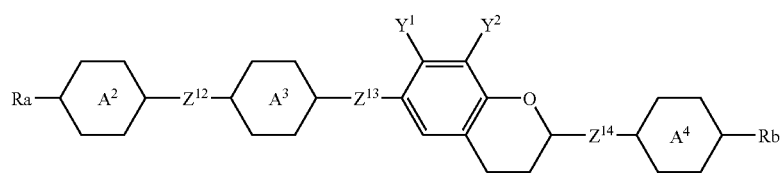

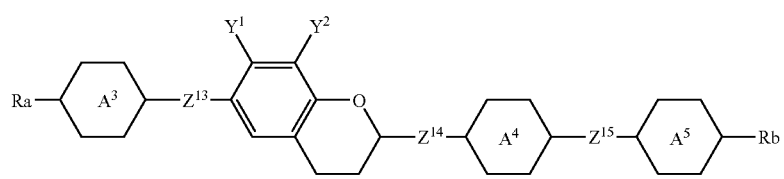

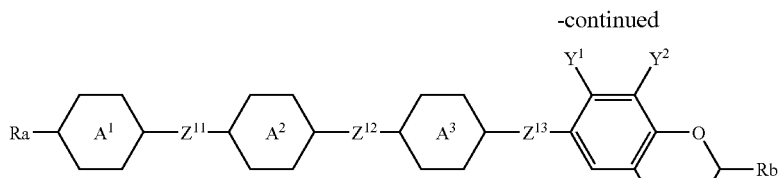

(1-8)

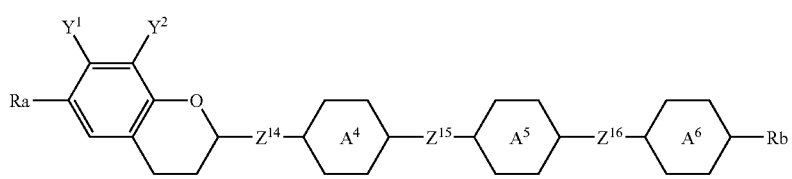

(1-9)

in formula (1-1) to formula (1-9), Ra and Rb independently are hydrogen, alkyl having 1 to 20 carbons, fluorine, chlorine, —CN, or —C≡C—CN, and any —CH$_2$— in the alkyl may be replaced by —O—, any —(CH$_2$)$_2$— may be replaced by —CH═CH— or —C≡C—, and any hydrogen may be replaced by fluorine; rings A$^1$, A$^2$, A$^3$, A$^4$, A$^5$ and A$^6$ independently are 1,4-cyclohexylene, 1,4-cyclohexenylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyridine-2,5-diyl, 3-fluoropyridine-2,5-diyl, pyrimidine-2,5-diyl, pyridadine-2,5-diyl, decahydronaphthalene-2,6-diyl, 1,2,3,4-tetrahydronaphthalene-2,6-diyl or naphthalene-2,6-diyl; Z$^{11}$, Z$^{12}$, Z$^{13}$, Z$^{14}$, Z$^{15}$ and Z$^{16}$ independently are a single bond, —(CH$_2$)$_2$—, —COO—, —OCO—, —CH$_2$O—, —OCH$_2$—, —CF$_2$O—, —OCF$_2$—, —CH═CH—, —CF═CF—, —C≡C—, —CH$_2$CO—, —COCH$_2$—, —CH$_2$SiH$_2$—, —SiH$_2$CH$_2$—, —(CH$_2$)$_4$—, —(CH$_2$)$_2$COO—, —OCO(CH$_2$)$_2$—, —(CH$_2$)$_2$CF$_2$O—, —OCF$_2$(CH$_2$)$_2$—, —CH═CH—CH$_2$O— or —OCH$_2$—CH═CH—; and Y$^1$ and Y$^2$ independently are hydrogen, halogen, —CF$_3$, —CHF$_2$, —CH$_2$F, —OCF$_3$, —OCHF$_2$, or —OCH$_2$F, and Y$^1$ and Y$^2$ are not hydrogen at the same time.

7. The compound described in item 6 wherein, in formulas (1-1) to (1-9), Ra and Rb independently are alkyl, alkoxy, alkoxyalkyl, alkenyl, —OCF$_3$, —OCHF$_2$, —CF$_3$, —CHF$_2$, —CH$_2$F, —OCF$_2$CHF$_2$, —OCF$_2$CHFCF$_3$, fluorine, chlorine, or —CN; rings A$^1$, A$^2$, A$^3$, A$^4$, A$^5$ and A$^6$ independently are 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl or pyrimidine-2,5-diyl; Z$^{11}$, Z$^{12}$, Z$^{13}$, Z$^{14}$, Z$^{15}$ and Z$^{16}$ independently are a single bond, —(CH$_2$)$_2$—, —COO—, —OCO—, —CH$_2$O—, —OCH$_2$—, —CF$_2$O—, —OCF$_2$—, —CH═CH— or —C≡C—; and Y$^1$ and Y$^2$ independently are hydrogen or fluorine.

8. The compound described in item 6 or 7 wherein, in formulas (1-1) to (1-9), Ra and Rb independently are alkyl, alkoxy, alkoxyalkyl, or alkenyl.

9. The compound described in item 6 or 7 wherein, in formulas (1-1) to (1-9), one of Ra and Rb is alkyl, alkoxy, alkoxyalkyl or alkenyl, and the other is —OCF$_3$, —OCHF$_2$, —CF$_3$, —CHF$_2$, —CH$_2$F, —OCF$_2$CHF$_2$, or —OCF$_2$CHFCF$_3$.

10. The compound described in item 6 or 7 wherein, in formulas (1-1) to (1-9), one of Ra and Rb is alkyl, alkoxy, alkoxyalkyl, or alkenyl, and the other is fluorine or chlorine.

11. The compound described in item 6 or 7 wherein, in formulas (1-1) to (1-9), one of Ra and Rb are alkyl, alkoxy, alkoxyalkyl, or alkenyl, and the other is —CN.

12. The compound described in any one of items 6 to 11 wherein, in formulas (1-1) to (1-9), rings A$^1$, A$^2$, A$^3$, A$^4$, A$^5$ and A$^6$ independently are 1,4-cyclohexylene, 1,4-phenylene, 2-fluoro-1,4-phenylene, 2,3-difluoro-1,4-phenylene, 2,5-difluoro-1,4-phenylene or 2,6-difluoro-1,4-phenylene.

13. The compound described in any of items 6 to 11 wherein, in formulas (1-1) to (1-9), rings A$^1$, A$^2$, A$^3$, A$^4$, A$^5$ and A$^6$ independently are 1,4-cyclohexylene, 1,4-phenylene, 2-fluoro-1,4-phenylene, or 2,3-difluoro-1,4-phenylene.

14. The compound described in any one of items 6 to 11 wherein, in formulas (1-1) to (1-9), rings A$^1$, A$^2$, A$^3$, A$^4$, A$^5$ and A$^6$ independently are 1,4-cyclohexylene, 1,4-phenylene, 2-fluoro-1,4-phenylene, 2,5-difluoro-1,4-phenylene, or 2,6-difluoro-1,4-phenylene.

15. The compound described in any one of items 6 to 14 wherein, in formulas (1-1) to (1-9), Z$^{11}$, Z$^{12}$, Z$^{13}$, Z$^{14}$, Z$^{15}$ and Z$^{16}$ independently are a single bond or —(CH$_2$)$_2$—.

16. The compound described in item 6 or any one of items 8 to 15 wherein, in formulas (1-1) to (1-9), one of Y$^1$ and Y$^2$ is hydrogen, and the other is fluorine, —CF$_3$, —CHF$_2$, —CH$_2$F, —OCF$_3$, —OCHF$_2$, or —OCH$_2$F.

17. The compound described in any one of items 6 to 15 wherein, in formulas (1-1) to (1-9), one of Y$^1$ and Y$^2$ is hydrogen, and the other is fluorine.

18. The compound described in any one of item 6 and items 8 to 15 wherein, in formulas (1-1) to (1-9), Y$^1$ and Y$^2$ independently are halogen, —CF$_3$, —CHF$_2$, —CH$_2$F, —OCF$_3$, —OCHF$_2$, or —OCH$_2$F.

19. The compound described in any one of items 6 to 15 wherein, in formulas (1-1) to (1-9), Y$^1$ and Y$^2$ are fluorine.

20. The compound described in item 17 or 19 wherein, in formulas (1-1) to (1-5), Ra and Rb independently are alkyl or alkenyl.

21. The compound described in item 20 wherein, in formulas (1-1) to (1-5), rings A$^2$, A$^3$, A$^4$, and A$^5$ independently are 1,4-cyclohexylene or 1,4-phenylene.

22. The compound described in item 20 or 21 wherein, in formulas (1-1) to (1-5), Z$^{12}$, Z$^{13}$, Z$^{14}$ and Z$^{15}$ independently are a single bond or —(CH$_2$)$_2$—.

23. A liquid crystal composition containing at least one compound described in any one of items 1 to 22.

24. The liquid crystal composition described in item 23 further including at least one compound selected from the group consisting of compounds represented by formulas (2), (3) and (4):

(2)

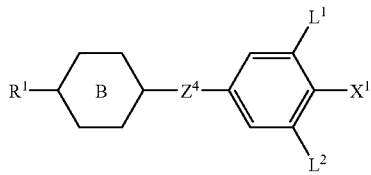

(3)

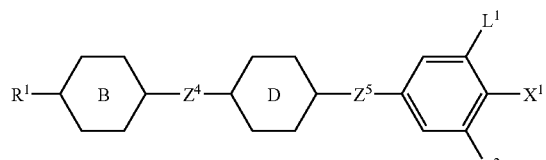

(4)

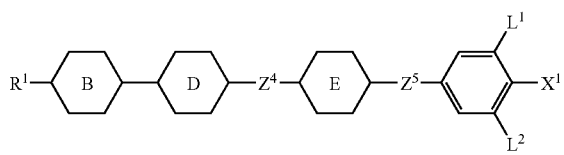

wherein $R^1$ is alkyl having 1 to 10 carbons, and any —$CH_2$— in the alkyl may be replaced by —O— or —CH=CH—, and any hydrogen may be replaced by fluorine; $X^1$ is fluorine, chlorine, —$OCF_3$, —$OCHF_2$, —$CF_3$, —$CHF_2$, —$CH_2F$, —$OCF_2CHF_2$ or —$OCF_2CHFCF_3$; rings B and D independently are 1,4-cyclohexylene, 1,3-dioxane-2,5-diyl or 1,4-phenylene in which any hydrogen may be replaced by fluorine, ring E is 1,4-cyclohexylene or 1,4-phenylene in which any hydrogen may be replaced by fluorine; $Z^4$ and $Z^5$ independently are —$(CH_2)_2$—, —$(CH_2)_4$—, —COO—, —$CF_2O$—, —$OCF_2$—, —CH=CH— or a single bond; and $L^1$ and $L^2$ independently are hydrogen or fluorine.

25. The liquid crystal composition described in item 23 further including at least one compound selected from the group consisting of compounds represented by formulas (5) and (6):

(5)

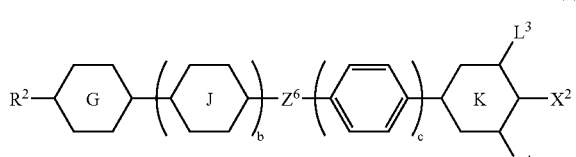

(6)

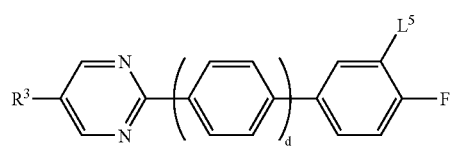

wherein $R^2$ and $R^3$ independently are alkyl having 1 to 10 carbons and, any —$CH_2$— in the alkyl may be replaced by —O— or —CH=CH—, and any hydrogen may be replaced by fluorine; $X^2$ is —CN or —C≡C—CN; ring G is 1,4-cyclohexylene, 1,4-phenylene, 1,3-dioxane-2,5-diyl or pyrimidine-2,5-diyl; ring J is 1,4-cyclohexylene, pyrimidine-2,5-diyl or 1,4-phenylene in which any hydrogen may be replaced by fluorine; ring K is 1,4-cyclohexylene or 1,4-phenylene; $Z^6$ is —$(CH_2)_2$—, —COO—, —$CF_2O$—, —$OCF_2$—, or a single bond; $L^3$, $L^4$ and $L^5$ independently are hydrogen or fluorine; and b, c and d independently are 0 or 1.

26. The liquid crystal composition described in item 23 further including at least one compound selected from the group consisting of compounds represented by formulas (7), (8), (9), (10) and (11):

(7)

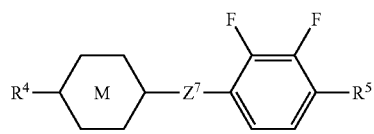

(8)

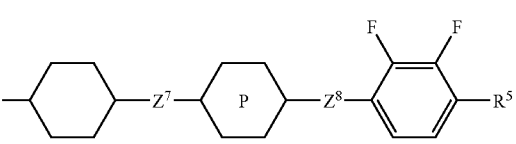

(9)

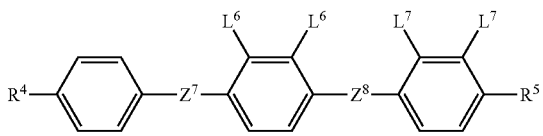

(10)

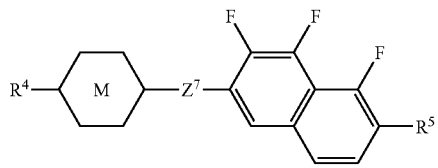

(11)

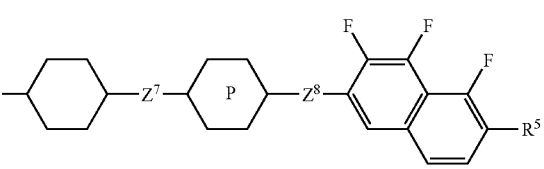

wherein $R^4$ is alkyl having 1 to 10 carbons, any —$CH_2$— in the alkyl may be replaced by —O— or —CH=CH—, and any hydrogen may be replaced by fluorine; $R^5$ is fluorine or alkyl having 1 to 10 carbons, any —$CH_2$— in the alkyl may be replaced by —O— or —CH=CH—, and any hydrogen may be replaced by fluorine; rings M and P independently are 1,4-cyclohexylene, 1,4-phenylene or decahydro-2,6-naphthylene; $Z^7$ and $Z^8$ is —$(CH_2)_2$—, —COO— or a single bond; and $L^6$ and $L^7$ independently are hydrogen or fluorine, wherein at least one of $L^6$ and $L^7$ is fluorine.

27. The liquid crystal composition described in item 23 further comprising at least one compound selected from the group consisting of compounds represented by formulas (12), (13) and (14):

(12)

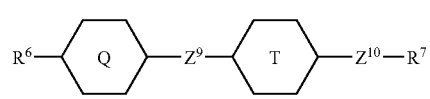

-continued

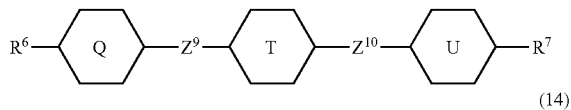

(13)

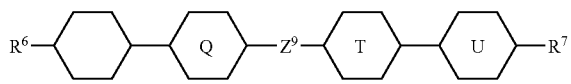

(14)

wherein $R^6$ and $R^7$ independently are alkyl having 1 to 10 carbons and, any —$CH_2$— in the alkyl may be replaced by —O— or —CH=CH—, and any hydrogen may be replaced by fluorine; rings Q, T and U independently are 1,4-cyclohexylene, pyrimidine-2,5-diyl or 1,4-phenylene in which any hydrogen may be replaced by fluorine; and $Z^9$ and $Z^{10}$ independently are —C≡C—, —COO—, —$(CH_2)_2$—, —CH=CH— or a single bond.

28. The liquid crystal composition described in item 24 further including at least one compound selected from the group consisting of compounds represented by formulas (5) and (6) respectively described in item 25.

29. The liquid crystal composition described in item 24 further including at least one compound selected from the group consisting of compounds represented by formulas (12), (13) and (14) respectively described in item 27.

30. The liquid crystal composition described in item 25 further including at least one compound selected from the group consisting of compounds represented by formulas (12), (13) and (14) respectively described in item 27.

31. The liquid crystal composition described in item 26 further including at least one compound selected from the group consisting of compounds represented by formulas (12), (13) and (14) respectively described in item 27.

32. The liquid crystal composition described in any one of items 23 to 31 further including at least one optically active compound.

33. A liquid crystal display element including the liquid crystal composition described in any one of items 23 to 32.

34. A compound represented by formula (41):

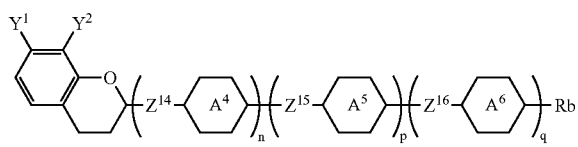

(41)

wherein Rb is hydrogen, alkyl having 1 to 20 carbons, halogen, —CN, —C≡C—CN, —NCO, or —NCS, any —$CH_2$— in the alkyl may be replaced by —O—, —S—, —CO—, or —$SiH_2$—, any —$(CH_2)_2$— may be replaced by —CH=CH— or —C≡C—, and any hydrogen may be replaced by halogen; rings $A^4$, $A^5$ and $A^6$ independently are 1,4-cyclohexylene, 1,4-phenylene, decahydronaphthalene-2,6-diyl, 1,2,3,4-tetrahydronaphthalene-2,6-diyl, or naphthalene-2,6-diyl, any —$CH_2$— in these rings may be replaced by —O—, —S—, —CO— or —$SiH_2$—, any —$(CH_2)_2$— may be replaced by —CH=CH—, any —CH= in 1,4-phenylene may be replaced by —N=, and any hydrogen in these rings may be replaced by halogen, —$CF_3$, —$CHF_2$, —$CH_2F$, —$OCF_3$, —$OCHF_2$, or —$OCH_2F$; $Z^{14}$, $Z^{15}$ and $Z^{16}$ independently are a single bond or alkylene having 1 to 4 carbons, any —$CH_2$— in the alkylene may be replaced by —O—, —S—, —CO—, or —$SiH_2$—, any —$(CH_2)_2$— may be replaced by —CH=CH— or —C≡C—, and any hydrogen may be replaced by halogen; $Y^1$ and $Y^2$ independently are hydrogen, halogen, —CN, —$CF_3$, —$CHF_2$, —$CH_2F$, —$OCF_3$, —$OCHF_2$, or —$OCH_2F$, and $Y^1$ and $Y^2$ are not hydrogen at the same time; n, p and q independently are 0 or 1, and the sum of n, p and q is 1, 2 or 3.

35. The compound described in item 34 wherein, in formula (41), one of $Y^1$ and $Y^2$ is hydrogen, and the other is halogen, —CN, —$CF_3$, —$CHF_2$, —$CH_2F$, —$OCF_3$, —$OCHF_2$, or —$OCH_2F$.

36. The compound described in item 34 wherein, in formula (41), each of $Y^1$ and $Y^2$ independently are halogen, —CN, —$CF_3$, —$CHF_2$, —$CH_2F$, —$OCF_3$, —$OCHF_2$, or —$OCH_2F$.

37. The compound described in item 34 wherein, in formula (41), one of $Y^1$ and $Y^2$ is hydrogen, and the other is fluorine.

38. The compound described in item 34 wherein, in formula (41), each of $Y^1$ and $Y^2$ is fluorine.

The compound according to the invention has general physical properties necessary for a compound, stability against heat, light and the like, a suitable optical anisotropy, a suitable dielectric anisotropy, and excellent compatibility with other liquid crystalline compounds. The liquid crystal composition according to the invention contains at least one of these compounds, and has a high upper limit temperature of a nematic phase, a low lower limit temperature of a nematic phase, a small viscosity, a suitable optical anisotropy and a low threshold voltage. The liquid crystal display element according to the invention contains the composition, and has a wide range of temperatures in which the element is usable, a short response time, a large contrast ratio and a low drive voltage.

DESCRIPTION OF THE PREFERRED EMBODIMENTS

Terms used in the specification and claims are defined as follows: A liquid crystalline compound is a collective term of compounds having a liquid crystalline phase such as a nematic phase and smectic phase, and compounds having no liquid crystalline phase but being useful as an ingredient for a liquid crystal composition. A liquid crystalline compound, a liquid crystal composition and a liquid crystal display element may sometimes be abbreviated to a compound, a composition and an element, respectively. A liquid crystal display element is a collective term of a liquid crystal display panel and a liquid crystal display module. The upper limit temperature of a nematic phase is a phase transition temperature of a nematic phase—isotropic phase, and is sometimes abbreviated to merely the upper limit temperature. The lower limit temperature of a nematic phase is sometimes abbreviated to merely the lower limit temperature. Compounds represented by formula (1) are sometimes abbreviated to compound (1). This abbreviation is sometimes applied to compounds represented by formula (2) and so on. In formulas (1) to (14), symbols $A^1$, B, D, E and so on enclosed by hexagon correspond to ring $A^1$, ring B, ring D, ring E and so on, respectively. An amount of a compound represented by a percentage is a weight percentage (weight %) based on the total weight of a composition. Hereinafter, the invention will be explained further.

Firstly, compound (1) according to the invention will further be described. A fused ring such as a chroman-ring or a naphthalene-ring is counted as a monocycle. Compound (1) is a bicyclic, tricyclic or tetracyclic compound having a chroman-ring. This compound is extremely stable physically and chemically under conditions in which an element is usually used and has good compatibility with other liquid crystalline compounds. A composition including the compound is stable under conditions in which an element is usually used. Even when this composition is stored at low temperatures, this compound does not precipitate as crystals (or a smectic phase). This compound has general physical properties necessary for a compound, a suitable optical anisotropy, and a suitable dielectric anisotropy.

Suitable selection of a terminal group, a ring and a bonding group of compound (1) makes it possible to adjust arbitrarily physical properties such as an optical anisotropy and dielectric anisotropy. Hereinafter, effect of kinds of terminal groups Ra and Rb, rings $A^1$, $A^2$, $A^3$, $A^4$, $A^5$ and $A^6$, and bonding groups $Z^{11}$, $Z^{12}$, $Z^{13}$, $Z^{14}$, $Z^{15}$ and $Z^{16}$ on physical properties of compound (1) will be explained.

Compound (1) is classified into three classes, i.e., those with a positive and large dielectric anisotropy, those with a negative and large one, and those with a small one. "A large" and "a small" are relative expressions. "A small" falls in a range from about −1 to about +2. A compound having a positive and large, or negative and large dielectric anisotropy is an ingredient for reducing a threshold voltage of a composition. A compound having a small dielectric anisotropy is an ingredient for adjusting physical properties of a composition such as viscosity. When Ra is hydrogen, alkyl, alkoxy, or the like, and Rb is —OCF$_3$, —OCHF$_2$, fluorine, —CN, or the like, the dielectric anisotropy of the compound is positive and large. When Ra and Rb are hydrogen, alkyl, alkoxy or the like, and $Y^1$ and $Y^2$ are fluorine, —CF$_3$ or the like, the dielectric anisotropy of the compound is negative and large. When Ra and Rb are hydrogen, alkyl, alkoxy, or the like, and $Y^1$ and $Y^2$ are not fluorine, —CF$_3$ or the like, the dielectric anisotropy of the compound is small.

When Ra or Rb is in a straight chain, a temperature range of a liquid crystalline phase is wide and viscosity thereof is small. When Ra or Rb is in a branched chain, compatibility with other liquid crystalline compounds is good. A compound in which Ra or Rb is an optically active group is useful as a chiral dopant. By adding the compound to a composition, generation of a reverse twisted domain in an element can be prevented. A compound in which Ra or Rb is not an optically active group is useful as an ingredient of a composition. When Ra or Rb is alkenyl, a preferable configuration depends on location of a double bond. An alkenyl compound with a preferable configuration has a high upper limit temperature or a wide temperature range of a liquid crystalline phase. There are detailed descriptions in Mol. Cryst. Liq. Cryst., 1985, 131, 109 and Mol. Cryst. Liq. Cryst., 1985, 131, 327.

When rings $A^1$, $A^2$, $A^3$, $A^4$, $A^5$ or $A^6$ is 1,4-phenylene, pyridine-2,5-diyl or 1,3-dioxane-2,5-diyl in which any hydrogen has been replaced by halogen, the dielectric anisotropy is large. When ring $A^1$ or $A^2$ is 1,4-phenylene, pyridine-2,5-diyl, pyrimidine-2,5-diyl or pyridadine-3,6-diyl in which any hydrogen may be replaced by halogen, an optical anisotropy is large. When rings $A^1$, $A^2$, $A^3$, $A^4$, $A^5$ and $A^6$ are 1,4-cyclohexylene, 1,4-cyclohexenylene or 1,3-dioxane-2,5-diyl, the optical anisotropy is small.

When at least two of the rings are 1,4-cyclohexylene, the upper limit temperature is high, the optical anisotropy is small, and the viscosity is small. When at least one of the rings is 1,4-phenylene, the optical anisotropy is relatively large, and an orientational order parameter is large. When at least two of the rings are 1,4-phenylene, the optical anisotropy is large, the temperature range of the liquid crystalline phase is wide, and the upper limit temperature is high.

When the bonding group $Z^{11}$, $Z^{12}$, $Z^{13}$, $Z^{14}$, $Z^{15}$ or $Z^{16}$ is a single bond, —(CH$_2$)$_2$—, —CH$_2$O—, —CF$_2$O—, —OCF$_2$—, —CH=CH—, —CF=CF— or —(CH$_2$)$_4$—, the viscosity is small. When the bonding group is a single bond, —(CH$_2$)$_2$—, —OCF$_2$—, —CF$_2$O— or —CH=CH—, the viscosity is smaller. When the bonding group is —CH=CH—, the temperature range of the liquid crystalline phase is wide, and an elastic constant ratio K$_{33}$/K$_{11}$ (K$_{33}$: bend elastic constant, K$_{11}$: spray elastic constant) is large. When a bonding group is —C≡C—, the optical anisotropy is large.

When compound (1) has two or three rings, the viscosity is small. When compound (1) has three or four rings, the upper limit temperature is high. As described above, suitable selection of the terminal group, kinds of the ring and the bonding group, and number of the ring makes it possible to obtain a compound having intended physical properties. Accordingly, compound (1) is useful as an ingredient of a composition used for an element such as PC, TN, STN, ECB, OCB, IPS, VA.

Preferable examples of compound (1) include compounds (1-1) to (1-9) described in item 2 of the invention. More specific examples are following compounds (1-1-1) to (1-9-3). The meaning of symbols Ra, Rb, $A^1$, $A^2$, $A^3$, $A^4$, $A^5$, $A^6$, $Z^{11}$, $Z^{12}$, $Z^{13}$, $Z^{14}$, $Z^{15}$ and $Z^{16}$ in these compounds is the same as that described in item 2. $Y^1$ and $Y^2$ are halogen, —CF$_3$, —CHF$_2$, —CH$_2$F, —OCF$_3$, —OCHF$_2$ or —OCH$_2$F. $Y^1$ and $Y^2$ may be same with or different from each other. A preferable halogen includes a fluorine and chlorine. More preferable halogen is fluorine.

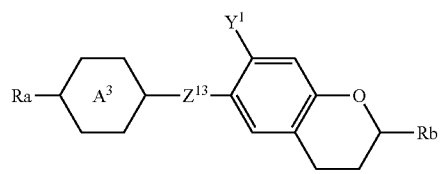

(1-1-1)

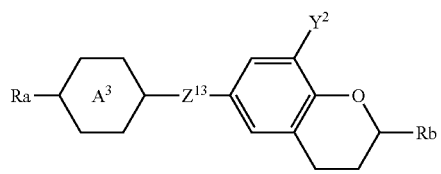

(1-1-2)

-continued
(1-1-3)
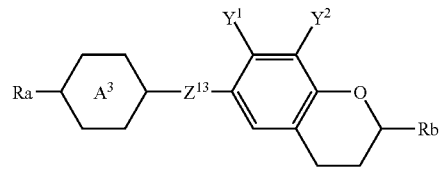
(1-2-1)
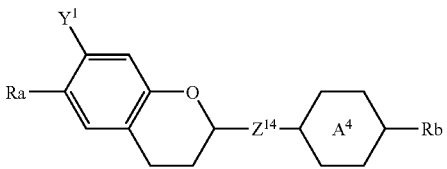
(1-2-2)
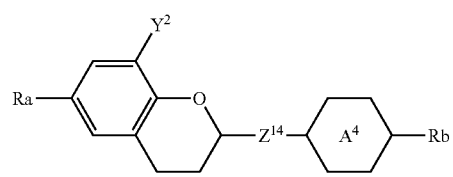
(1-2-3)
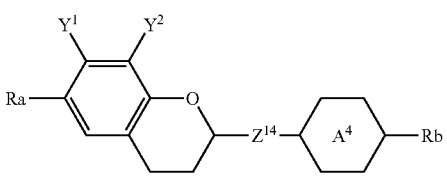
(1-3-1)
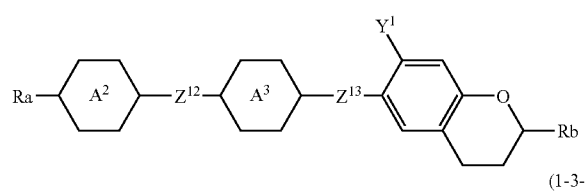
(1-3-2)
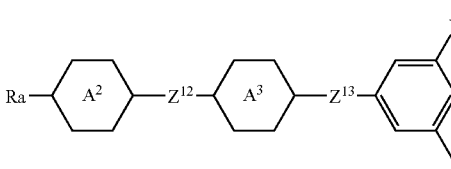
(1-3-3)
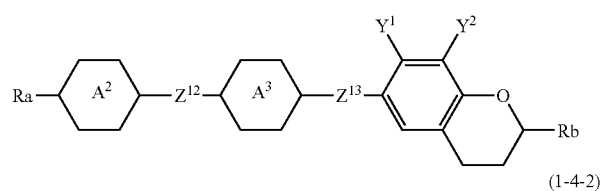
(1-4-1)
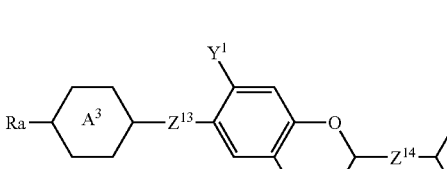
(1-4-2)
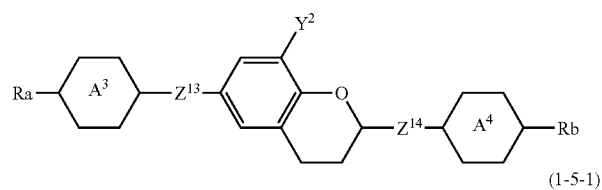
(1-4-3)
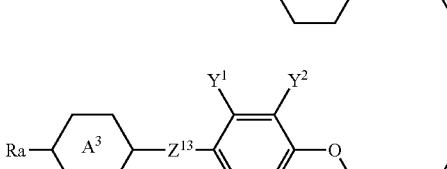
(1-5-1)
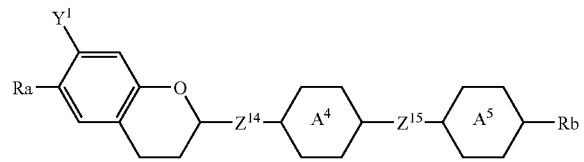
(1-5-2)
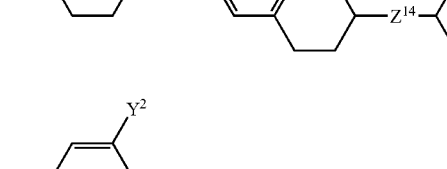
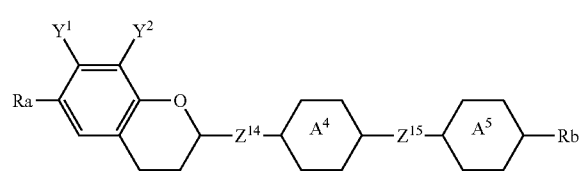
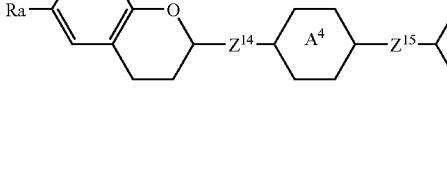
(1-5-3)
(1-6-1)
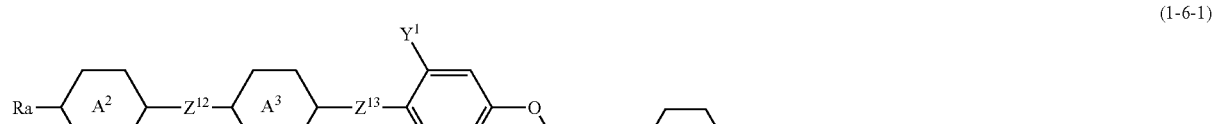
(1-6-2)
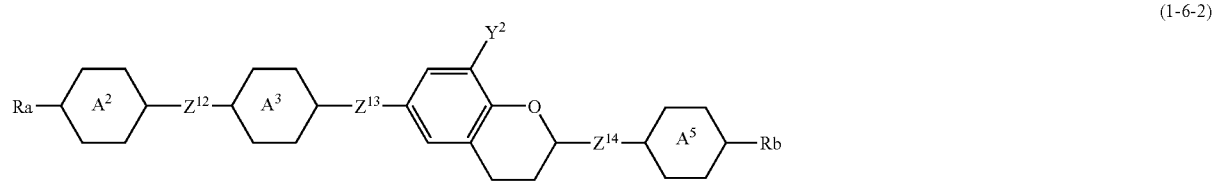

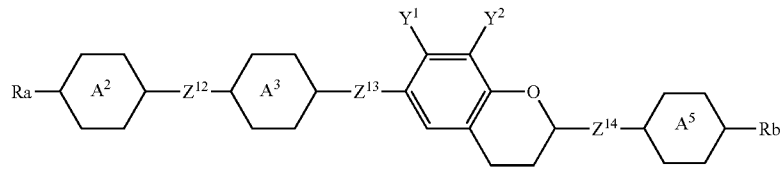
(1-6-3)
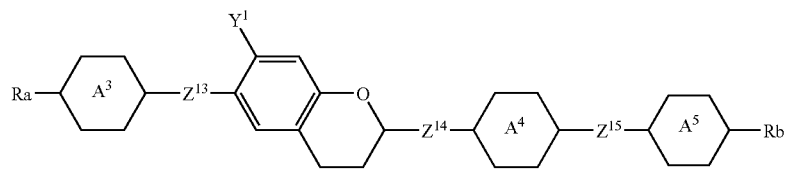
(1-7-1)
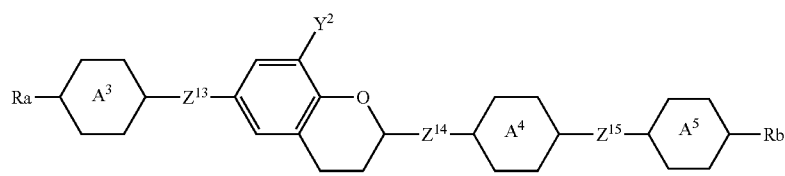
(1-7-2)
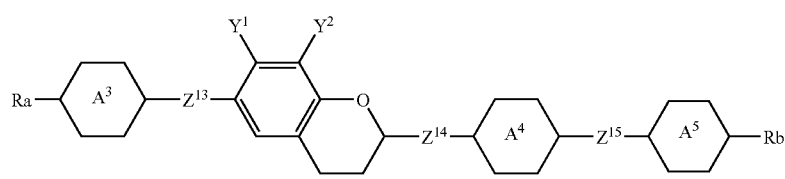
(1-7-3)
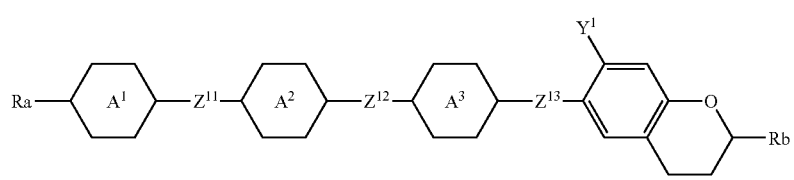
(1-8-1)
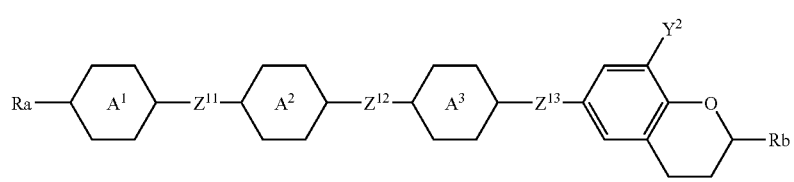
(1-8-2)
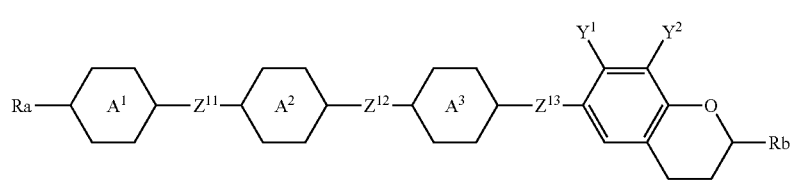
(1-8-3)
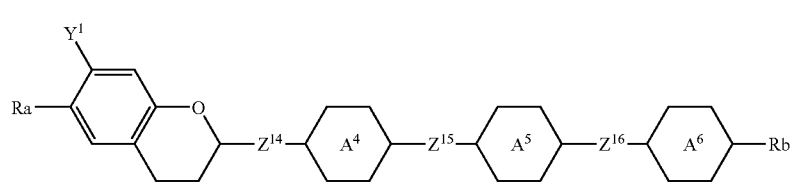
(1-9-1)
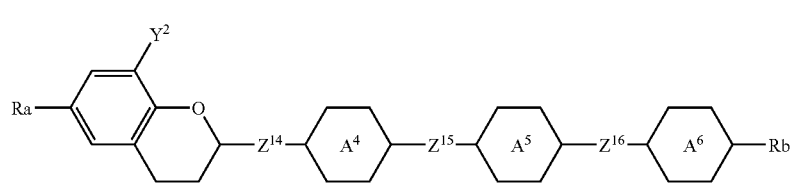
(1-9-2)

(1-9-3)

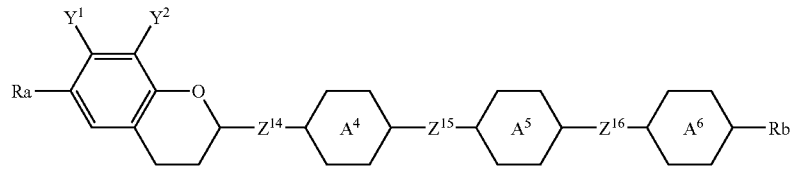

Compound (1) is synthesized by combining suitably techniques in synthetic organic chemistry. Methods of introducing an intended terminal group, ring and bonding group into a starting material are described in books such as Organic Syntheses, John Wiley & Sons, Inc; Organic Reactions, John Wiley & Sons, Inc; Comprehensive Organic Synthesis, Pergamon Press; and Shin Jikken Kagaku Koza (New Course of Experimental Chemistry, Maruzen).

In relation to an example of the method for generating a bonding group $Z^{11}$, $Z^{12}$, $Z^{13}$, $Z^{14}$, $Z^{15}$ or $Z^{16}$, a scheme is firstly shown and then the scheme will be explained in items (I) to (XI). In this scheme, $MSG^1$ or $MSG^2$ is a monovalent organic group having at least one ring. Plural $MSG^1$ s (or $MSG^2$ s) used in the scheme may be same with or different from one another. Compounds (1A) to (1K) correspond to compound (1).

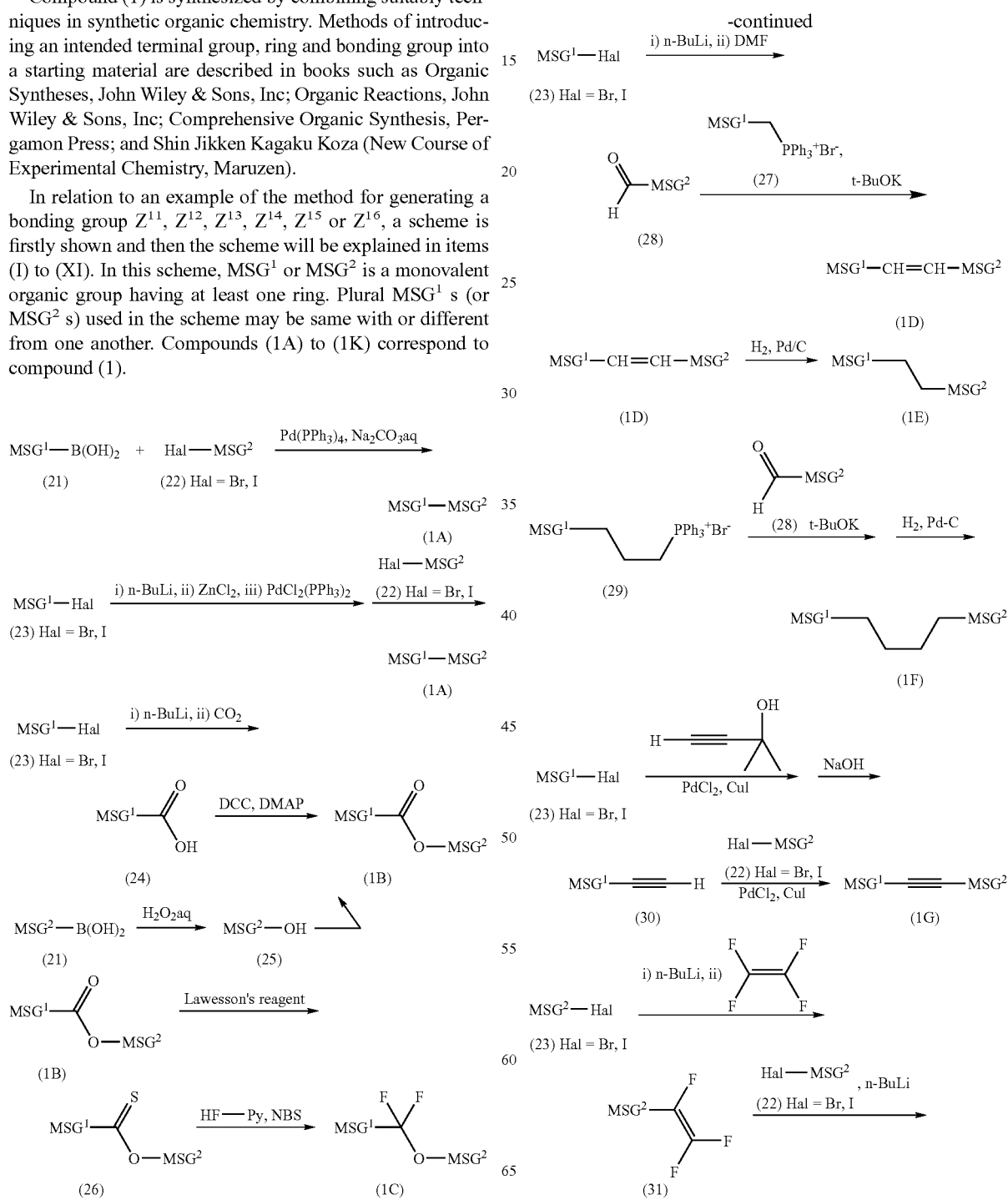

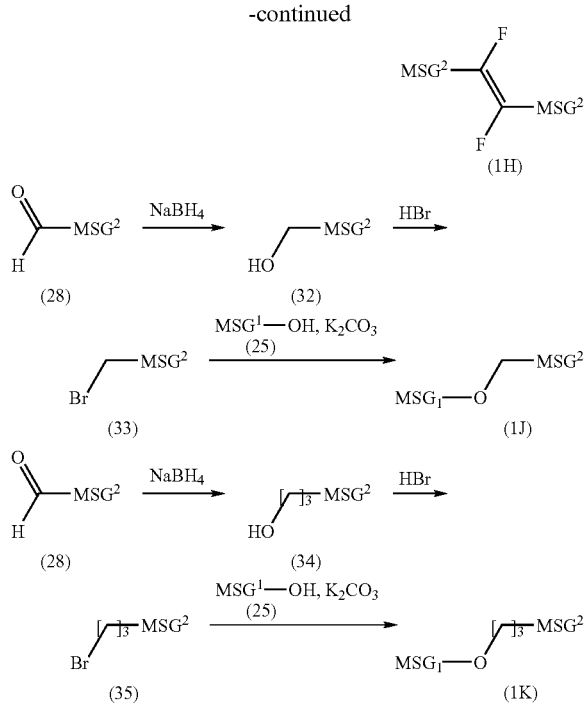

(I) Preparation of a Single Bond

Aryl-boric acid (21) and compound (22) synthesized by a publicly known method are reacted in the presence of an aqueous solution of carbonate and a catalyst such as tetrakis (triphenylphosphine)palladium to synthesize compound (1A). The compound (1A) can also be synthesized by reacting compound (23) synthesized by a publicly known method with n-butyllithium, then zinc chloride, and subsequently compound (22) in the presence of a catalyst such as dichlorobis (triphenylphosphine)palladium.

(II) Preparation of —COO— and —OCO—

Compound (23) is reacted with n-butyllithium and then carbon dioxide to obtain carboxylic acid (24). Compound (24) and phenol (25) synthesized by a publicly known method are dehydrated in the presence of DDC (1,3-dicyclohexylcarbodiimide) and DMAP (4-dimethylaminopyridine) to synthesize compound (1B) having —COO—. According to the method, a compound having —OCO— is also synthesized.

(III) Preparation of —CF$_2$O— and —OCF$_2$—

Treatment of compound (1B) with a sulfurizing reagent such as Lawesson's reagent results in compound (26). Compound (26) is fluorinated with a hydrogen fluoride—pyridine complex and NBS (N-bromosuccinimide) to synthesize compound (1C) having —CF$_2$O—. Refer to M. Kuroboshi et al., Chem. Lett., 1992, 827. Compound (1C) is also synthesized by fluorinating compound (26) with (diethylamino)sulfur trifluoride (DAST). Refer to W. H. Bunnelle et al., J. Org. Chem. 1990, 55, 768. By this method, a compound having —OCF$_2$— is also synthesized. It is also possible to prepare these bonding groups by a method described in Peer. Kirsch et al., Anbew. Chem. Int. Ed. 2001, 40, 1480.

(IV) Preparation of —CH=CH—

Compound (23) is treated with n-butyllithium followed by being reacted with formamide such as N,N-dimethylformamide (DMF) to obtain aldehyde (28). Aldehyde (28) is reacted with phosphorous ylide generated by treating phosphonium salt (27) synthesized by a publicly known method with a base such as potassium tert-butoxide to synthesize compound (1D). Depending on reaction conditions, cis-forms generate, which are isomerized to trans-forms by a publicly known method if required.

(V) Preparation of —(CH$_2$)$_2$—

By hydrogenating compound (1D) in the presence of a catalyst such as palladium on carbon, compound (1E) is synthesized.

(VI) Preparation of —(CH$_2$)$_4$—

A compound having —(CH$_2$)$_2$—CH=CH— is obtained by using phosphonium salt (29) in place of phosphonium salt (27) and according to the method in item (IV). The compound is subjected to catalytic hydrogenation to synthesize compound (1F).

(VII) Preparation of —C≡C—

Compound (23) is reacted with 2-methyl-3-butyne-2-ol in the presence of catalysts of dichloropalladium and copper halide followed by deprotection under a basic condition to obtain compound (30). Compound (30) is reacted with compound (22) in the presence of catalysts of dichloropalladium and copper halide to synthesize compound (1G).

(VIII) Preparation of —CF=CF—

After treatment with n-butyllithium, compound (23) is reacted with tetrafluoroethylene to obtain compound (31). After treatment with n-butyllithium, compound (22) is reacted with compound (31) to synthesize compound (1H).

(IX) Preparation of —CH$_2$O— or —OCH$_2$—

Compound (28) is reduced by a reducing agent such as sodium borohydride to obtain compound (32), which is halogenated by hydrobromic acid to obtain compound (33). Compound (33) is reacted with compound (25) in the presence of potassium carbonate and the like to synthesize compound (1J).

(X) Preparation of —(CH$_2$)$_3$O— or —O(CH$_2$)$_3$—

Compound (1K) is synthesized according to the method in item (IX) by using compound (34) in place of compound (32).

(XI) Preparation of —(CF$_2$)$_2$—

According to a method described in J. Am. Chem. Soc., 2001, 123, 5414, diketone (—COCO—) is fluorinated by sulfur tetrafluoride in the presence of a hydrogen fluoride catalyst to obtain a compound having —(CF$_2$)$_2$—.

Next, an example of method for synthesizing a chroman compound represented by formula (1) will be illustrated in the following scheme. Firstly, a scheme for synthesizing synthetic intermediate (41) having a chroman-skeleton will be explained, then an example of method for synthesizing chroman compounds (45), (48), (50) and (53) by using compound (41) as a starting material will be described.

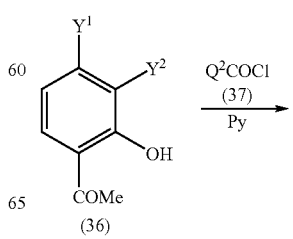

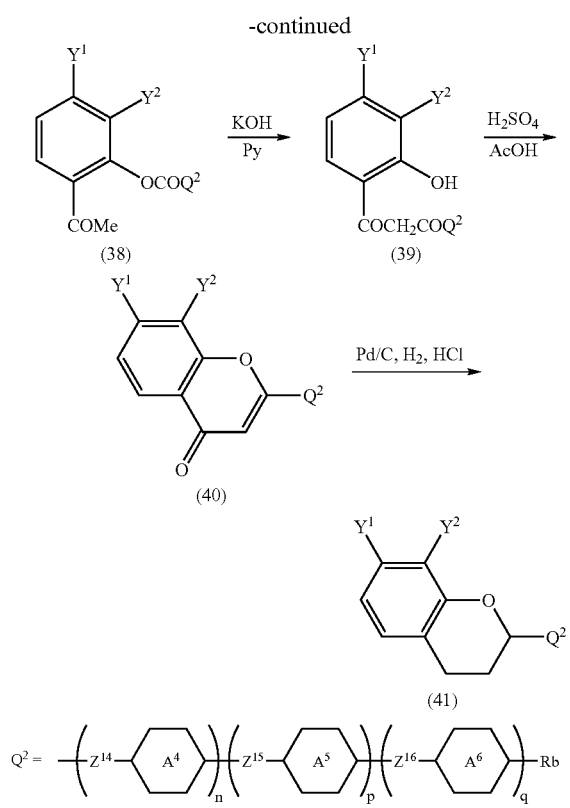

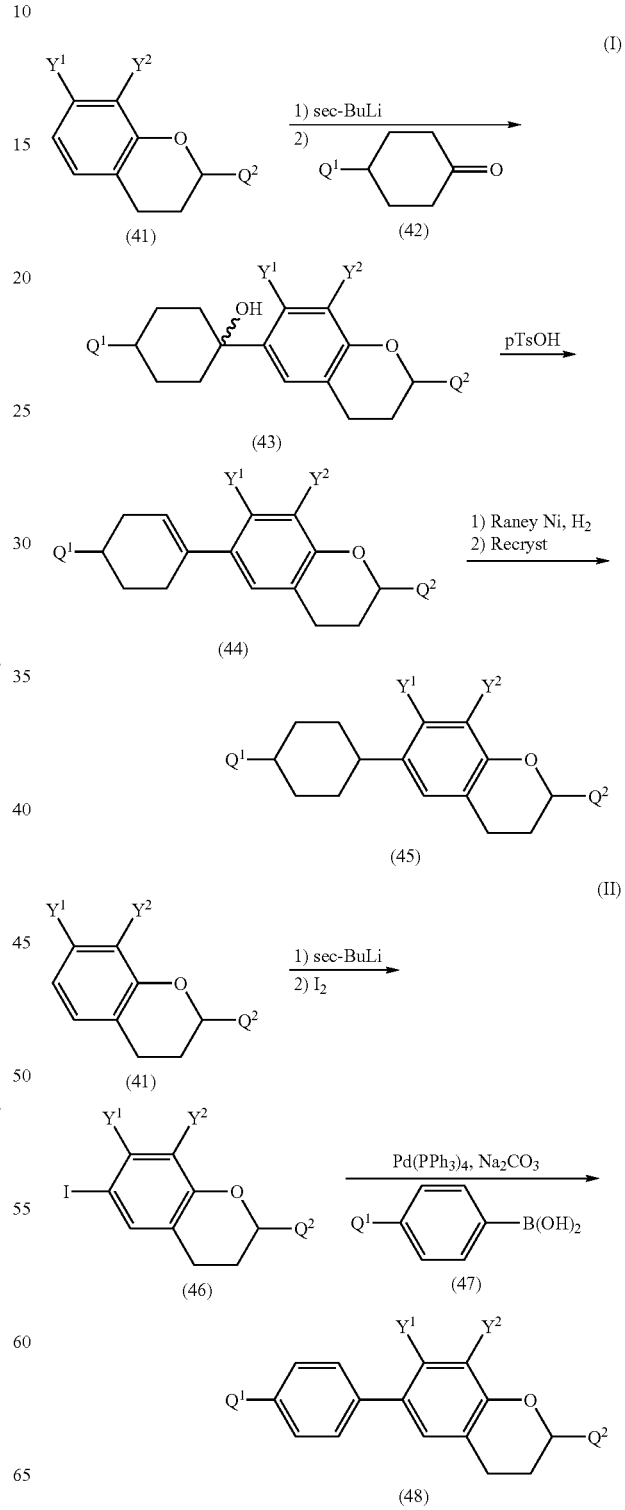

In compounds (37) to (41), $Q^2$ is a structure unit of formula (1). The structure unit is shown in the scheme. The meaning of symbols Rb, $A^4$, $A^5$, $A^6$, $Z^{14}$, $Z^{15}$ and $Z^{16}$ in these compounds is the same as that of symbols described in item 1. For example, compound (41) can be synthesized by the method described in Journal of Organic Chemistry, 1994, 59, 5930-5936 while using compound (36) as a starting material.

That is, compound (38) is synthesized by reactions between compound (36) and acid chloride (37). These reactions are conducted preferably in an aromatic hydrocarbon-series solvent such as toluene or an ether-series solvent such as diethyl ether, in the presence of a base such as pyridine, and at a temperature between room temperature and the boiling point of the solvent. Compound (39) is synthesized by a rearrangement reaction of compound (38). These reactions are conducted preferably in a solvent such as pyridine, N,N-dimethylformamide or dimethylsulfoxide, in the presence of a base such as potassium hydroxide, potassium tert-butoxide or sodium hydride, and at a temperature in a range from room temperature to the boiling point of the solvent. Compound (40) is synthesized by cyclization reactions of compound (39). These reactions are conducted preferably in a solvent such as acetic acid, in the presence of an acid such as sulfuric acid or hydrochloric acid, and at a temperature between room temperature and the boiling point of the solvent. Compound (41) is synthesized by hydrogenating compound (40). These reactions are conducted preferably in an alcoholic hydrocarbon-series solvent such as methanol or ethanol, an aromatic hydrocarbon-series solvent such as toluene, an aliphatic hydrocarbon-series solvent such as heptane or a mixed solvent thereof, and at a temperature between room temperature and the boiling point of the solvent. An acid such as sulfuric acid or hydrochloric acid may be added to accelerate the reaction.

Compound (36) as a starting material can be synthesized easily according to a method of synthetic organic chemistry.

Next, an example of a method for synthesizing compounds (45), (48), (50) and (53) will be illustrated.

-continued

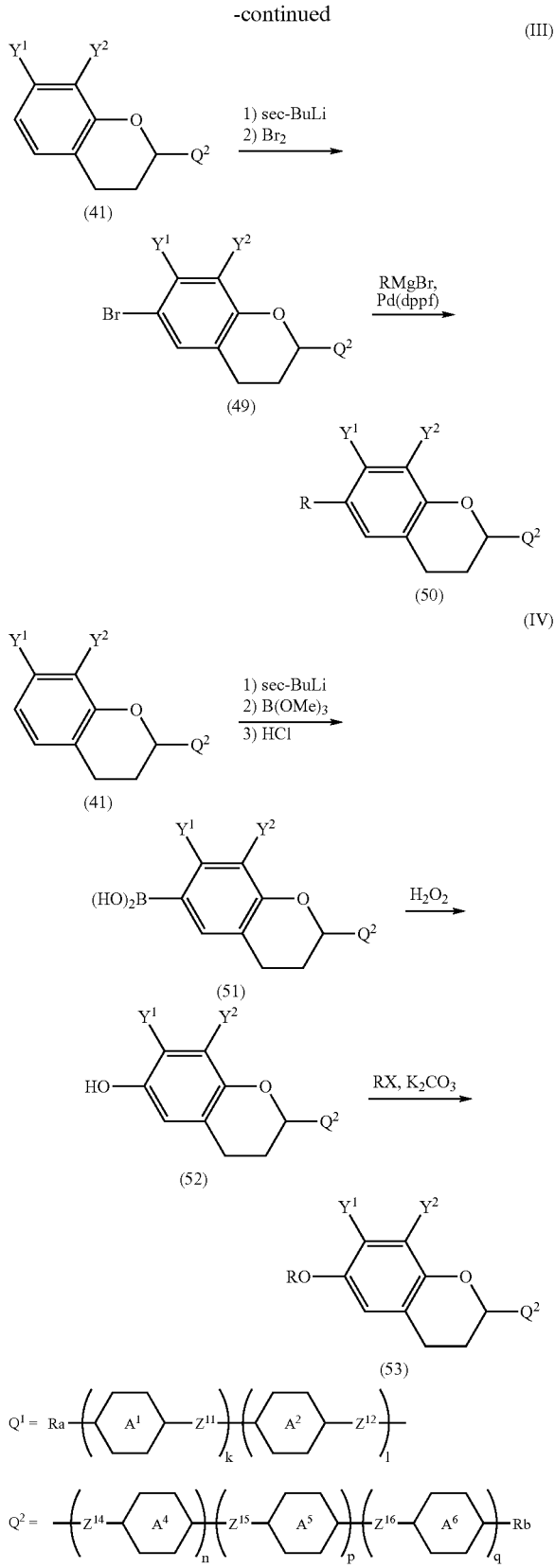

In compounds (41) to (53), $Q^1$ or $Q^2$ is the structure unit in formula (1). The structure unit has been shown in the scheme. The meaning of symbols Ra, Rb, $A^1$, $A^2$, $A^4$, $A^5$, $A^6$, $Z^{11}$, $Z^{12}$, $Z^{14}$, $Z^{15}$ and $Z^{16}$ in these compounds is the same as that of symbols described in item 1.

(I) Compound in which $A^3$ is 1,4-cyclohexylene and $Z^{13}$ is a Single Bond

Compound (43) is synthesized by converting compound (41) into a lithio compound by using an alkyllithium such as n-butyllithium or sec-butyllithium, and then reacting the same with cyclohexanone (42). These reactions are conducted preferably in a solvent such as tetrahydrofuran and at a temperature between −100° C. and the boiling point of the solvent. Compound (44) is synthesized by dehydrating compound (43) by using an acid such as p-toluenesulfonic acid or sulfuric acid. These reactions are conducted preferably in a solvent such as toluene and at a temperature between room temperature and the boiling point of the solvent. Compound (45) is synthesized by hydrogenating compound (44) by using a catalyst such as Raney nickel or palladium on carbon. These reactions are conducted preferably in an alcoholic hydrocarbon-series solvent such as methanol or ethanol, an aromatic hydrocarbon-series solvent such as toluene, an aliphatic hydrocarbon-series solvent such as heptane or a mixed solvent thereof, and at a temperature between room temperature and the boiling point of the solvent. Hydrogen pressure is preferably from ordinary pressure to 10 atm. Compound (45) after hydrogenation is obtained as a mixture of isomers, i.e., cis-forms and trans-forms, which can be recrystallized to obtain trans-forms as a principal component.

(II) Compound in Which $A^3$ is 1,4-Phenylene and $Z^{13}$ is a Single Bond

Compound (48) is synthesized by converting compound (41) into a lithio compound by using an alkyllithium such as n-butyllithium or sec-butyllithium, and then reacting the same with bromine or iodine. These reactions are conducted preferably in a solvent such as tetrahydrofuran and at a temperature between −75° C. and the boiling point of the solvent. Compound (48) is synthesized by reacting compound (46) with boric compound (47). These reactions are conducted preferably in a solvent of an aromatic hydrocarbon-series such as toluene, an alcoholic hydrocarbon-series such as ethanol, an ethereal hydrocarbon-series such as ethyleneglycol dimethylether, or a mixture of them with water, in the presence of a base such as potassium carbonate or sodium carbonate, with a metal catalyst, and at a temperature between room temperature and the boiling point of the solvent. As the metal catalyst, tetrakis(triphenylphosphine)palladium, dichlorobis(triphenylphosphine)palladium, palladium on carbon or the like is utilized.

(III) Compound in Which Ra is Alkyl and $Z^{13}$ is a Single Bond

Compound (49) is synthesized by converting compound (41) into a lithio compound by using an alkyllithium such as n-butyllithium or sec-butyllithium, and then reacting the same with bromine or iodine. These reactions are conducted preferably in a solvent such as tetrahydrofuran and at a temperature between −75° C. and the boiling point of the solvent. Compound (50) is synthesized by reacting compound (49) with Grignard compound in the presence of a metal catalyst. These reactions are conducted preferably in a solvent such as tetrahydrofuran and at a temperature between −75° C. and the boiling point of the solvent. As the catalyst, [1,1-bis(diphenylphosphino)ferrocene]dichloropalladium (Pd(dppf)), [1,2-bis(diphenylphosphinoethane)dichloronickel (Ni(dppe)), [1,3-bis(diphenylphosphinopropane)dichloronickel (Ni(dppp)) or the like is utilized.

(IV) Compound in Which Ra is Alkoxy and $Z^{13}$ is a Single Bond.

Compound (51) is synthesized by converting compound (41) into a lithio compound by using an alkyllithium such as n-butyllithium or sec-butyllithium, then reacting the same with trimethyl borate or triisopropyl borate, and further acid-treating the resulting material. These reactions are conducted preferably in a solvent such as tetrahydrofuran and at a temperature between −75° C. and the boiling point of the solvent. Compound (52) is synthesized by reacting compound (51) with peroxide such as aqueous hydrogen peroxide. These reactions are conducted preferably in a solvent such as tetrahydrofuran and at a temperature between −75° C. and the boiling point of the solvent. Compound (53) is synthesized by reacting compound (52) with a halogenated alkyl in the presence of a base such as potassium carbonate. These reactions are conducted preferably in a solvent such as tetrahydrofuran or N,N-dimethylformamide, and at a temperature between −30° C. and the boiling point of the solvent.

Secondary, the composition according to the invention will be further explained. Ingredients of the composition may be only plural compounds selected from compound (1). A preferable composition contains at least one compound selected from compound (1) by a ratio of 1 to 99%. The composition mainly contains ingredients selected from a group consisting of compounds (2) to (14). When preparing the composition, the ingredient is selected calculating dielectric anisotropy of compound (1).

Preferable compositions including compound (1) with a positive and large dielectric anisotropy are as follows. A preferable composition contains at least one compound selected from the group consisting of compounds (2), (3) and (4). Another preferable composition contains at least one compound selected from the group consisting of compounds (5) and (6). Another preferable composition contains at least two compounds each selected from the respective two groups. These composition may further contain at least one compound selected from the group consisting of compounds (12), (13) and (14) for the purpose of adjusting a temperature range of a liquid crystalline phase, viscosity, optical anisotropy, dielectric anisotropy, threshold voltage or the like. These compositions may further contain at least one compound selected from the group consisting of compounds (7) to (11) for the purpose of adjusting further physical properties thereof. These compositions may further contain a compound such as another liquid crystalline compound or an additive for the purpose of being adapted for an AM-TN element, STN element or the like.

Another preferable composition contains at least one compound selected from the group consisting of compounds (12), (13) and (14). The composition may further contain at least one compound selected from the group consisting of compounds (7) to (11) for the purpose of adjusting further physical properties thereof. The composition may further contain a compound such as another liquid crystalline compound or an additive for the purpose of being adapted for an AM-TN element, STN element or the like.

A preferable composition including a composition (1) with a negative and large dielectric anisotropy is as follows. A preferable composition contains at least one compound selected from the group consisting of compounds (7) to (11). The composition may further contain at least one compound selected from the group consisting of compounds (12), (13) and (14). The composition may further contain at least one compound selected from the group consisting of compounds (2) to (6) for the purpose of adjusting further physical properties thereof. The composition may further contain a compound such as another liquid crystalline compound or an additive for the purpose of being adapted for a VA element or the like.

Another preferable composition contains at least one compound selected from the group consisting of compounds (12), (13) and (14). This composition may further contain at least one compound selected from the group consisting of compounds (7) to (11). This composition may further contain at least one compound selected from the group consisting of compounds (2) to (6). This composition may further contain a compound such as another liquid crystalline compound or an additive.

Preferable compositions including compound (1) with a small dielectric anisotropy is as follows. A preferable composition contains at least one compound selected from the group consisting of compounds (2), (3) and (4). Another preferable composition contains at least one compound selected from the group consisting of compounds (5) and (6). Another preferable composition contains at least two compounds each selected from these respective groups. These compositions may further contain at least one compound selected from the group consisting of compounds (12), (13) and (14) for the purpose of adjusting a temperature range, viscosity, optical anisotropy, dielectric anisotropy, threshold voltage or the like of a liquid crystalline phase. This composition may further contain at least one compound selected from the group consisting of compounds (7) to (11) for the purpose of adjusting further physical properties. This composition may further contain a compound such as another liquid crystalline compound or an additive for the purpose of being adapted for an AM-TN element, STN element or the like.

Another preferable composition contains at least one compound selected from the group consisting of compounds (7) to (11). This composition may further contain at least one compound selected from the group consisting of compounds (12), (13) and (14). This composition may further contain at least one compound selected from the group consisting of compounds (2) to (6) for the purpose of adjusting further physical properties. This composition may further contain another liquid crystalline compound or an additive for the purpose of being adapted for a VA element or the like.

Compounds (2), (3) and (4) are mainly used for a composition for an AM-TN element because of their positive and large dielectric anisotropy. In this composition, an amount of these compounds is from 1 to 99%. A preferable amount is from 10 to 97%. A more preferable amount is from 40 to 95%. When further adding compound (12), (13) or (14) to this composition, a preferable amount of the compound is 60% or less. A more preferable amount is 40% or less.

Compounds (5) and (6) are mainly used for a composition for an STN element because of their positive and very large dielectric anisotropy. In this composition, an amount of these compounds is from 1 to 99%. A preferable amount is from 10 to 97%. A more preferable amount is from 40 to 95%. When further adding compound (12), (13) or (14) to this composition, a preferable amount of the compound is 60% or less. A more preferable amount is 40% or less.

Compounds (7), (8), (9), (10) and (11) are mainly used for a composition for a VA element because of their negative dielectric anisotropy. A preferable amount of these compounds is 80% or less. A more preferable amount is from 40 to 80%. When further adding compound (12), (13) or (14) to this composition, a preferable amount of the compound is 60% or less. A more preferable amount is 40% or less.

Compounds (12), (13) and (14) have a small. dielectric anisotropy. The compound (12) is mainly used for the purpose of adjusting viscosity or optical anisotropy. The compounds (13) and (14) are used for the purpose of widening a temperature range of a liquid crystalline phase by increasing the upper limit temperature thereof, or adjusting optical anisotropy thereof. Increase of an amount of compounds (12), (13) and (14) results in a high threshold voltage and a low viscosity of the composition. Accordingly, they may be used by a lot of amount as far as a required value of threshold voltage of the composition is satisfied.

Preferable compounds (2) to (14) includes respectively compounds (2-1) to (2-9), compounds (3-1) to (3-97), compounds (4-1) to (4-33), compounds (5-1) to (5-56), compounds (6-1) to (6-3), compounds (7-1) to (7-4), compounds (8-1) to (8-6), compounds (9-1) to (9-4), compound (10-1), compound (11-1), compounds (12-1) to (12-11), compounds (13-1) to (13-21), and compounds (14-1) to (14-6). In these compounds, meaning of symbols $R^1$, $R^2$, $R^3$, $R^4$, $R^5$, $R^6$, $R^7$, $X^1$ and $X^2$ is the same as that of symbols in compounds (2) to (14).

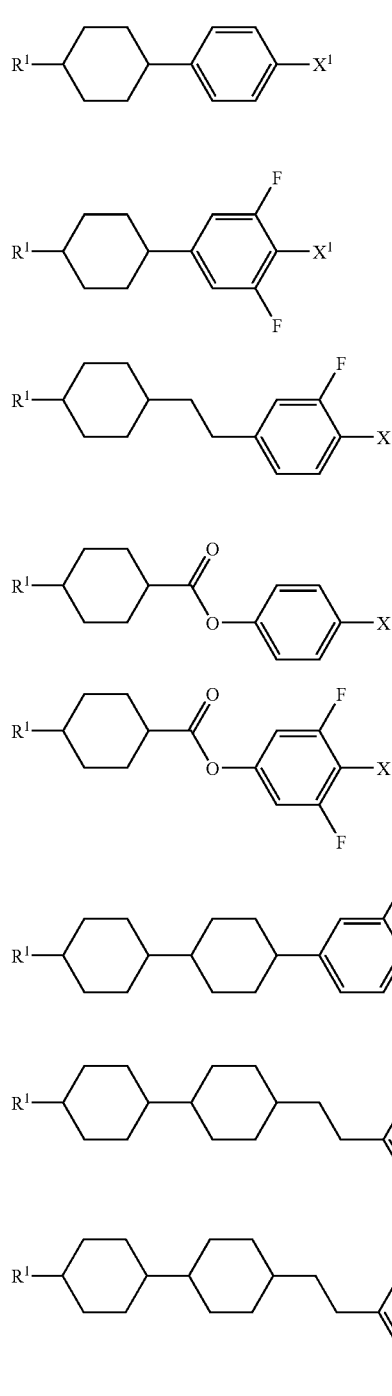

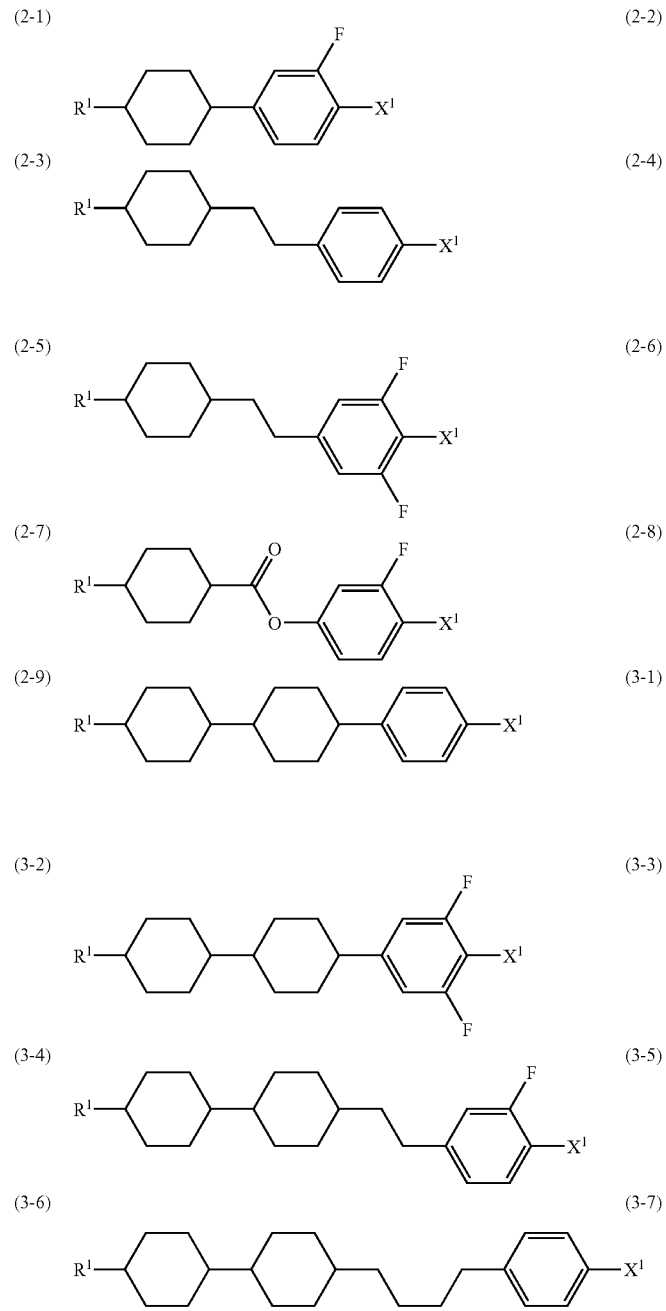

-continued
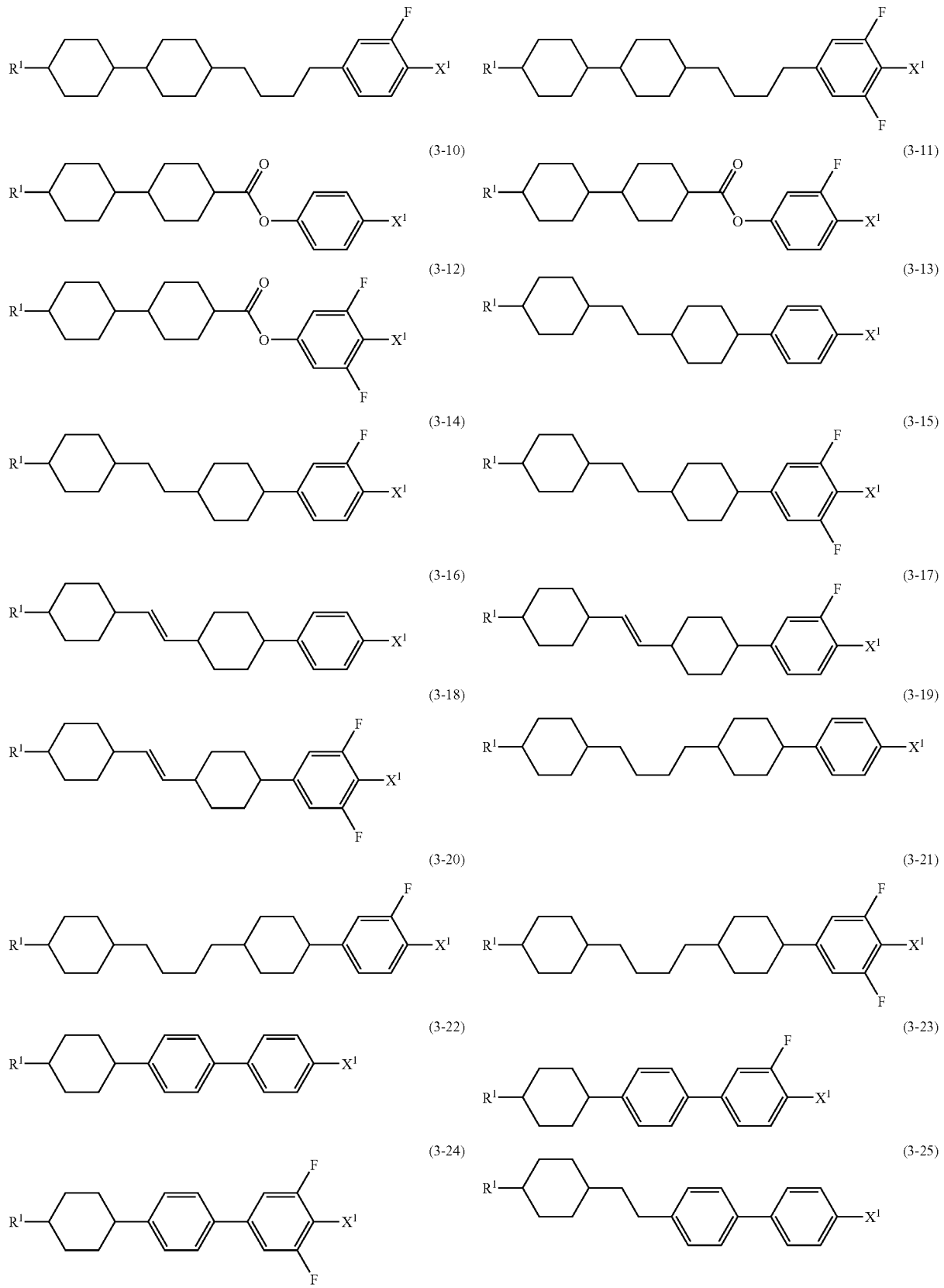

-continued
(3-26)
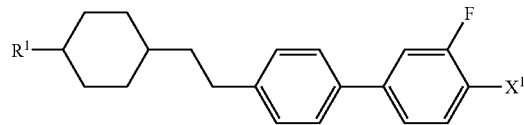
(3-27)
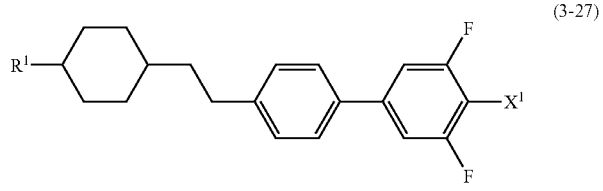
(3-28)
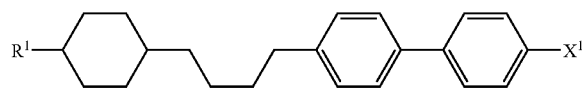
(3-29)
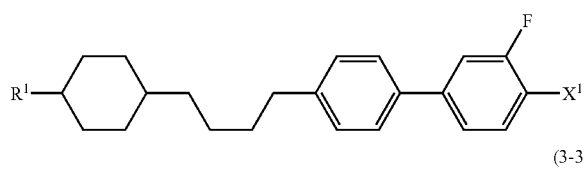
(3-30)
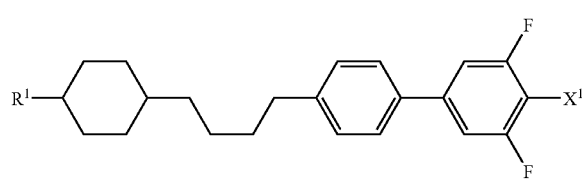
(3-31)
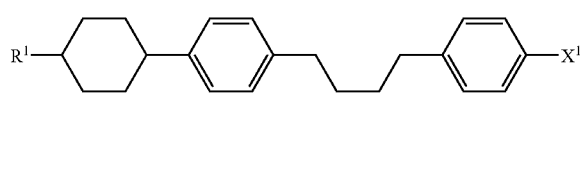
(3-32)
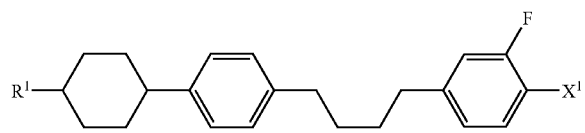
(3-33)
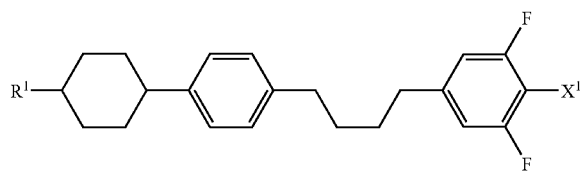
(3-34)
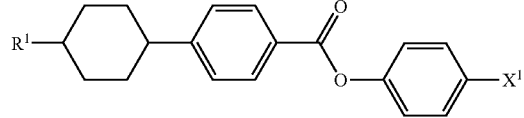
(3-35)
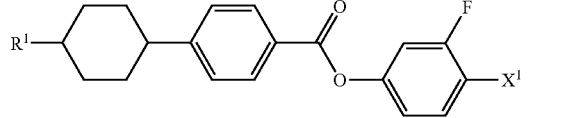
(3-36)
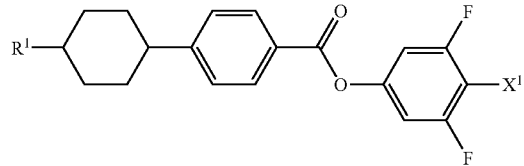
(3-37)
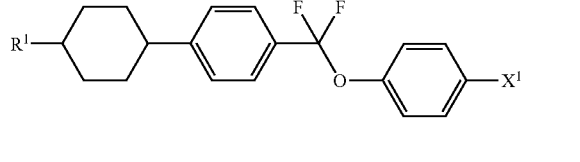
(3-38)
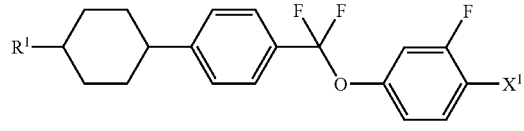
(3-39)
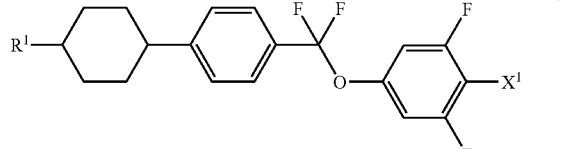
(3-40)
(3-41)
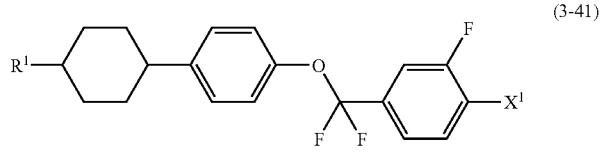
(3-42)
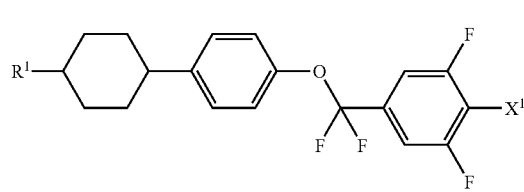
(3-43)

-continued
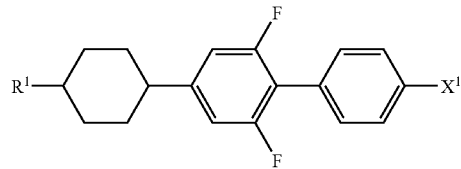 (3-44)
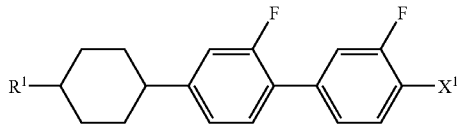 (3-45)
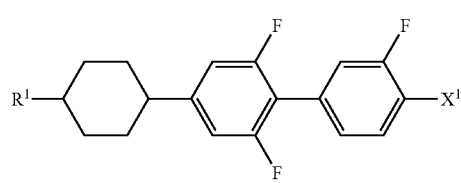 (3-46)
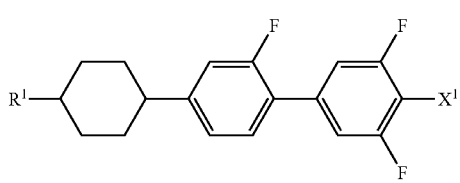 (3-47)
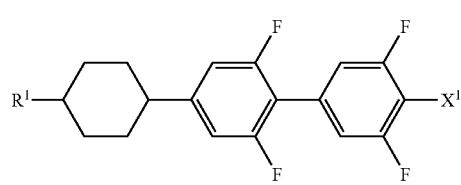 (3-48)
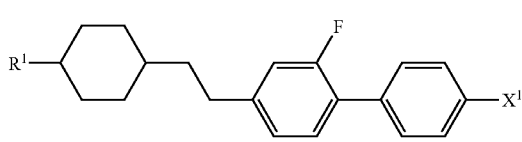 (3-49)
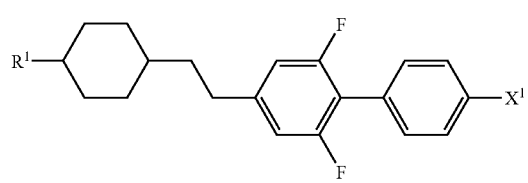 (3-50)
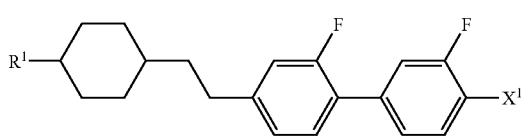 (3-51)
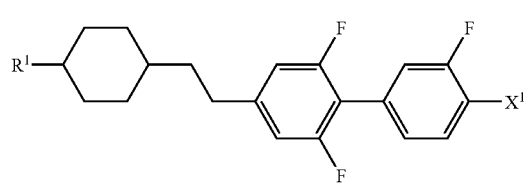 (3-52)
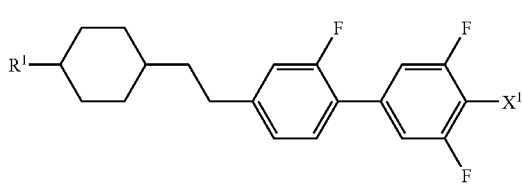 (3-53)
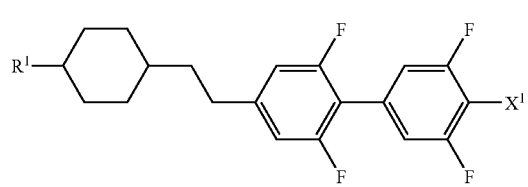 (3-54)
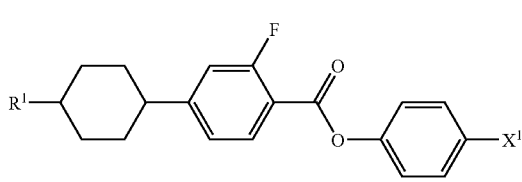 (3-55)
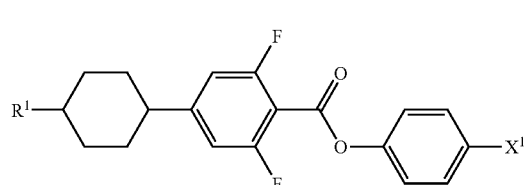 (3-56)
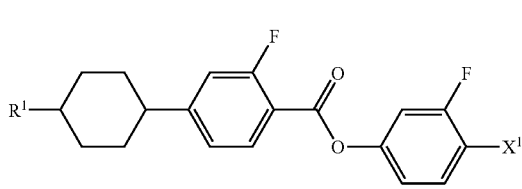 (3-57)
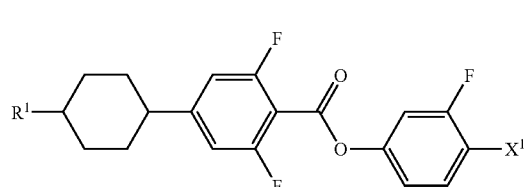 (3-58)
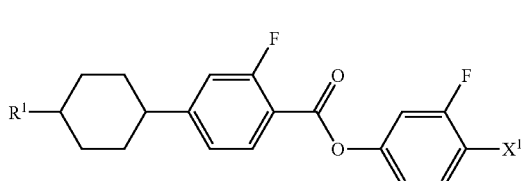 (3-59)

-continued
(3-60)
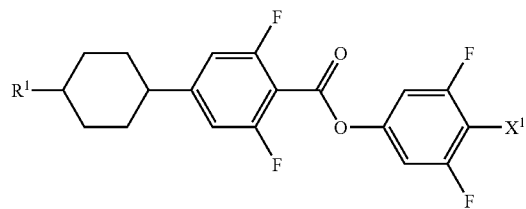
(3-61)
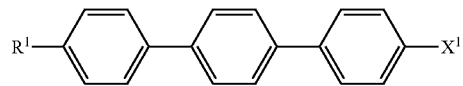
(3-62)
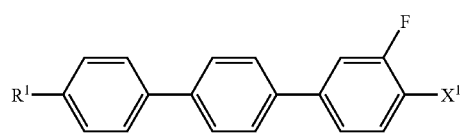
(3-63)
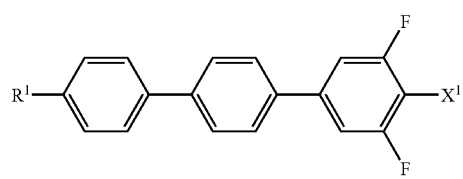
(3-64)
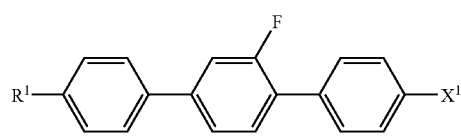
(3-65)
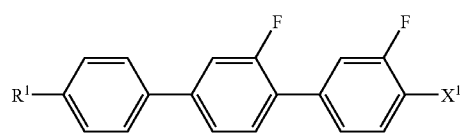
(3-66)
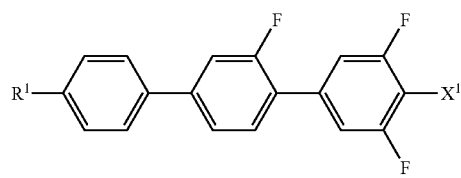
(3-67)
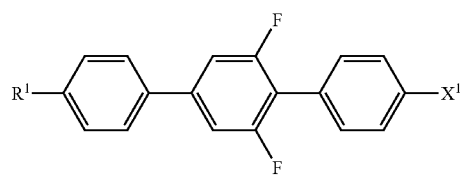
(3-68)
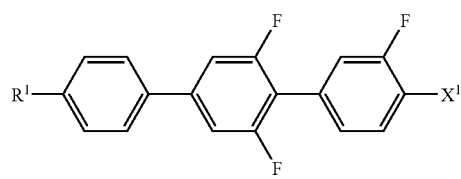
(3-69)
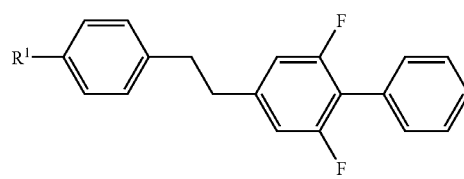
(3-70)
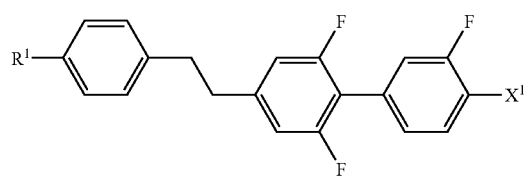
(3-71)
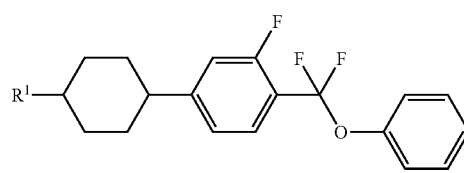
(3-72)
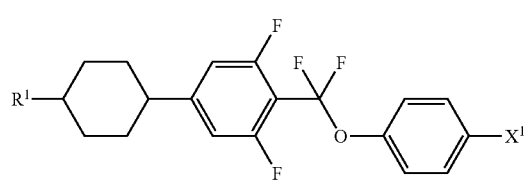
(3-73)
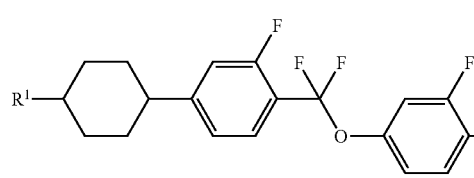
(3-74)
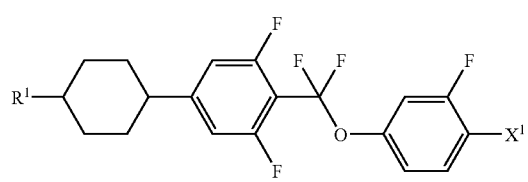
(3-75)
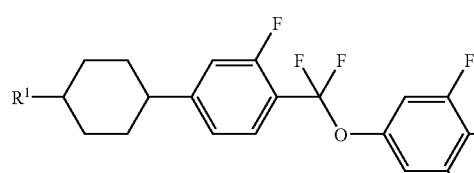

-continued
(3-76) 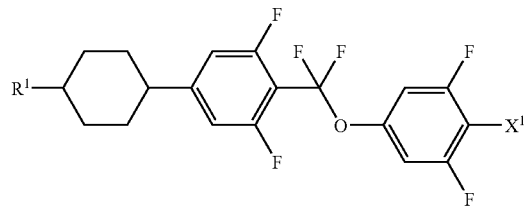
(3-77) 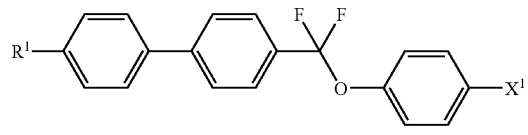
(3-78) 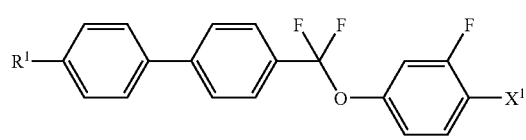
(3-79) 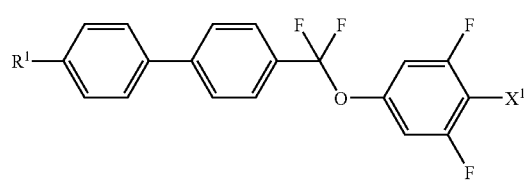
(3-80) 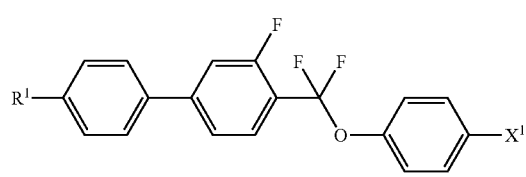
(3-81) 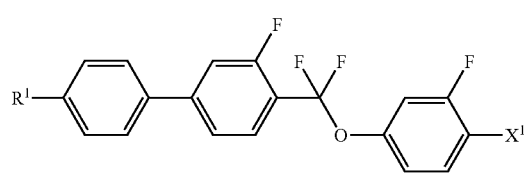
(3-82) 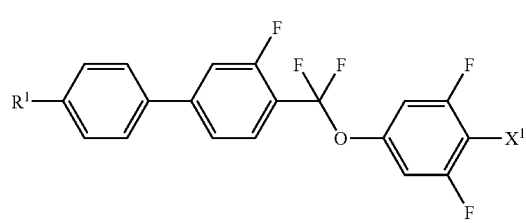
(3-83) 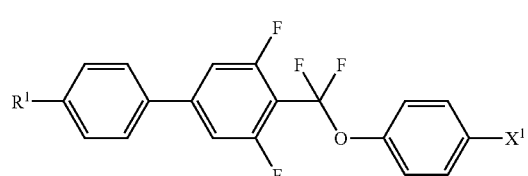
(3-84) 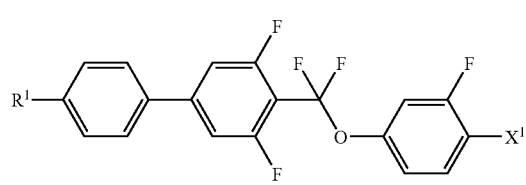
(3-85) 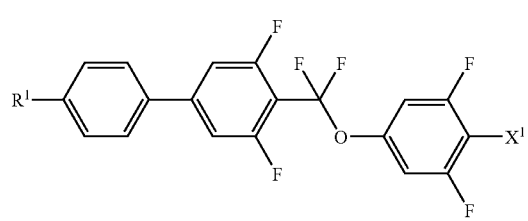
(3-86) 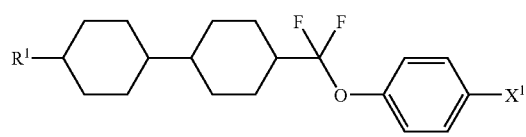
(3-87) 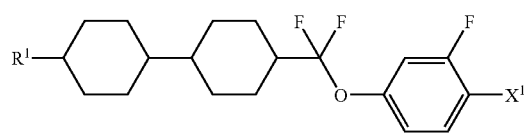
(3-88) 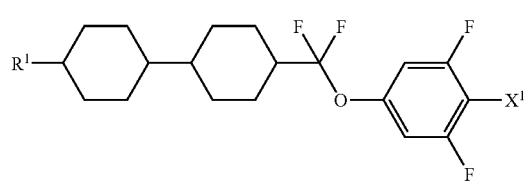
(3-89) 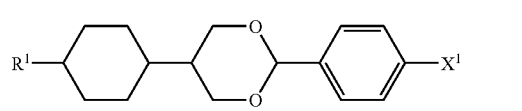
(3-90) 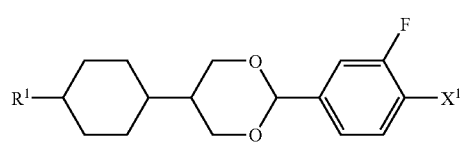
(3-91) 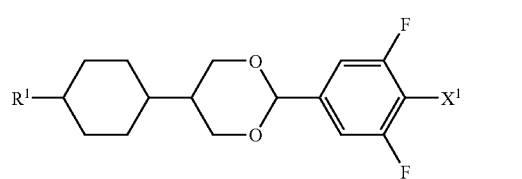

-continued
(3-92) 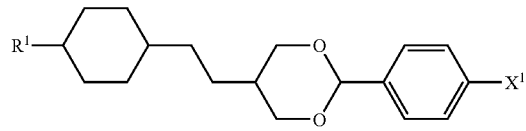 (3-93) 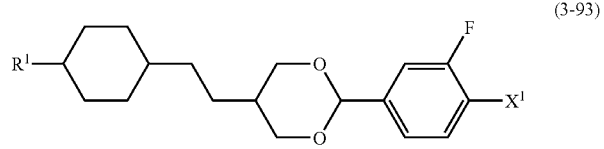
(3-94) 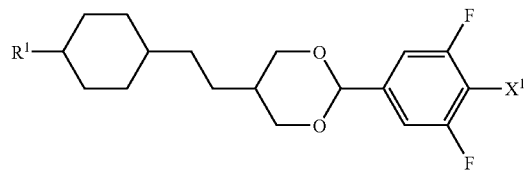 (3-95)
(3-96) 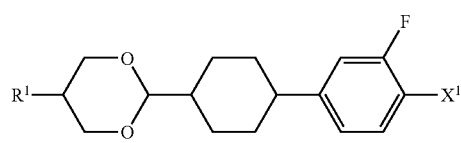 (3-97)
(4-1) 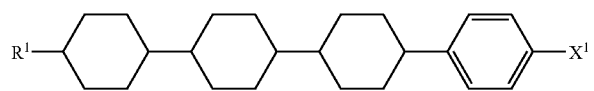 (4-2)
(4-3) 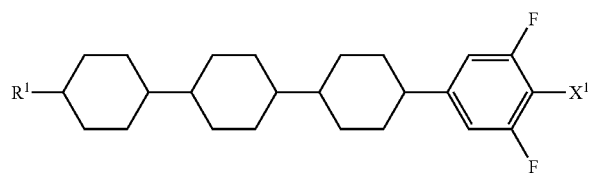 (4-4)
(4-5) 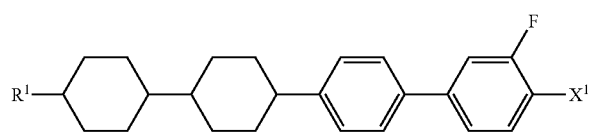 (4-6)
(4-7) 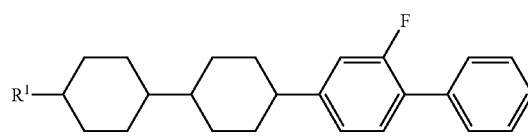 (4-8)
(4-9) 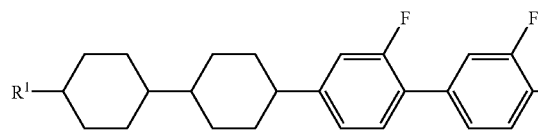 (4-10)

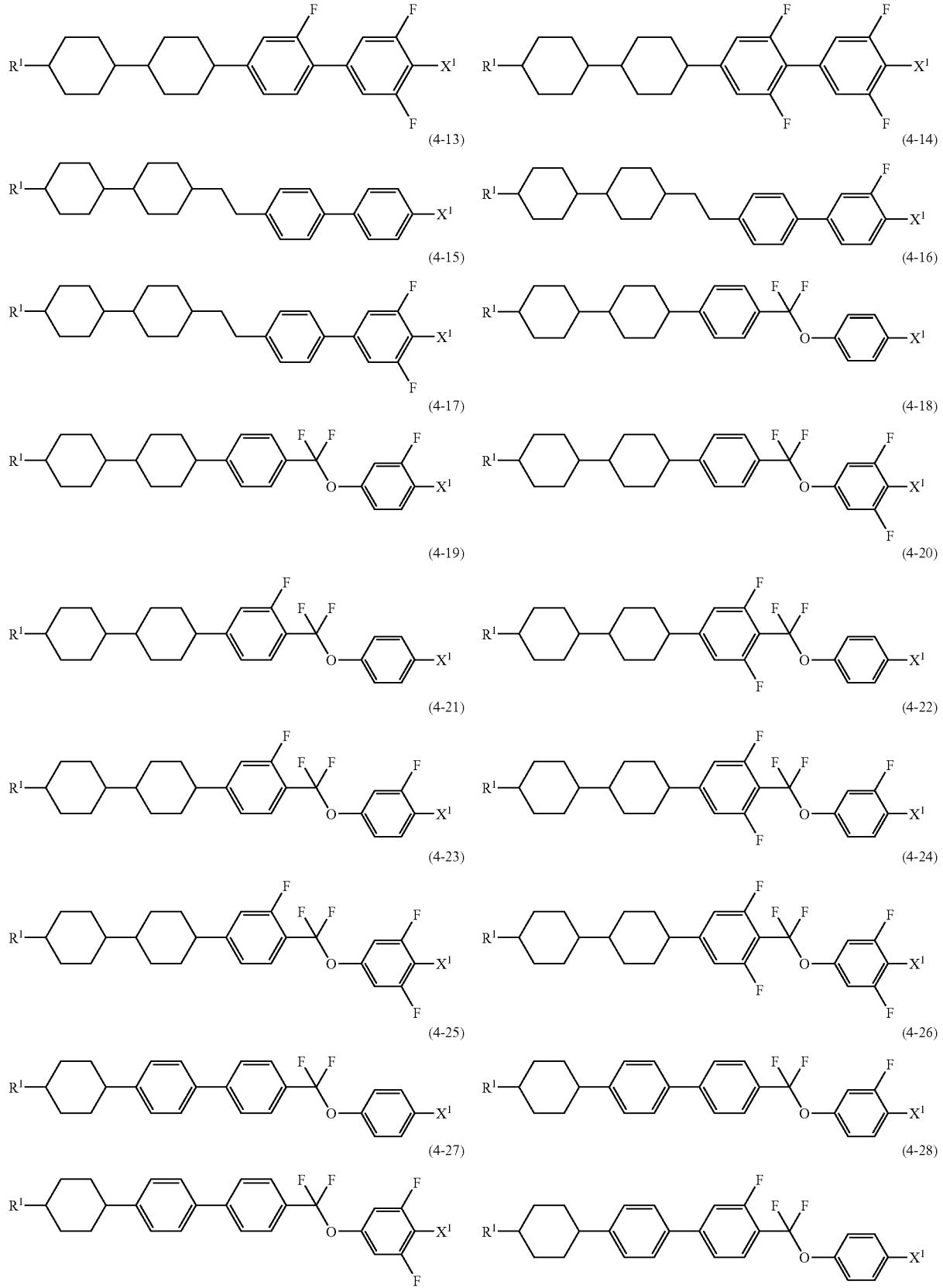

-continued
(4-29) 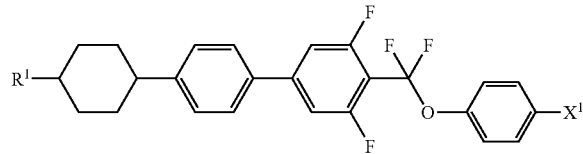
(4-30) 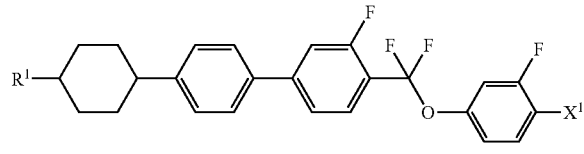
(4-31) 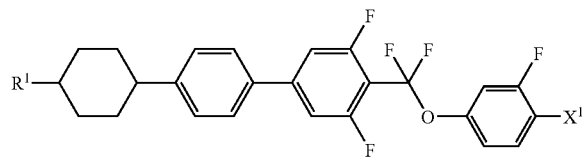
(4-32) 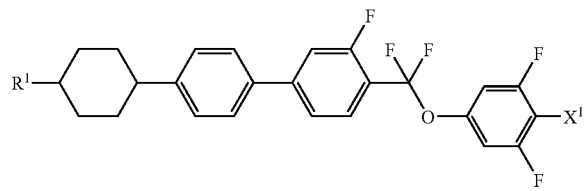
(4-33) 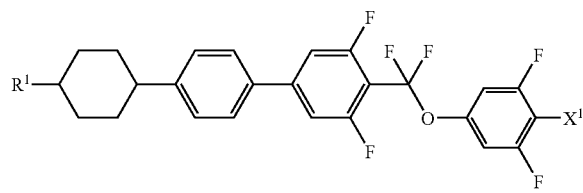
(5-1) 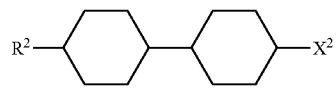
(5-2) 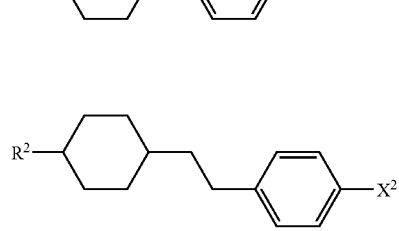
(5-3) 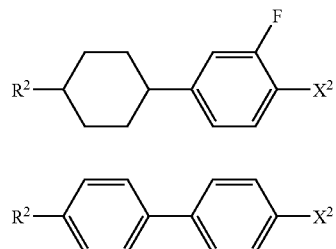
(5-4) 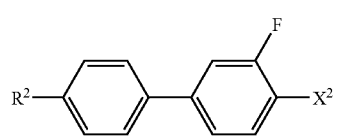
(5-5) 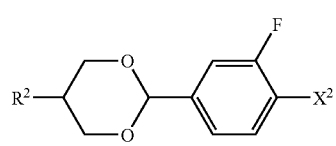
(5-6) 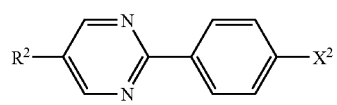
(5-7) 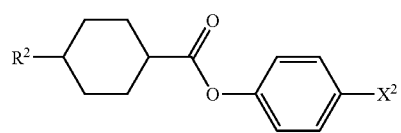
(5-8) 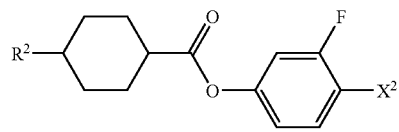
(5-9) 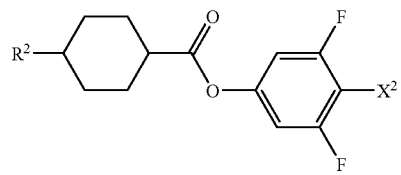
(5-10) 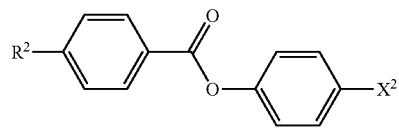
(5-11) 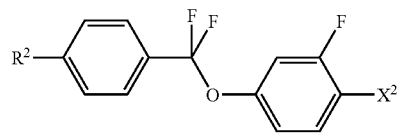
(5-12) 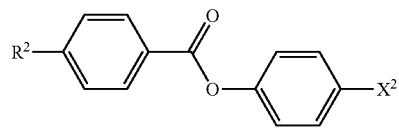
(5-13) 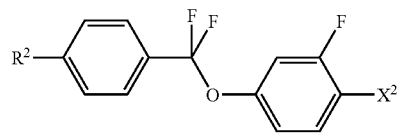

-continued
(5-14)
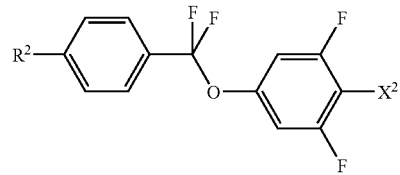
(5-15)
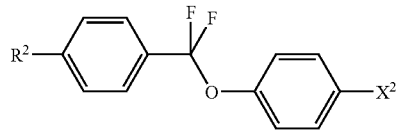
(5-16)
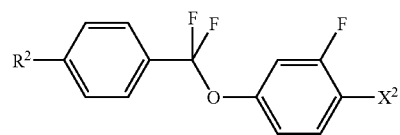
(5-17)
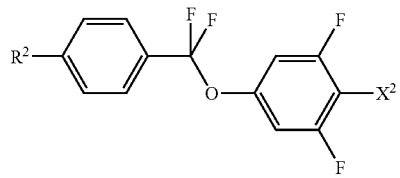
(5-18)
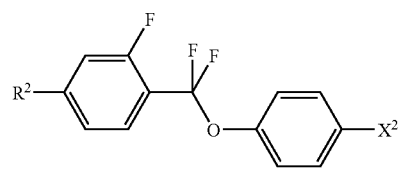
(5-19)
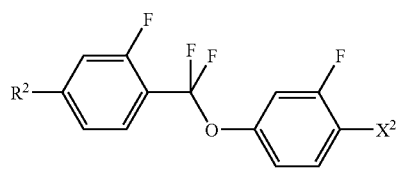
(5-20)
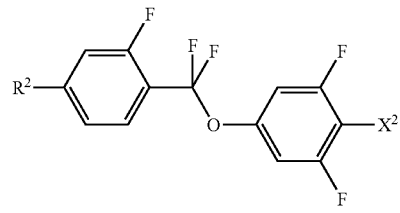
(5-21)
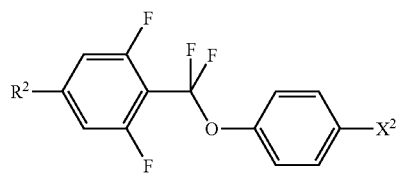
(5-22)
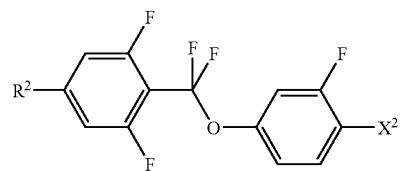
(5-23)
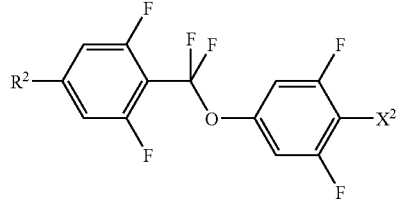
(5-24)
(5-25)
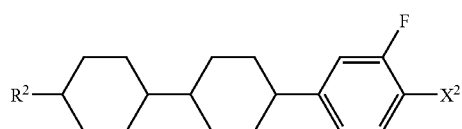
(5-26)
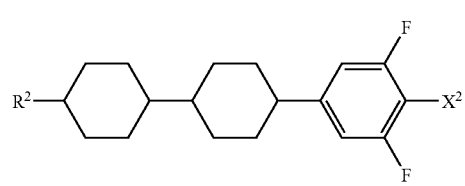
(5-27)
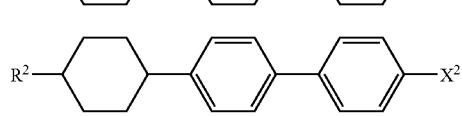
(5-28)
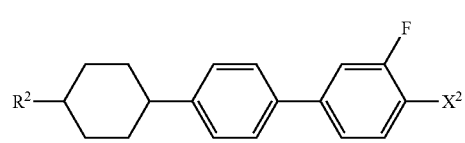
(5-29)
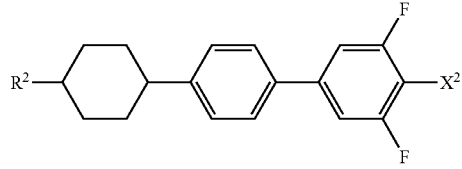
(5-30)
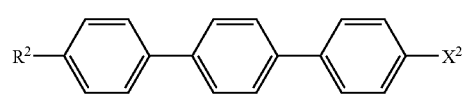
(5-31)
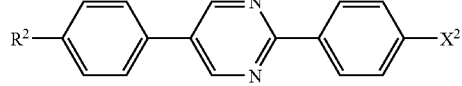

-continued
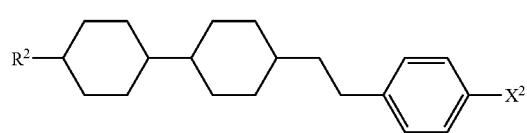 (5-32)
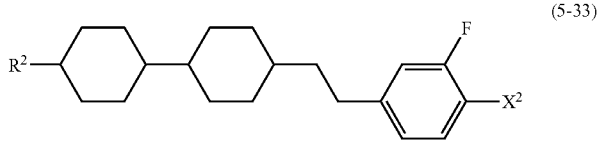 (5-33)
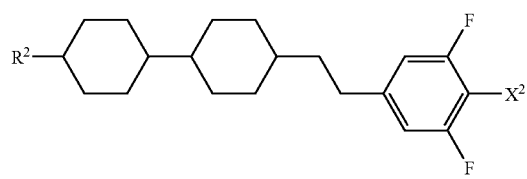 (5-34)
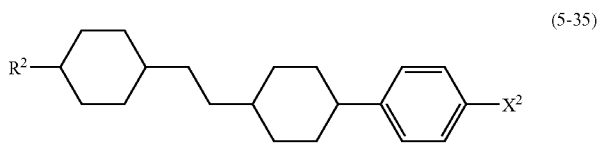 (5-35)
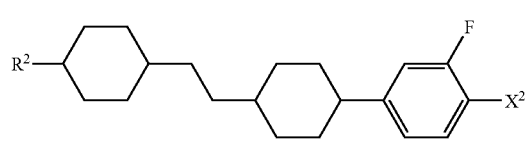 (5-36)
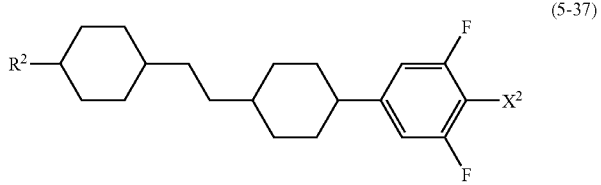 (5-37)
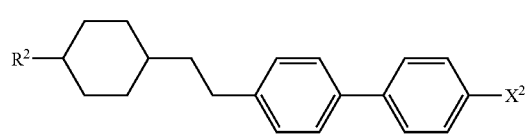 (5-38)
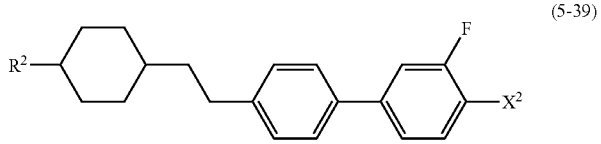 (5-39)
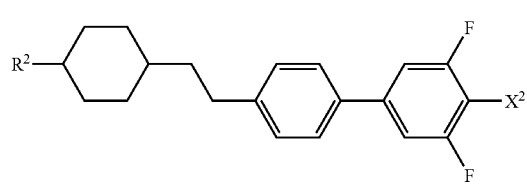 (5-40)
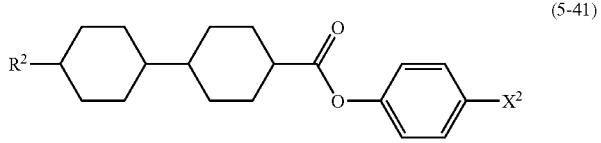 (5-41)
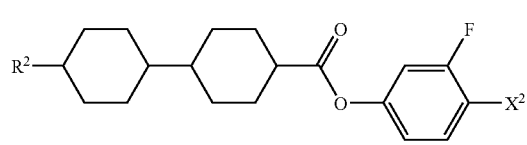 (5-42)
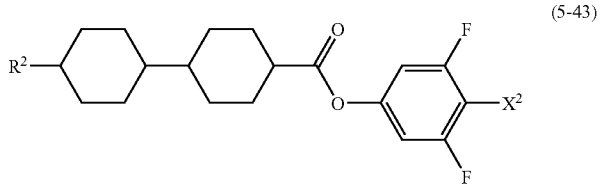 (5-43)
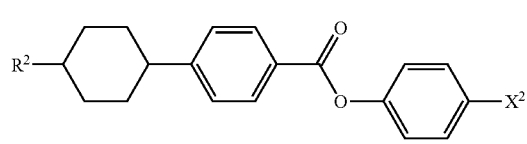 (5-44)
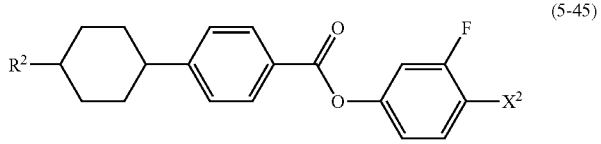 (5-45)
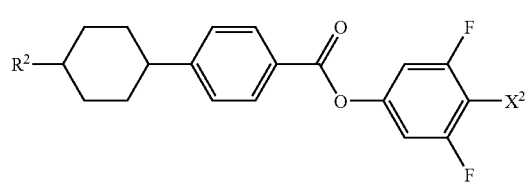 (5-46)
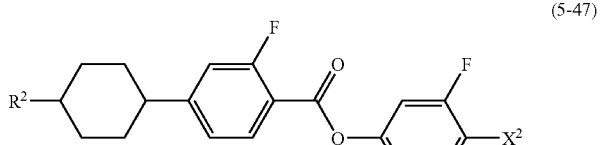 (5-47)
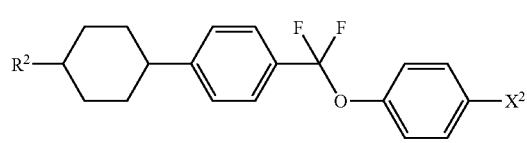 (5-48)
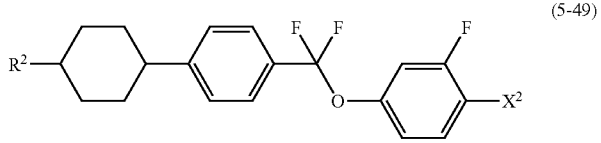 (5-49)

-continued
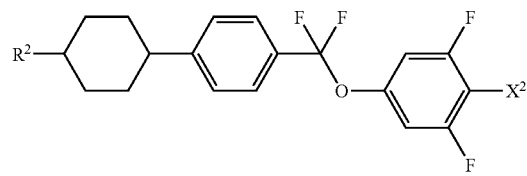
(5-50)
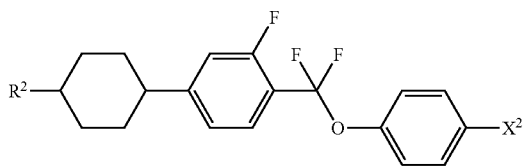
(5-51)
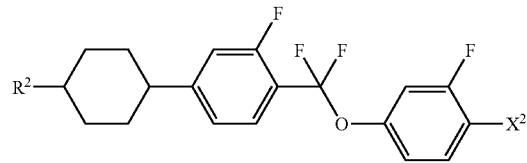
(5-52)
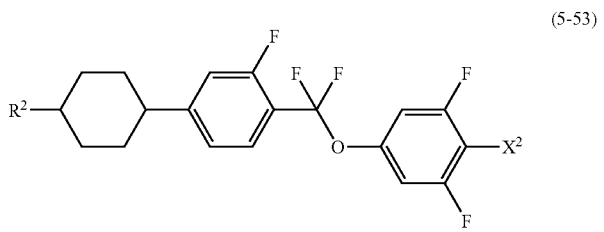
(5-53)
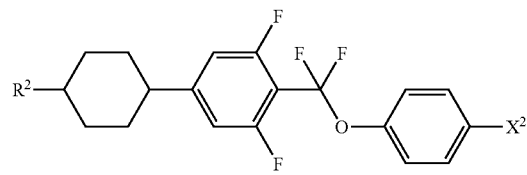
(5-54)
(5-55)
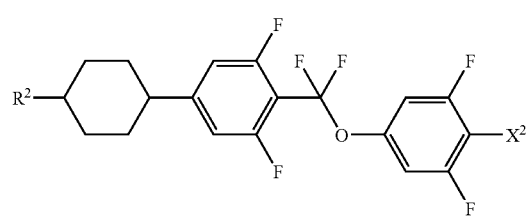
(5-56)
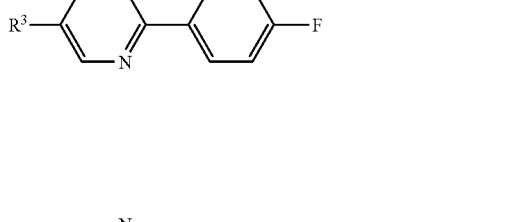
(6-1)
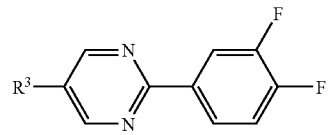
(6-2)
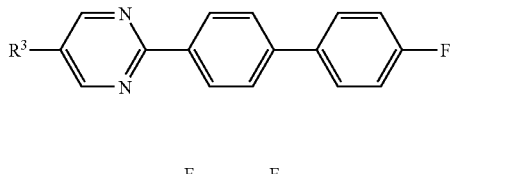
(6-3)
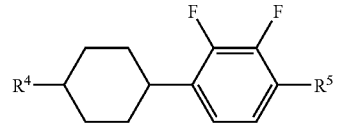
(7-1)
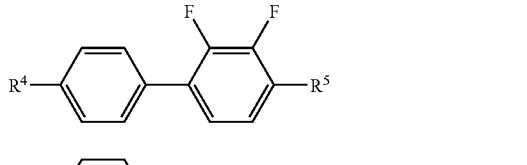
(7-2)
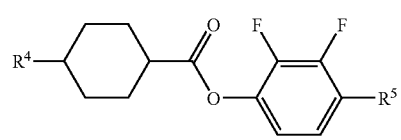
(7-3)
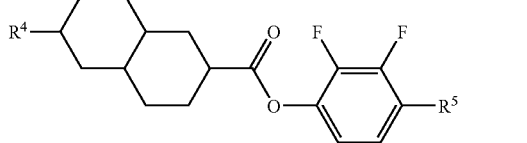
(7-4)
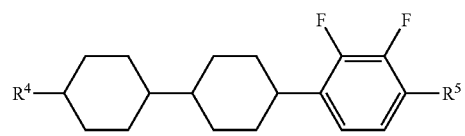
(8-1)
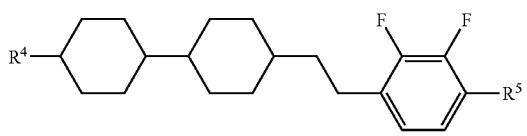
(8-2)
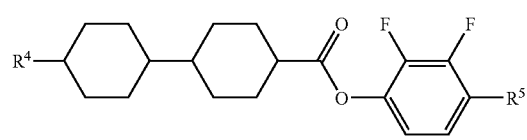
(8-3)
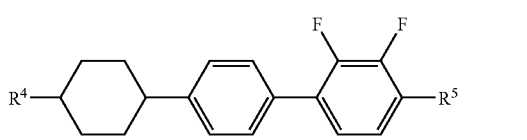
(8-4)

-continued
(8-5) 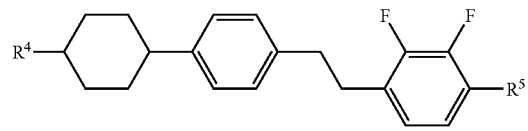
(8-6) 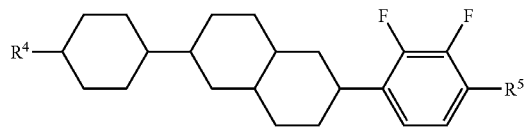
(9-1) 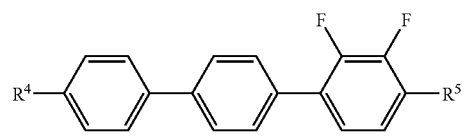
(9-2) 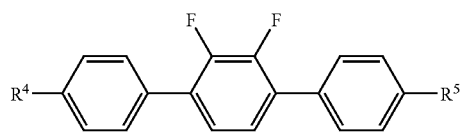
(9-3) 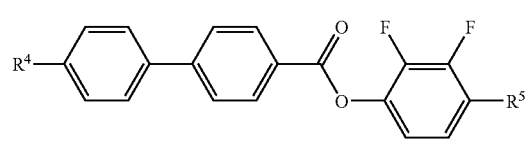
(9-4) 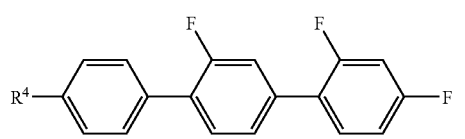
(10-1) 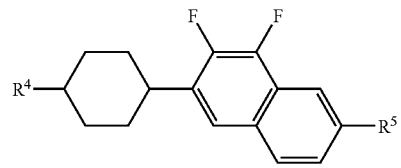
(11-1) 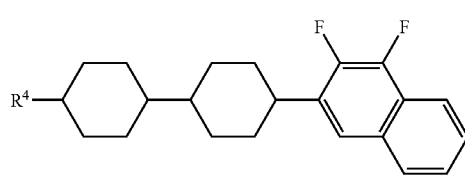
(12-1) 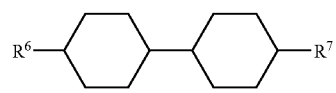
(12-2) 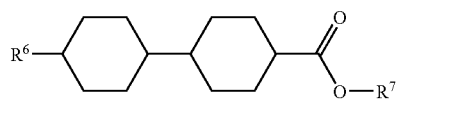
(12-3) 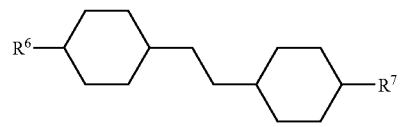
(12-4) 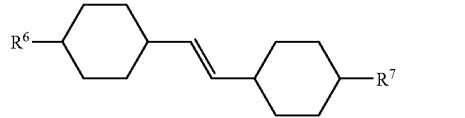
(12-5) 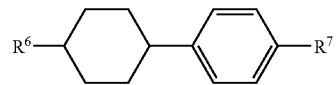
(12-6) 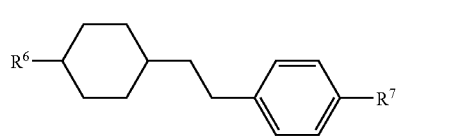
(12-7) 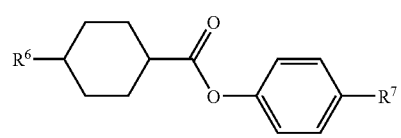
(12-8) 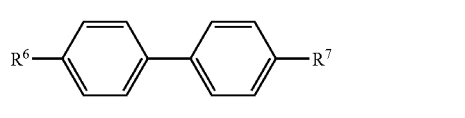
(12-9) 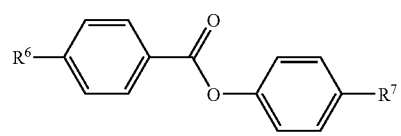
(12-10) 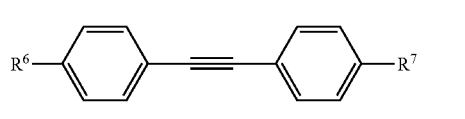
(12-11) 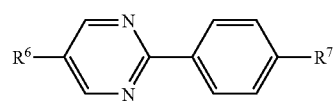
(13-1) 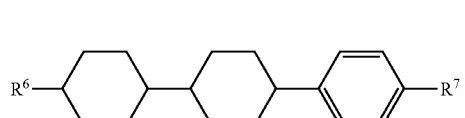
(13-2) 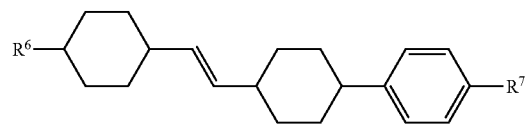
(13-3) 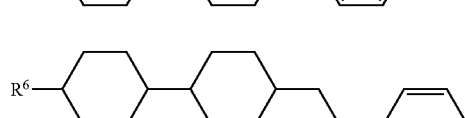
(13-4) 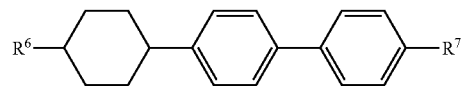
(13-5) 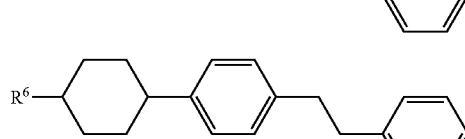

-continued
(13-6)
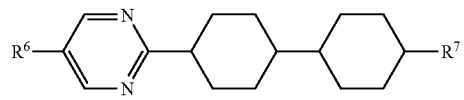
(13-7)
(13-8)
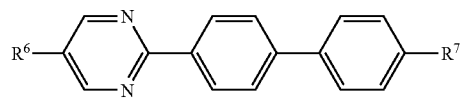
(13-9)
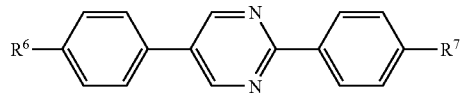
(13-10)
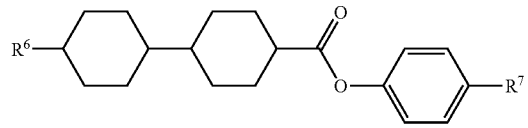
(13-11)
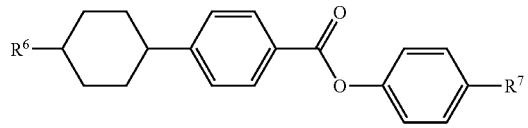
(13-12)
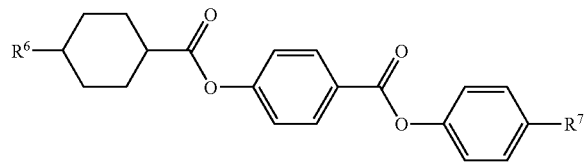
(13-13)
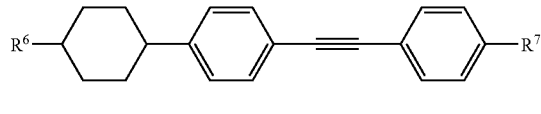
(13-14)
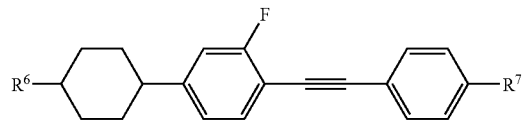
(13-15)
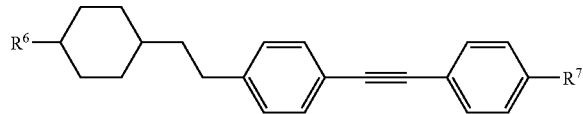
(13-16)
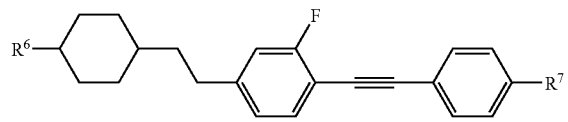
(13-17)
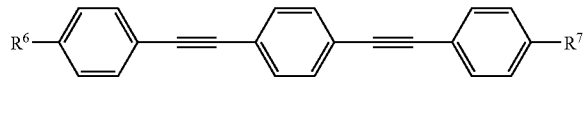
(13-18)
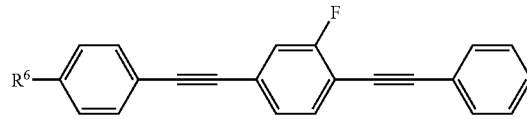
(13-19)
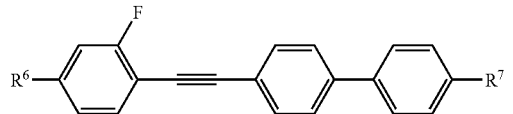
(13-20)
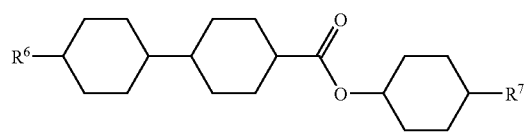
(13-21)
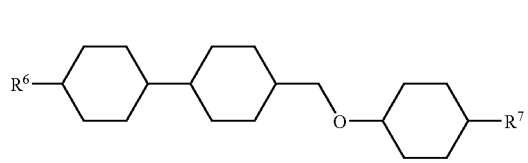
(14-1)
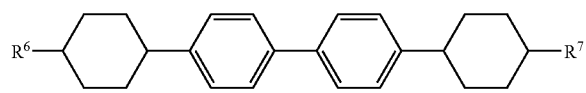
(14-2)
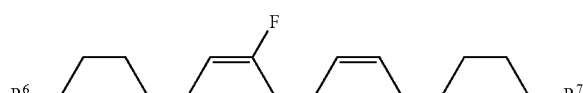
(14-3)
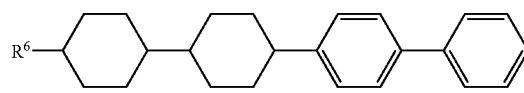
(14-4)
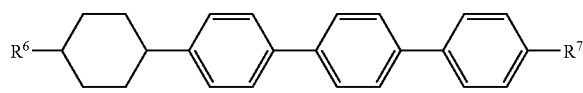

-continued
(14-5)
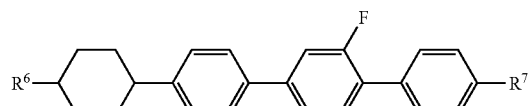
(14-6)
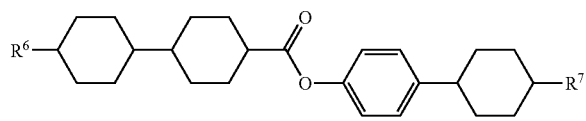
(Op-1)
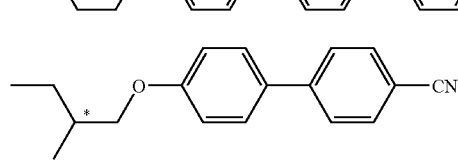
(Op-2)
(Op-3)
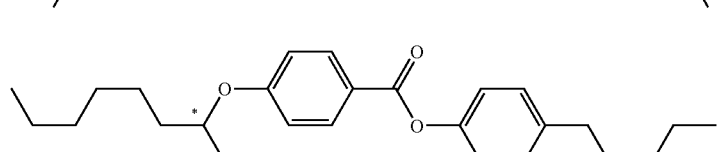
(Op-4)
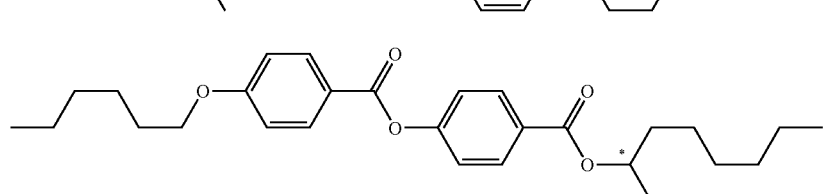
(Op-5)
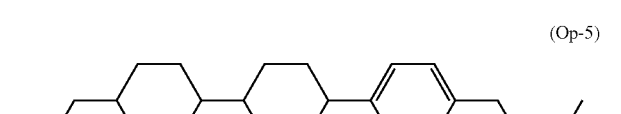
(Op-6)
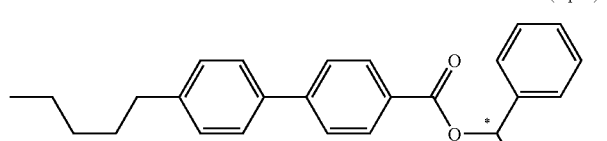
(Op-7)
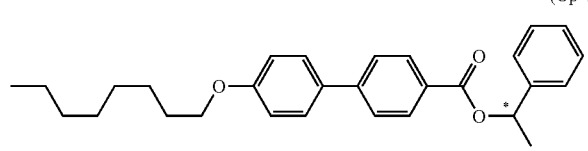
(Op-8)
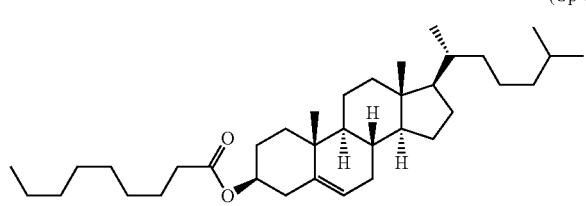
(Op-9)
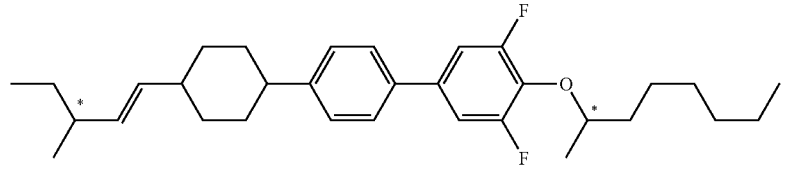
(Op-10)
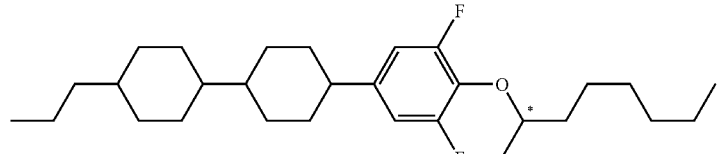
(Op-11)
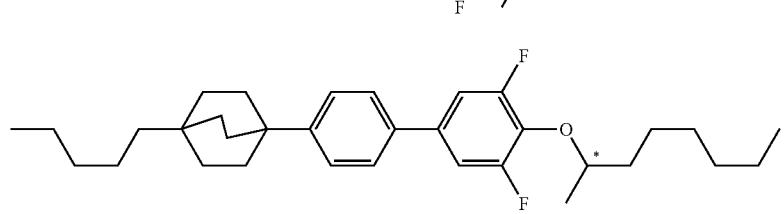

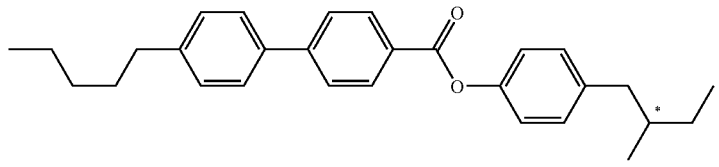
(Op-12)

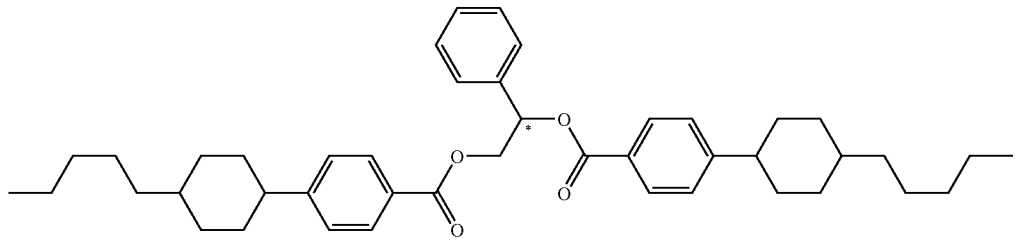
(Op-13)

A composition according to the invention is prepared by a publicly known method. For example, compounds as ingredients are mixed and heated to allow them to dissolve one another. The composition may be added with a suitable additive to adjust physical properties of the composition. Such additive is well known to a person skilled in the art. A dichromatic coloring material being a compound of merocyanine, styril, azo, azomethine, azoxy, quinophtharone, anthraquinone, tetrazine or the like may be added to prepare a composition for a GH element. On the other hand, for the purpose of inducing helical structure of a liquid crystal to give a necessary torsion angle, a chiral dopant is added. Examples of the chiral dopant are aforementioned optical active compounds (Op-1) to (Op-13).

A chiral dopant is added to the composition to adjust a pitch of the torsion. A preferable pitch for a TN element and TN-TFT element is in a range of 40 to 200 μm. A preferable pitch for an STN element is in a range of 6 to 20 μm. A preferable pitch for a BTN element is in a range of 1.5 to 4 μm. A composition for a PC element is added with a relatively large amount of a chiral dopant. At least two chiral dopants may be added for the purpose of adjusting temperature dependency of the pitch.

The composition according to the invention can be used for an element of PC, TN, STN, BTN, ECB, OCB, IPS, VA or the like. These elements may be driven by either PM system or AM system. This composition can also be used for an NCAP (nematic curvilinear aligned phase) element produced by microcapsulating the composition and a PD (polymer dispersed) element such as a PN (polymer network) element prepared by forming a three-dimensional mesh-like polymer compound in the composition.

EXAMPLES

Thirdly, the invention will be explained more particularly by examples. The invention is not limited by these examples. A compound number such as No. 1 corresponds to that of a compound listed in a table in Example 4. Obtained compounds were identified with a nuclear magnetic resonance spectrum, a mass spectrum or the like. In the nuclear magnetic resonance spectrum, s represents a singlet, d represents a doublet, t represents a triplet, q represents a quartet and m represents a multiplet.

Example 1

Synthesis of 7,8-difluoro-2-propylchroman (Compound No. M-1)

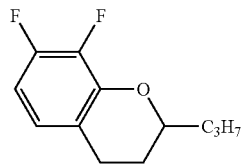

First Step 6-acetyl-2,3-difluorophenol (4.04 g) was dissolved in toluene (40 mL). To the solution was added pyridine (3.82 g), 4-dimethylaminopyridine (0.15 g) while cooling on ice, and further added dropwise n-butyrylchloride (3.52 g). The solution was stirred at the same temperature for 30 minutes and additionally at room temperature for 24 hours. While cooling on ice, the reaction mixture was poured to cold water, which was extracted with toluene. The organic layer was washed sequentially with 1 N hydrochloric acid, water, a saturated sodium bicarbonate solution, water and brine, dried over anhydrous magnesium sulfate, and then concentrated under reduced pressure. Yellow and oily residue (6.36 g) was purified by silica gel column chromatography to obtain colorless and oily 6-acetyl-2,3-difluorophenyl butyrate (5.80 g).

Second Step

Sodium hydride (1.55 g) was suspended in dimethyl sulfoxide (40 mL). To the suspension was added dropwise a dimethyl sulfoxide solution (20 mL) of 6-acetyl-2,3-difluorophenyl butyrate (5.80 g) obtained in the first step at room temperature. After the end of dropping, it was stirred for additional 7 hours at room temperature. The reaction mixture was poured to 0.5 N hydrochloric acid while cooling on ice, which was extracted with ethyl acetate. The organic layer was washed sequentially with water and brine, dried over anhydrous magnesium sulfate, and then concentrated under reduced pressure. Yellow and solid residue (7.47 g) was purified by silica gel column chromatography to obtain yellow and solid 1-(3,4-difluoro-2-hydroxyphenyl)-3-propane-1,3-dion (4.85 g).

Third Step 1-(3,4-difluoro-2-hydroxyphenyl)-3-propane-1,3-dion (5.00 g) obtained in the second step was dissolved in acetic acid (50 mL). To the solution was added concentrated sulfuric acid (0.32 g), which was stirred for 2.5 hours while heating at 100° C. After being left to cool down to room temperature, the reaction mixture was poured to cold water, which was extracted with ethyl acetate. The organic layer was washed sequentially with water, a saturated sodium bicarbonate solution, water and brine, dried over anhydrous magnesium sulfate, and then concentrated under reduced pressure. Red and solid residue (4.65 g) was purified by silica gel column chromatography to obtain orange and solid 7,8-difluoro-2-propyl-4H-chromen-4-one (3.52 g).

Forth Step 7,8-difluoro-2-propyl-4H-chromen-4-one (1.02 g) obtained in the third step was dissolved in SOLMIX (20 mL). To the solution was added a 5% palladium on carbon catalyst (0.51 g) and concentrated hydrochloric acid (2 mL) under nitrogen atmosphere, which was subjected to a hydrogenation reaction at ordinary temperatures and under ordinary pressures for 11 days. After finishing the reaction, the catalyst was removed by filtration and the filtrate was concentrated under reduced pressure. Colorless and oily residue (0.93 g) was purified by silica gel column chromatography to obtain colorless and oily 7,8-difluoro-2-propylchroman (0.85 g).

$^1$H-NMR (CDCl$_3$): δ (ppm) 0.70-2.30 (m, 9H), 2.60-3.15 (m, 2H), 3.90-4.35 (m, 1H), 6.40-7.00 (m, 2H)

Example 2

Synthesis of
7,8-difluoro-2-(4-propylcyclohexyl)chroman
(Compound No. M-21)

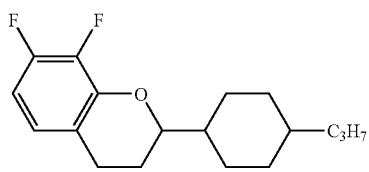

First Step 6-acetyl-2,3-difluorophenol (1.83 g) was dissolved in toluene (20 mL). To the solution was added pyridine (1.82 g) and 4-dimethylaminopyridine (65 mg) while cooling on ice, and further added dropwise 4-propylcyclohexanecarbonyl chloride (2.83 g). It was stirred for 30 minutes at the same temperature, and additional 20 hours at room temperature. The reaction mixture was poured to cold water while cooling on ice, which was extracted with toluene. The organic layer was washed sequentially with 1 N hydrochloric acid, water, a saturated sodium bicarbonate solution, water and brine, dried over anhydrous magnesium sulfate, and then concentrated under reduced pressure. Colorless and oily residue (4.49 g) was purified by silica gel column chromatography to obtain colorless and oily 6-acetyl-2,3-difluorophenyl-4-propylcyclohexane carboxylate (3.72 g).

Second Step

Sodium hydride (0.82 g) was suspended in dimetyl sulfoxide (25 mL). To the suspension was added dropwise a dimethyl sulfoxide solution (15 mL) of 6-acetyl-2,3-difluorophenyl-4-propylcyclohexane carboxylate (3.72 g) obtained in the first step at room temperature. After the end of dropping, it was stirred for additional 5.5 hours at room temperature. The reaction mixture was poured to 1 N hydrochloric acid while cooling on ice, which was extracted with ethyl acetate. The organic layer was washed sequentially with water and brine, dried over anhydrous magnesium sulfate, and concentrated under reduced pressure. Yellow and solid residue (3.93 g) was purified by silica gel column chromatography to obtain orange and solid 1-(3,4-difluoro-2-hydroxyphenyl)-3-(4-propylcyclohexyl)propane-1,3-dion (2.74 g).

Third Step 1-(3,4-difluoro-2-hydroxyphenyl)-3-(4-propylcyclohexyl)propane-1,3-dion (2.74 g) obtained in the second step was dissolved in acetic acid (27 mL). To the solution was added concentrated sulfuric acid (53 mg) and stirred for 3 hours while heating at 110° C. After being left to cool down to room temperature, the reaction mixture was poured to cold water, which was extracted with ethyl acetate. The organic layer was washed sequentially with water, a saturated sodium bicarbonate solution, water and brine, dried over anhydrous magnesium sulfate, and then concentrated under reduced pressure. Yellow and solid residue (2.50 g) was purified by silica gel column chromatography to obtain colorless and solid 7,8-difluoro-2-(4-propylcyclohexyl)-4H-chromen-4-one (2.30 g). The product was further purified by recrystallization.

Forth Step 7,8-difluoro-2-(4-propylcyclohexyl)-4H-chromen-4-one (1.65 g) obtained in the third step was dissolved in a mixed solvent of toluene/SOLMIX (1/4) (33 mL). To the solution was added a 5% palladium on carbon catalyst (0.33 g) and concentrated hydrochloric acid (0.5 mL) under nitrogen atmosphere, which was subjected to a hydrogenation reaction at ordinary temperatures and under ordinary pressures for 3 days. After finishing the reaction, the catalyst was removed by filtration and the filtrate was concentrated under reduced pressure. Colorless and solid residue (1.67 g) was purified by silica gel column chromatography to obtain colorless and solid 7,8-difluoro-2-(4-propylcyclohexyl)chroman-4-ol (1.52 g).

Fifth Step 7,8-difluoro-2-(4-propylcyclohexyl)chroman-4-ol (1.51 g) obtained in the forth step was dissolved in methylene chloride (7.5 mL). To the solution was added trifluoroacetic acid (7.5 mL) while cooling on ice, then added dropwise triethylsilane (1.51 g), and stirred at the same temperature for 3.5 hours. The reaction mixture was poured to cold water, which was extracted with ethyl acetate. The organic layer was washed sequentially with water, a saturated sodium bicarbonate solution, water and brine, dried over anhydrous magnesium sulfate, and then concentrated under reduced pressure. Colorless and solid residue (2.02 g) was purified by silica gel column chromatography to obtain colorless and solid 7,8-difluoro-2-(4-propylcyclohexyl)chroman (1.44 g).

$^1$H-NMR (CDCl$_3$): δ (ppm) 0.40-2.35 (m, 19H), 2.60-2.95 (m, 2H), 3.65-3.95 (m, 1H), 6.40-6.85 (m, 2H)

Example 3

Synthesis of
7-fluoro-2-(4-propylcyclohexyl)chroman
(Compound No. M-23)

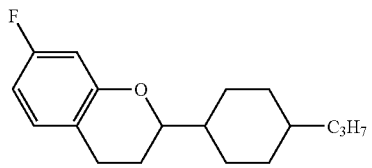

7-fluoro-2-(4-propylcyclohexyl)chroman was obtained by using 6-acetyl-3-fluorophenol as a raw material and in the same way as the first to fifth steps of Example 2.

$^1$H-NMR (CDCl$_3$): δ (ppm) 0.40-2.35 (m, 19H), 2.60-2.95 (m, 2H), 3.65-3.95 (m, 1H), 6.40-7.00 (m, 3H)

Example 4

The following compounds No. M-1 to No. M-92 are synthesized based on examples 1 to 3 and further described synthetic methods. Compounds (No. M-1, No. M-21 and No. M-23) obtained in Examples 1 to 3 are also listed. In compounds No. M-1 to No. M-70, meaning of Rb is the same as that of the symbol described in item 1. Specific examples thereof include hydrogen, —CH$_3$, —C$_2$H$_5$, —C$_3$H$_7$, —C$_4$H$_9$, —C$_5$H$_{10}$, —OCH$_3$, —OC$_2$H$_5$, —OC$_3$H$_7$, —OC$_4$H$_9$, —CH$_2$OCH$_3$, —CH=CF$_2$, —CH=CH$_2$, —CH=CHCH$_3$, —(CH$_2$)$_2$CH=CH$_2$, —(CH$_2$)$_2$CH=CHCH$_3$, —OCF$_3$ and —CF$_3$.

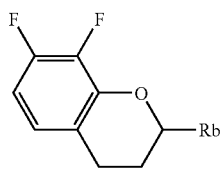
M-1

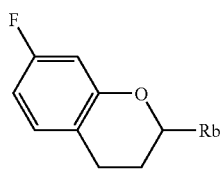
M-2

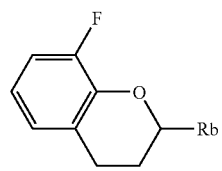
M-3

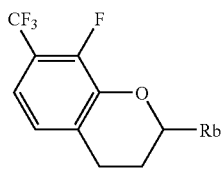
M-4

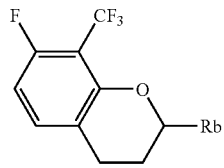
M-5

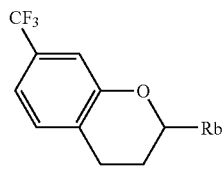
M-6

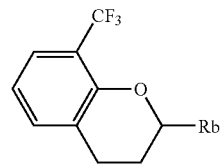
M-7

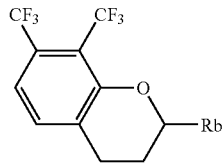
M-8

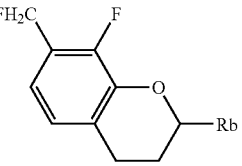
M-9

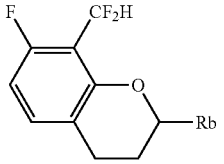
M-10

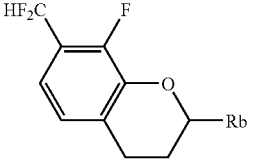
M-11

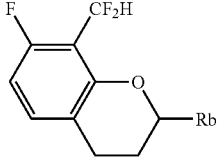
M-12

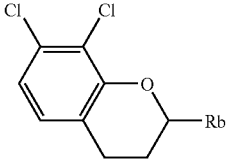
M-13

-continued
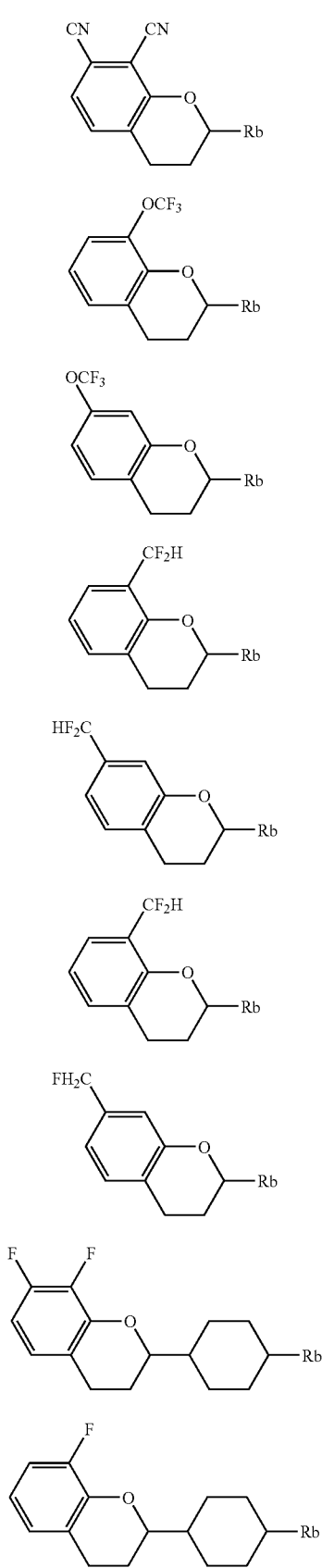
M-14
M-15
M-16
M-17
M-18
M-19
M-20
M-21
M-22
-continued
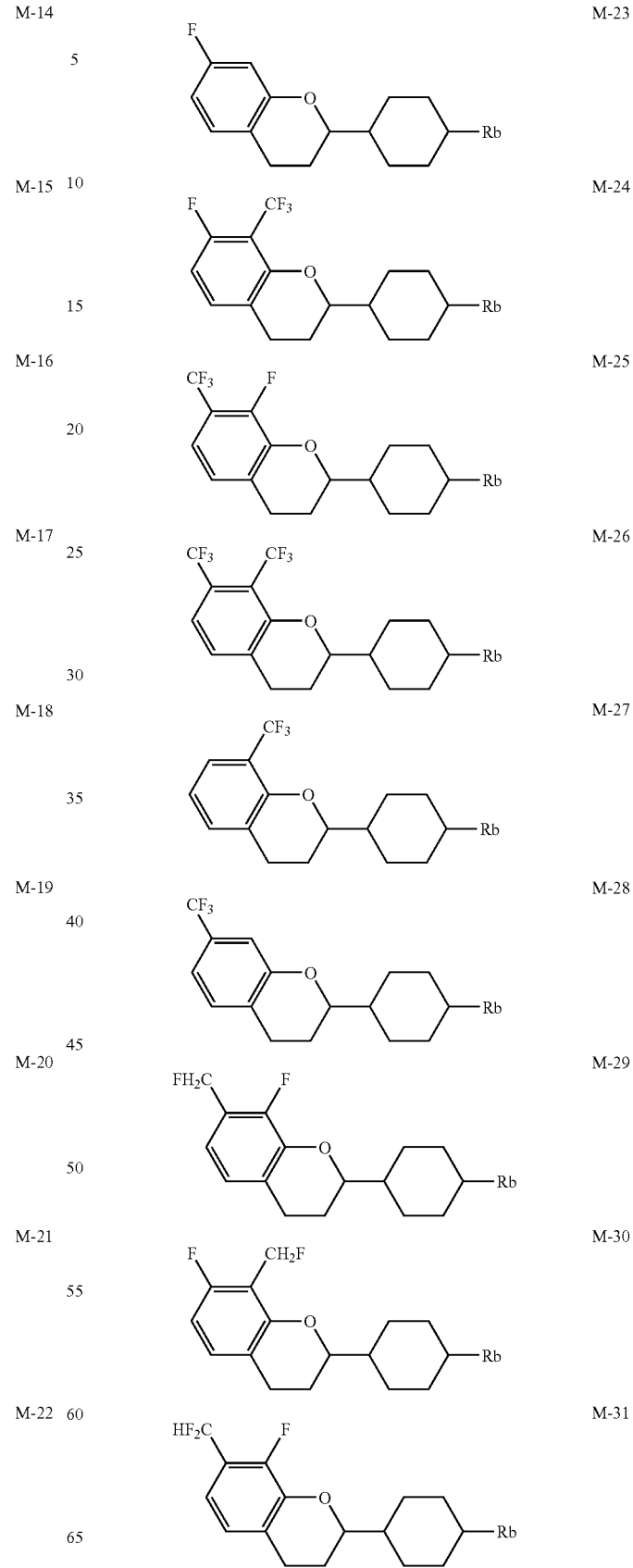
M-23
M-24
M-25
M-26
M-27
M-28
M-29
M-30
M-31

-continued
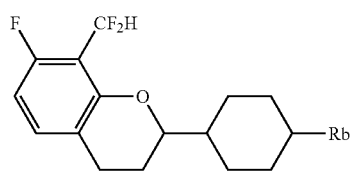
M-32
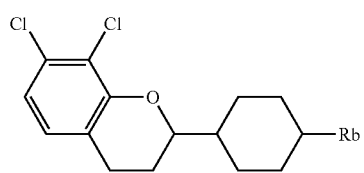
M-33
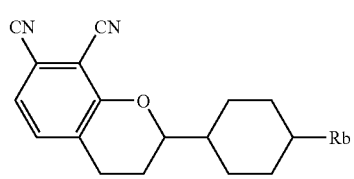
M-34
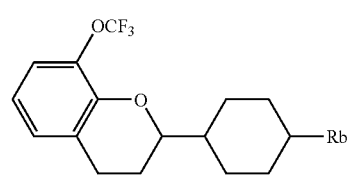
M-35
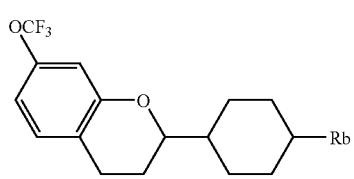
M-36
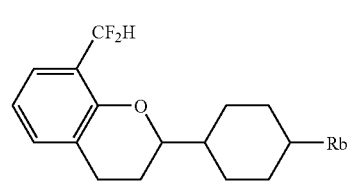
M-37
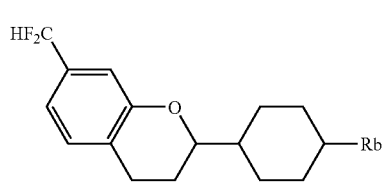
M-38
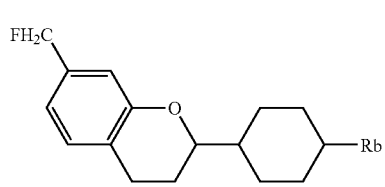
M-39
-continued
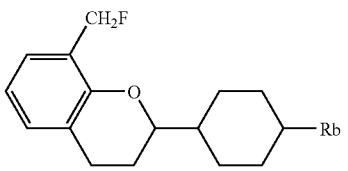
M-40
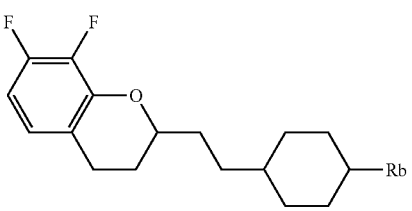
M-41
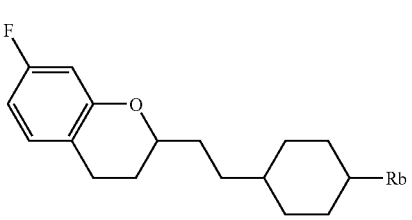
M-42
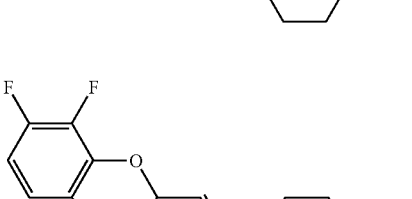
M-43
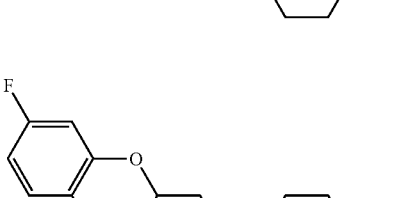
M-44
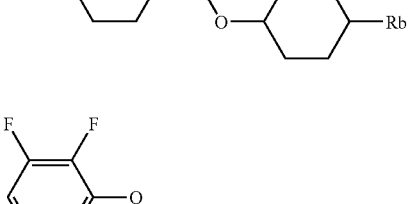
M-45
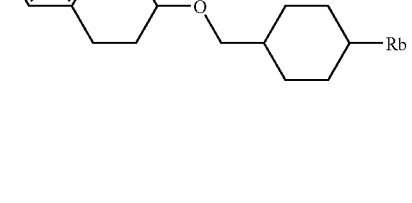
M-46

-continued
M-47
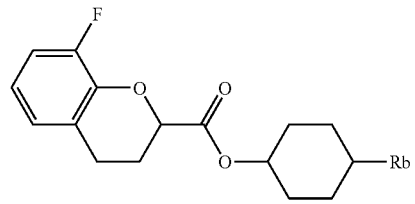
M-48
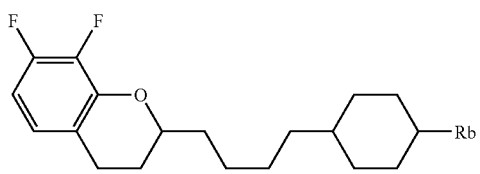
M-49
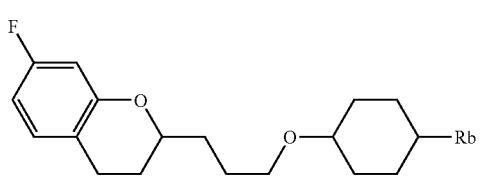
M-50
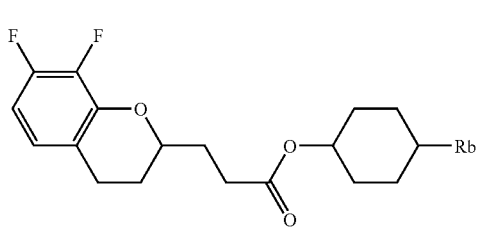
M-51
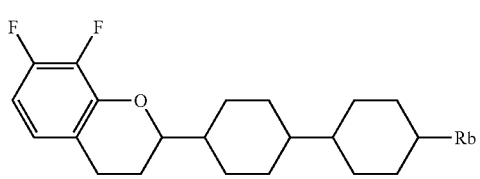
M-52
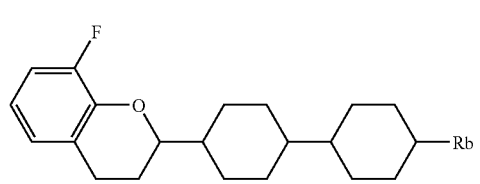
M-53
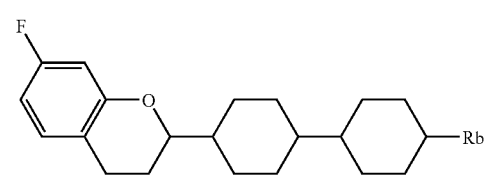
M-54
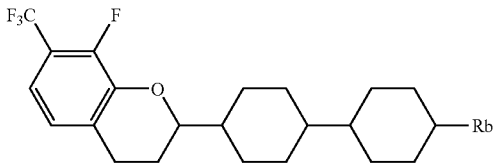
-continued
M-55
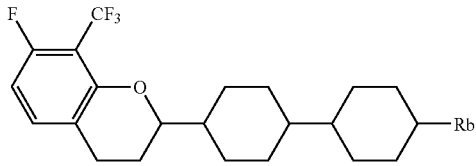
M-56
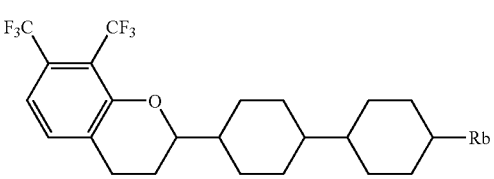
M-57
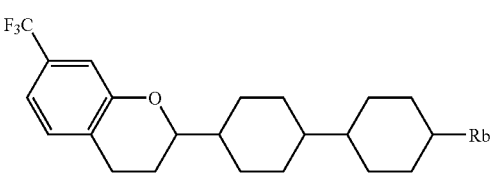
M-58
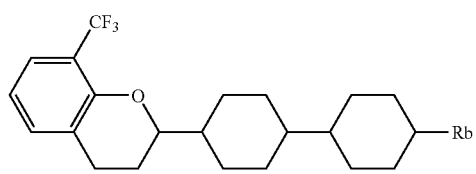
M-59
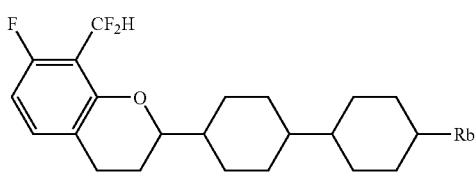
M-60
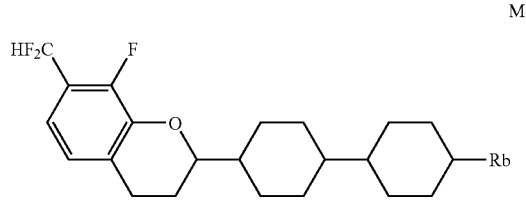
M-61
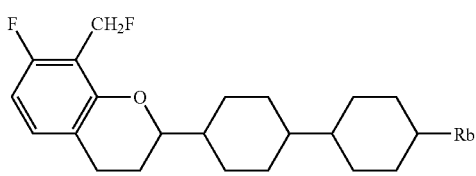
M-62
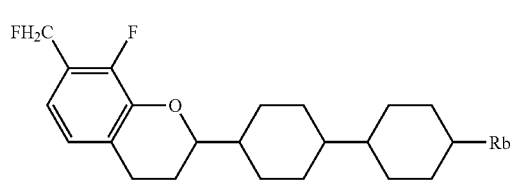
M-63
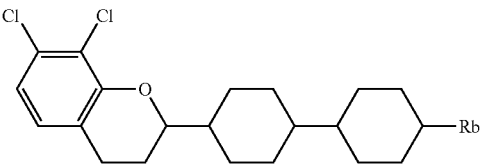

-continued

-continued
M-77
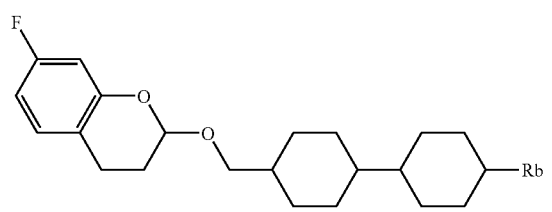
M-78
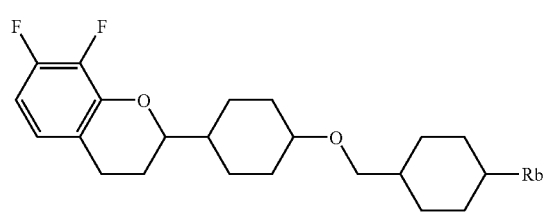
M-79
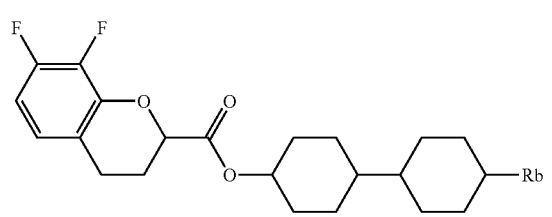
M-80
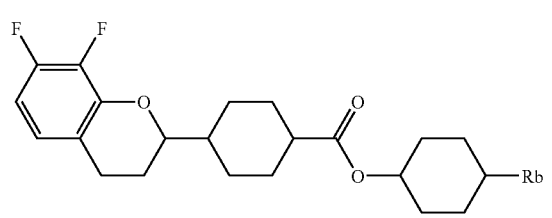
M-81
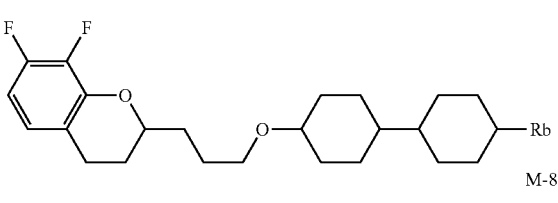
M-82
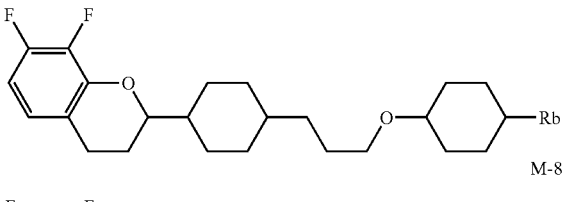
M-83
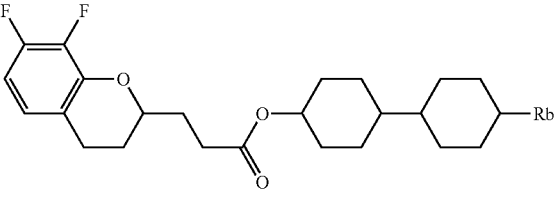
-continued
M-84
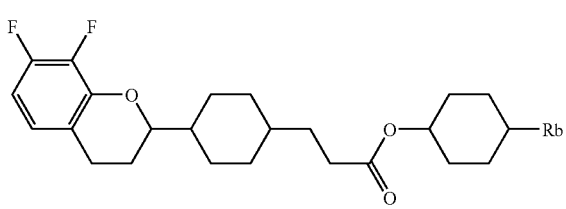
M-85
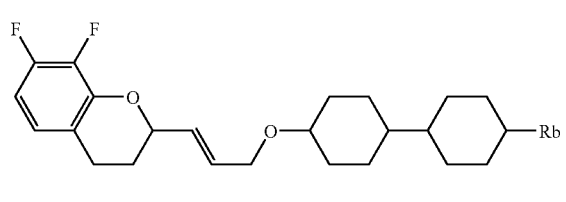
M-86
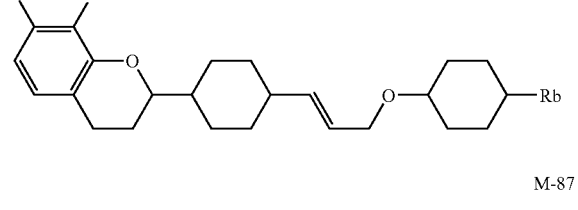
M-87
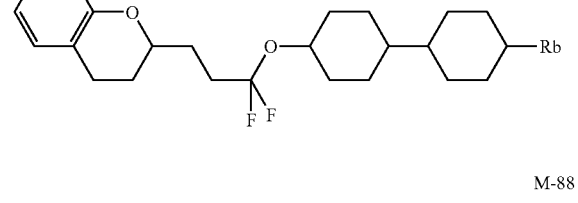
M-88
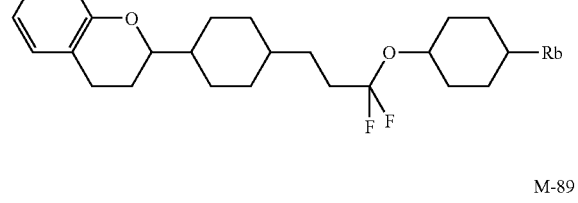
M-89
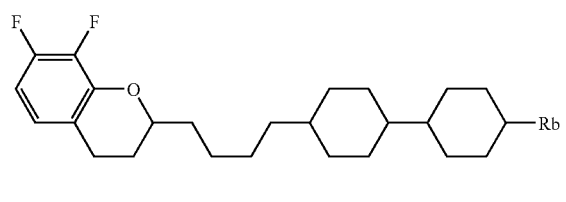
M-90
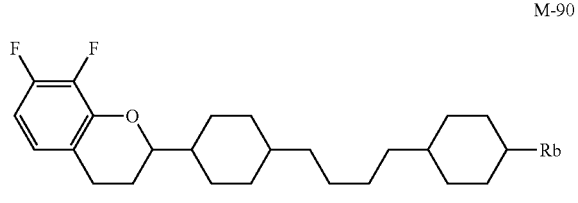

-continued

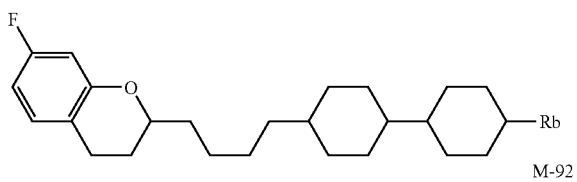

M-91

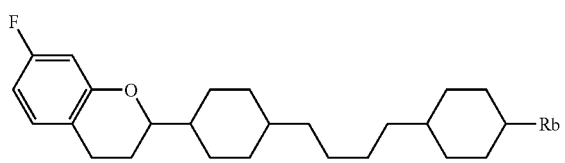

M-92

Example 5

Synthesis of 7,8-difluoro-2-propyl-6-(4-propylcyclohexyl)chroman (compound No. 4)

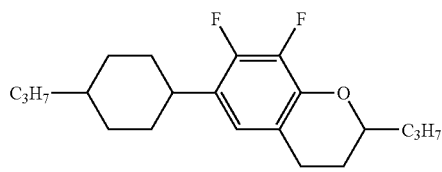

First Step 7,8-difluoro-2-propylchroman (2.50 g) obtained in Example 1 was dissolved in a THF solution (25 mL) followed by dropping with sec-BuLi (0.99 M solution, 14.5 mL) at −70 to −75° C., which was stirred for additional 1 hour at the same temperature. To the solution was added dropwise a THF solution (7 mL) of 4-propylcyclohexanone (2.00 g) at −70 to −75° C. After the end of dropping, it was stirred for additional 3 hours at the same temperature. Then, temperature thereof was raised gradually to room temperature and the solution was left stirring overnight. The reaction mixture was poured to 0.5 M hydrochloric acid, which was extracted with ethyl acetate. The organic layer was washed sequentially with water and brine, dried over anhydrous magnesium sulfate, and then concentrated under reduced pressure. Obtained pale yellow and oily 7,8-difluoro-6-(1-hydroxy-4-propylcyclohexyl)-2-propylchroman (4.87 g) was used in a second step without purification.

Second Step

Crude 7,8-difluoro-6-(1-hydroxy-4-propylcyclohexyl)-2-propylchroman (4.87 g) obtained in the first step was dissolved in toluene (100 mL), added p-toluenesulfonic acid monohydrate (320 mg) and heated to reflux for 4 hours while dehydrating with Dean-Stark apparatus. The reaction mixture was poured to a saturated sodium bicarbonate solution, which was extracted with ethyl acetate. The organic layer was washed sequentially with water and brine, dried over anhydrous magnesium sulfate, and then concentrated under reduced pressure. Obtained orange and oily residue (5.14 g) was purified by silica gel column chromatography to obtain colorless and oily 7,8-difluoro-6-(4-propylcyclohexenyl)-2-propylchroman (4.24 g).

Third Step 7,8-difluoro-6-(4-propylcyclohexenyl)-2-propylchroman (3.94 g) obtained in the second step was dissolved in a mixed solvent of toluene/SOLMIX (toluene and SOLMIX 20 mL, respectively). To the solution was added Raney nickel catalyst (1.38 g) under nitrogen atmosphere and subjected to hydrogenation reaction at ordinary temperatures and under ordinary pressures for 10 days. After finishing the reaction, the catalyst was removed by filtration and the filtrate was concentrated under reduced pressure. Colorless and oily residue (3.87 g) was purified by silica gel column chromatography to obtain colorless and oily 7,8-difluoro-6-(4-propylcyclohexyl)-2-propylchroman (3.56 g). The product was further purified by repeating recrystallization to obtain pure 7,8-difluoro-6-(4-propylcyclohexyl)-2-propylchroman.

$^1$H-NMR (CDCl$_3$): δ (ppm) 0.55-2.15 (m, 25H), 2.40-2.95 (m, 3H), 3.80-4.10 (m, 1H), 6.40-6.65 (d, J=8 Hz, 1H) MS: 336 (M$^+$)

Example 6

Synthesis of 7,8-difluoro-6-ethoxy-2-(4-propylcyclohexyl)chroman (compound No. 78)

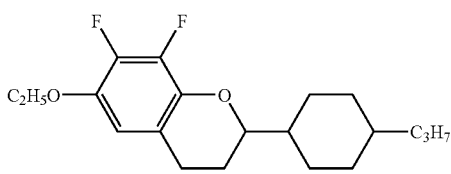

First Step 7,8-difluoro-2-(4-propylcyclohexyl)chroman (3.82 g) obtained in Example 2 was dissolved in THF (38 mL). To the solution was added dropwise sec-BuLi (0.99 M solution, 15.5 mL) at −70 to −75° C. and stirred after the end of dropping at the same temperature for additional 1 hour. To the solution was added dropwise a THF solution (5 mL) of triisopropyl borate (2.15 g) at −70 to −75° C. After the end of dropping, it was stirred at the same temperature for additional 3 hours. Then temperature thereof was gradually raised to room temperature. The solution was left stirring overnight. While cooling on ice, to the reaction mixture was added 2 M hydrochloric acid and stirred at room temperature for additional 2 hours. The reaction mixture was poured to water, which was extracted with ethyl acetate. The organic layer was washed sequentially with water and brine, dried over anhydrous magnesium sulfate, and then concentrated under reduced pressure. The concentrated residue was further washed with heptane to obtain crude 7,8-difluoro-6-dihydroxyboryl-2-(4-propylcyclohexyl)chroman. The product was used in a second step without purification.

Second Step

Crude 7,8-difluoro-6-dihydroxyboryl-2-(4-propylcyclohexyl)chroman obtained in the first step was dissolved in tetrahydrofuran (38 mL). To the solution was slowly added dropwise a hydrogen peroxide solution (3.23 g) at room temperature and left stirring for 8 hours. The reaction mixture was poured to a sodium sulfite aqueous solution, which was extracted with ethyl acetate. The organic layer was washed sequentially with water and brine, dried over anhydrous magnesium sulfate, and then concentrated under reduced pressure. Yellow and solid residue (4.63 g) was purified by silica gel column chromatography to obtain colorless and solid 7,8-difluoro-6-hydroxy-2-(4-propylcyclohexyl)chroman (3.77 g).

Third Step 7,8-difluoro-6-hydroxy-2-(4-propylcyclohexyl)chroman (1.89 g) obtained in the second step was dissolved in N,N-dimethylformamide (20 mL). After being suspended with potassium carbonate (1.77 g), it was added with ethyl iodide (1.55 g) and tetrabutylammonium bromide (0.22 g), and stirred at 60° C. for 6.5 hours. After finishing the reaction, the reaction mixture was poured to water, which was extracted with ethyl acetate. The organic layer was sequentially washed with water and brine, dried over anhydrous magnesium sulfate, and then concentrated under reduced pressure. Colorless and solid residue (2.04 g) was purified by silica gel column chromatography to obtain colorless and solid 7,8-difluoro-6-ethoxy-2-(4-propylcyclohexyl)chroman (2.03 g). The product was further purified by repeating recrystallization to obtain pure 7,8-difluoro-6-ethoxy-2-(4-propylcyclohexyl)chroman (1.88 g).

$^1$H-NMR (CDCl$_3$): δ (ppm) 0.85-2.17 (m, 22H), 2.67 (dt, J=16 Hz, 5 Hz, 1H), 2.74 (ddd, J=16 Hz, 11 Hz, 6 Hz, 1H), 3.72 (ddd, J=10 Hz, 7 Hz, 2 Hz, 1H), 4.02 (q, J=7 Hz, 2H), 6.40 (dd, J=8 Hz, 2 Hz, 1H) MS: 338 (M$^+$)

Example 7

Synthesis of
7,8-difluoro-6-ethyl-2-(4-propylcyclohexyl)chroman
(compound No. 331)

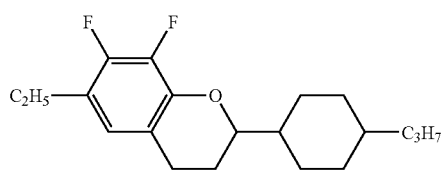

First Step 7,8-difluoro-2-(4-propylcyclohexyl)chroman (1.43 g) obtained in Example 2 was dissolved in THF (15 mL). To the solution was added dropwise sec-BuLi (0.97 M solution, 6.5 mL) at −70 to −75° C. After the end of dropping, it was stirred at the same temperature for additional 1.5 hours. To the solution was added dropwise bromine (1.47 g) at −70 to −75° C. After the end of dropping, it was stirred at the same temperature for additional 2.5 hours. While cooling on ice, the reaction mixture was poured to 1 M hydrochloric acid, which was extracted with ethyl acetate. The organic layer was washed sequentially with water, a 5% aqueous solution of sodium thiosulfate, water and brine, dried over anhydrous magnesium sulfate, and then concentrated under reduced pressure. Pale yellow and solid residue (1.85 g) was purified by silica gel column chromatography to obtain colorless and solid 7,8-difluoro-6-bromo-2-(4-propylcyclohexyl)chroman (1.71 g).

Second Step 7,8-difluoro-6-bromo-2-(4-propylcyclohexyl)chroman (1.71 g) obtained in the first step was dissolved in tetrahydrofuran (17 mL). To the solution was added dropwise sec-BuLi (0.97 M solution, 6.5 mL) at −70 to −75° C. After the end of dropping, it was stirred for additional 2 hours at the same temperature. To the solution was added dropwise N,N-dimethylformamide (0.55 g) at −70 to −75° C. After the end of dropping, it was stirred for additional 5 hours at the same temperature. The reaction mixture was poured to 1 M hydrochloric acid, which was extracted with ethyl acetate. The organic layer was washed sequentially with water and brine, dried over anhydrous magnesium sulfate, and then concentrated under reduced pressure. Pale yellow and solid residue (1.39 g) was purified by silica gel column chromatography to obtain pale yellow and solid 7,8-difluoro-6-formyl-2-(4-propylcyclohexyl)chroman (0.99 g).

Third Step

Methyltriphenylphosphonium bromide (2.06 g) was suspended in tetrahydrofuran (20 mL). To this suspension was added potassium tert-butoxide (626 mg) at −60° C. and stirred for additional 1 hour at the same temperature. To this suspension was added dropwise a tetrahydrofuran solution (10 mL) of 7,8-difluoro-6-formyl-2-(4-propylcyclohexyl)chroman (1.19 g) at −60° C. After the end of dropping, it was stirred for additional 3 hours at the same temperature. Then the temperature thereof was gradually raised to room temperature. The suspension was left stirring overnight. The reaction mixture was poured to 1 M hydrochloric acid, which was extracted with ethyl acetate. The organic layer was sequentially washed with water and brine, dried over anhydrous magnesium sulfate, and then concentrated under reduced pressure. Pale yellow and solid residue (2.72 g) was purified by silica gel column chromatography to obtain colorless and solid 7,8-difluoro-6-ethynyl-2-(4-propylcyclohexyl)chroman (1.02 g).

Forth Step 7,8-difluoro-6-ethynyl-2-(4-propylcyclohexyl)chroman (1.02 g) obtained in the third step was dissolved in a mixed solvent of toluene/SOLMIX (toluene, SOLMIX: 10 mL, respectively). To the solution was added a 5% palladium on carbon catalyst (0.12 g) under nitrogen atmosphere and subjected to hydrogenation reaction for 25.5 hours at ordinary temperatures and under ordinary pressures. After finishing the reaction, the catalyst was removed by filtration and the filtrate was concentrated under reduced pressure. Colorless and oily residue (1.14 g) was purified by silica gel column chromatography to obtain colorless and oily 7,8-difluoro-6-ethyl-2-(4-propylcyclohexyl)chroman (1.12 g). The product was further purified by repeating recrystallization to obtain pure 7,8-difluoro-6-ethyl-2-(4-propylcyclohexyl)chroman (0.95 g)

$^1$H-NMR (CDCl$_3$): δ (ppm) 0.85-2.17 (m, 22H), 2.64-2.79 (m, 4H), 3.72 (ddd, J=9.7 Hz, 6.6 Hz, 2.1 Hz, 1H), 6.75 (dd, J=8.2 Hz, 1.6 Hz, 1H) MS: 322 (M$^+$)

Example 8

Synthesis of
6-ethoxy-7-fluoro-2-(4-propylcyclohexyl)chroman
(compound No. 76)

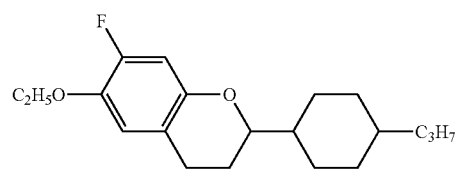

6-ethoxy-7-fluoro-2-(4-propylcyclohexyl)chroman was obtained by using 7-fluoro-2-(4-propylcyclohexyl)chroman obtained in Example 6 as a raw material and in the same way as steps 1 to 3 in Example 5.

$^1$H-NMR (CDCl$_3$): δ (ppm) 0.85-2.17 (m, 22H), 2.67 (dt, J=16 Hz, 4 Hz, 1H), 2.74 (ddd, J=16 Hz, 11 Hz, 6 Hz, 1H), 3.72 (ddd, J=10 Hz, 7 Hz, 2 Hz, 1H), 4.02 (q, J=7 Hz, 2H), 6.37-6.42 (m, 1H), 6.55-6.60 (m, 1H) MS: 320 (M$^+$)

Example 9

Following compounds No. 1 to No. 364 are synthesized based on Examples 1 to 8 and further described synthetic methods. Compounds obtained in Examples 5 to 8 (No. 4, No. 78, No. 331 and No. 76) are also listed. Measurement procedures of the upper limit temperature, viscosity, optical anisotropy and dielectric anisotropy will be explained by a composition example.

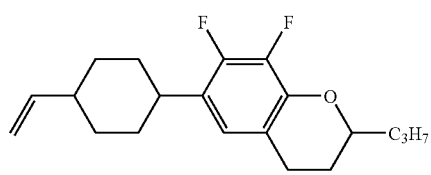
1

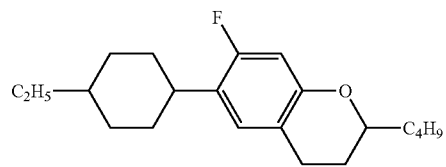
2

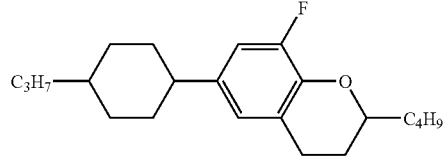
3

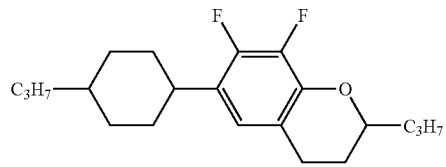
4

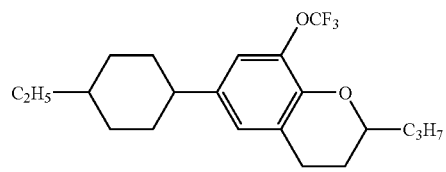
5

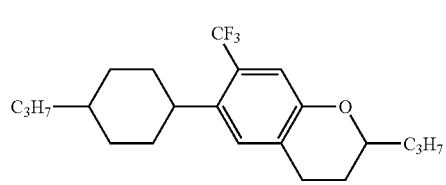
6

-continued

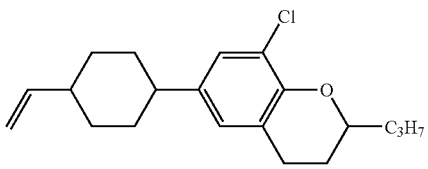
7

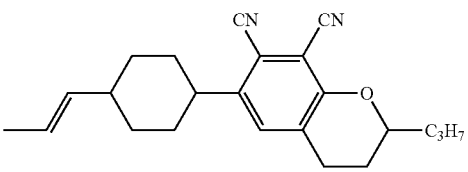
8

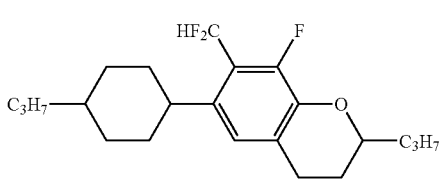
9

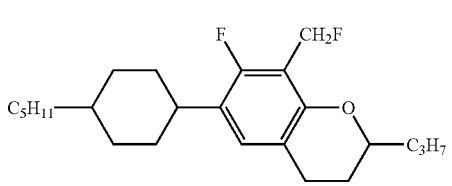
10

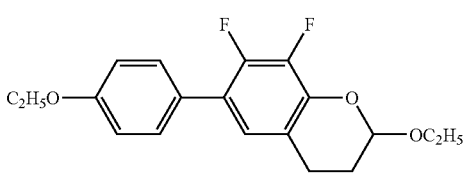
11

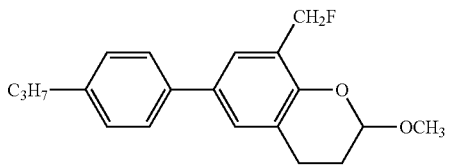
12

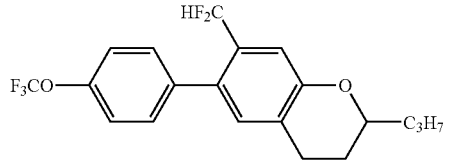
13

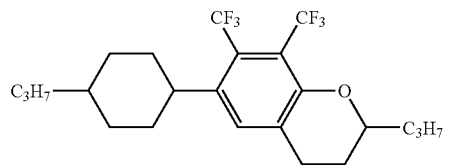
14

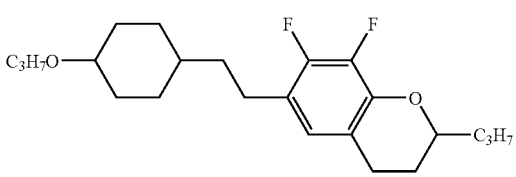
15

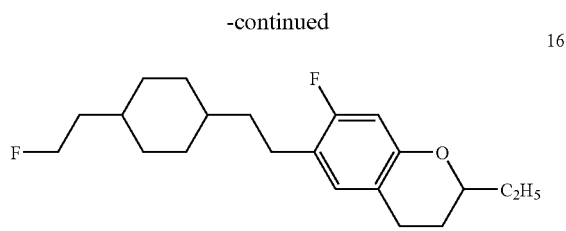
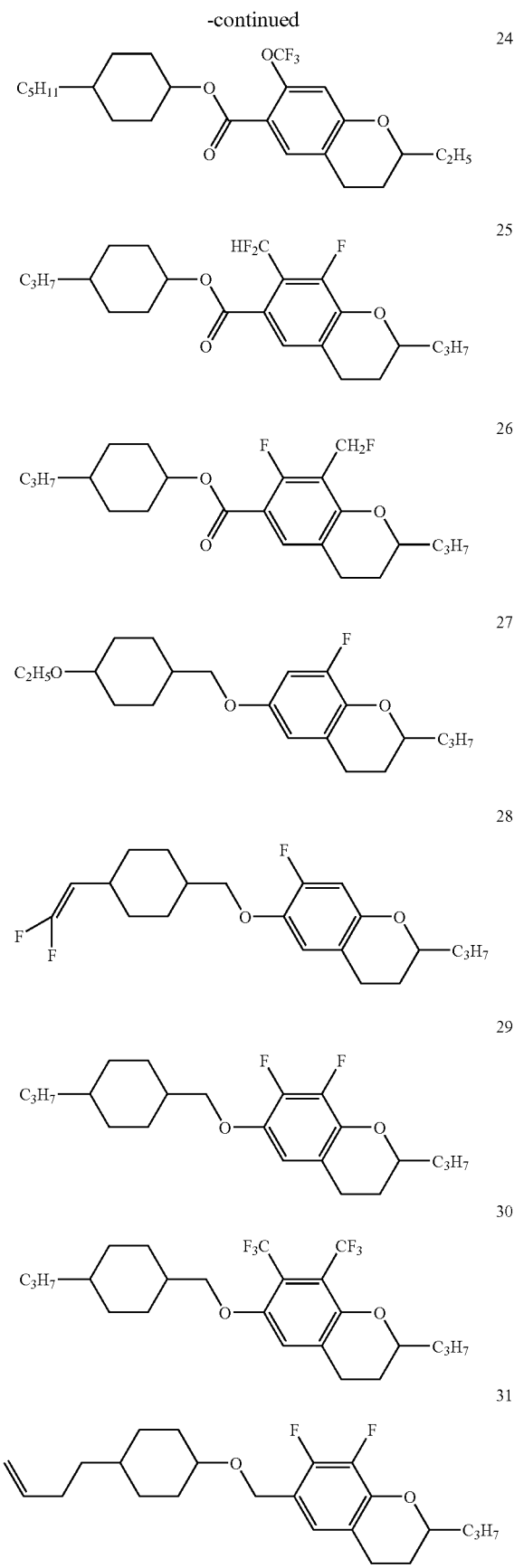

-continued
32 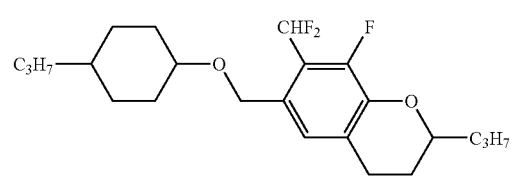
33 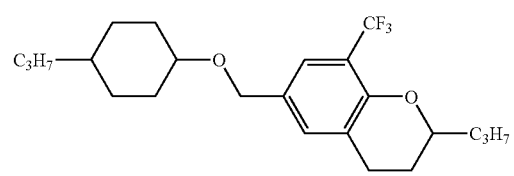
34 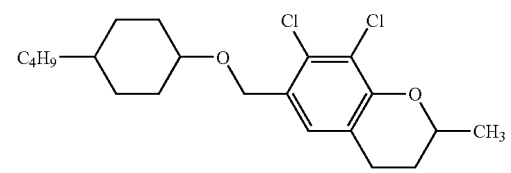
35 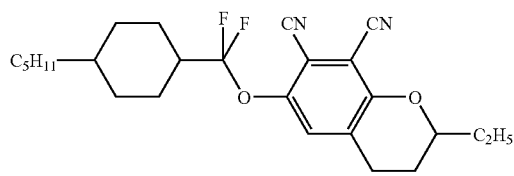
36 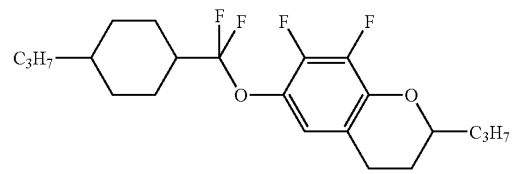
37 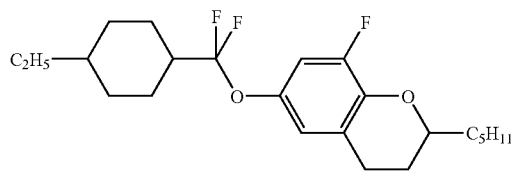
38 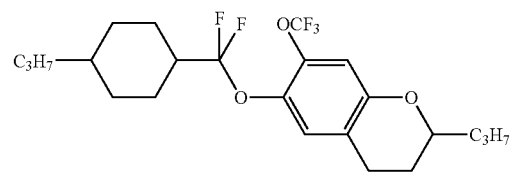
39 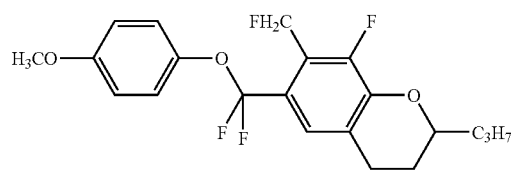
40 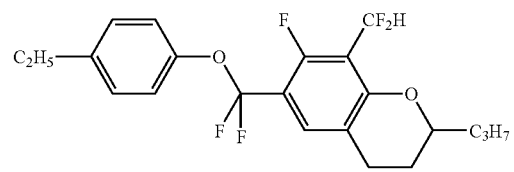
-continued
41 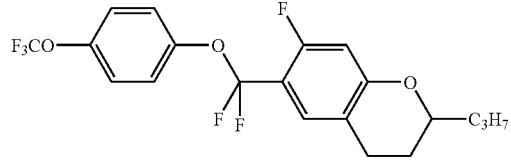
42 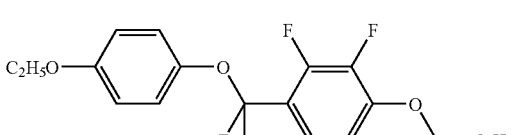
43 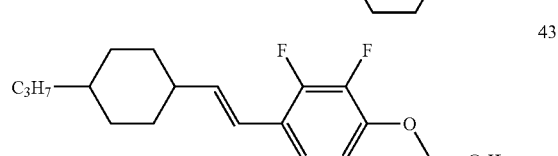
44 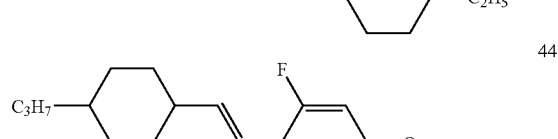
45 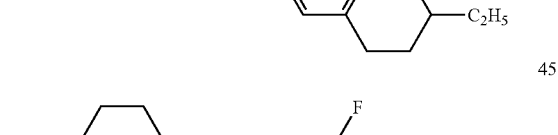
46 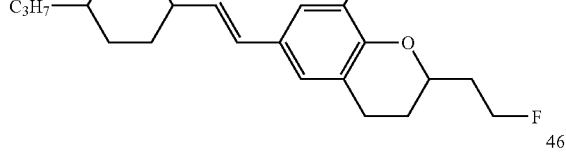
47 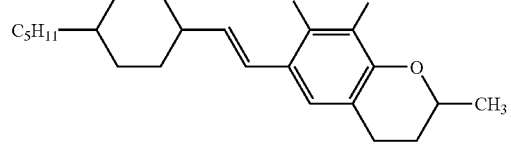
48 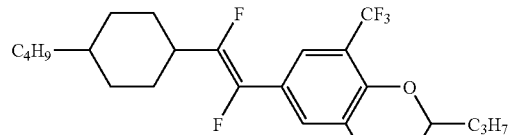
49 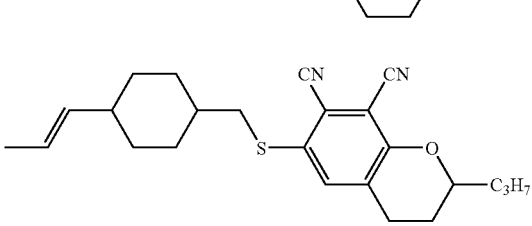

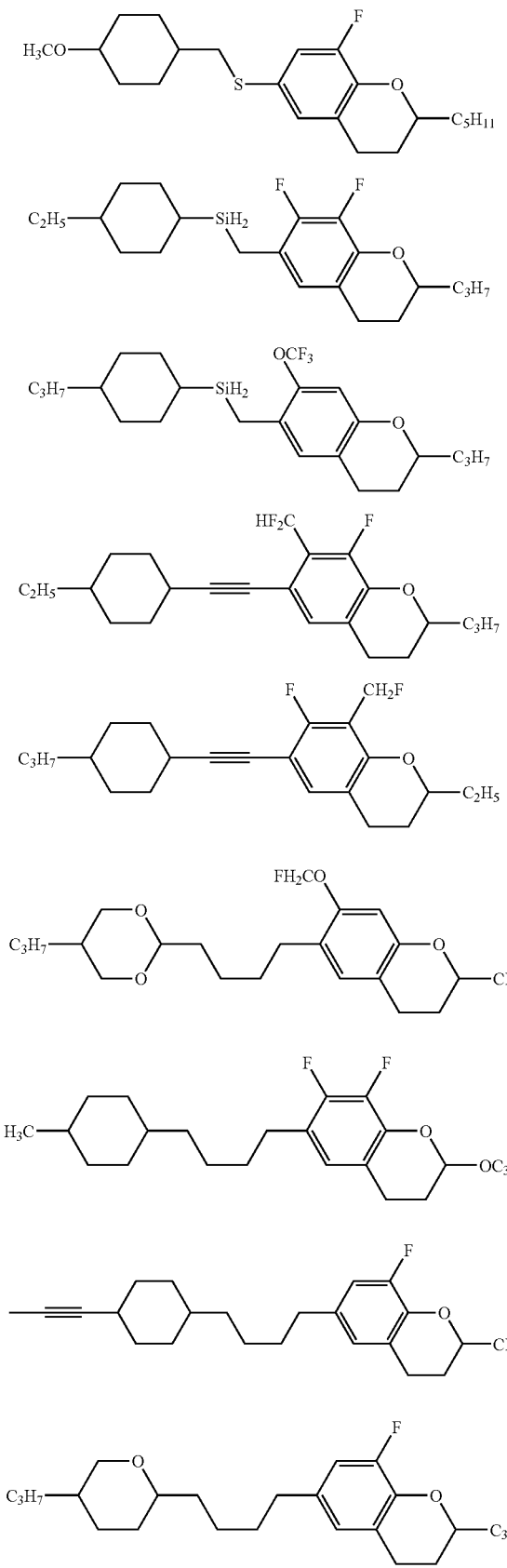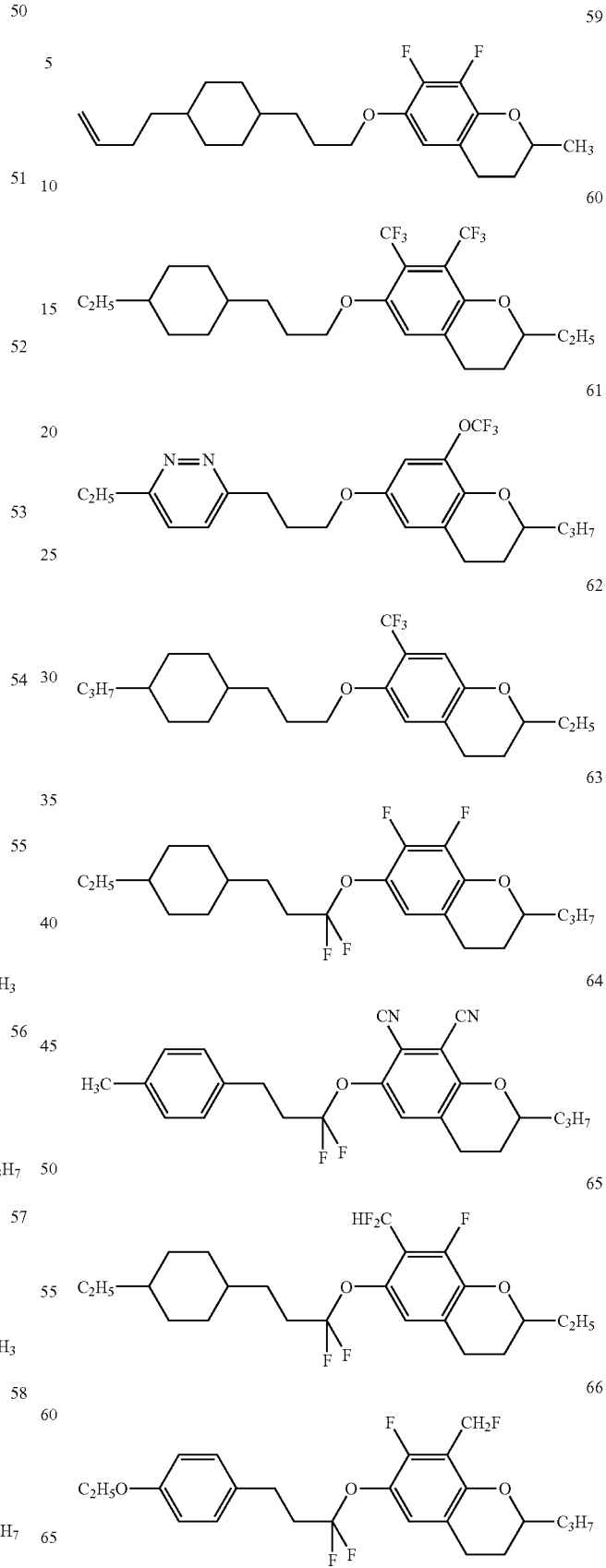

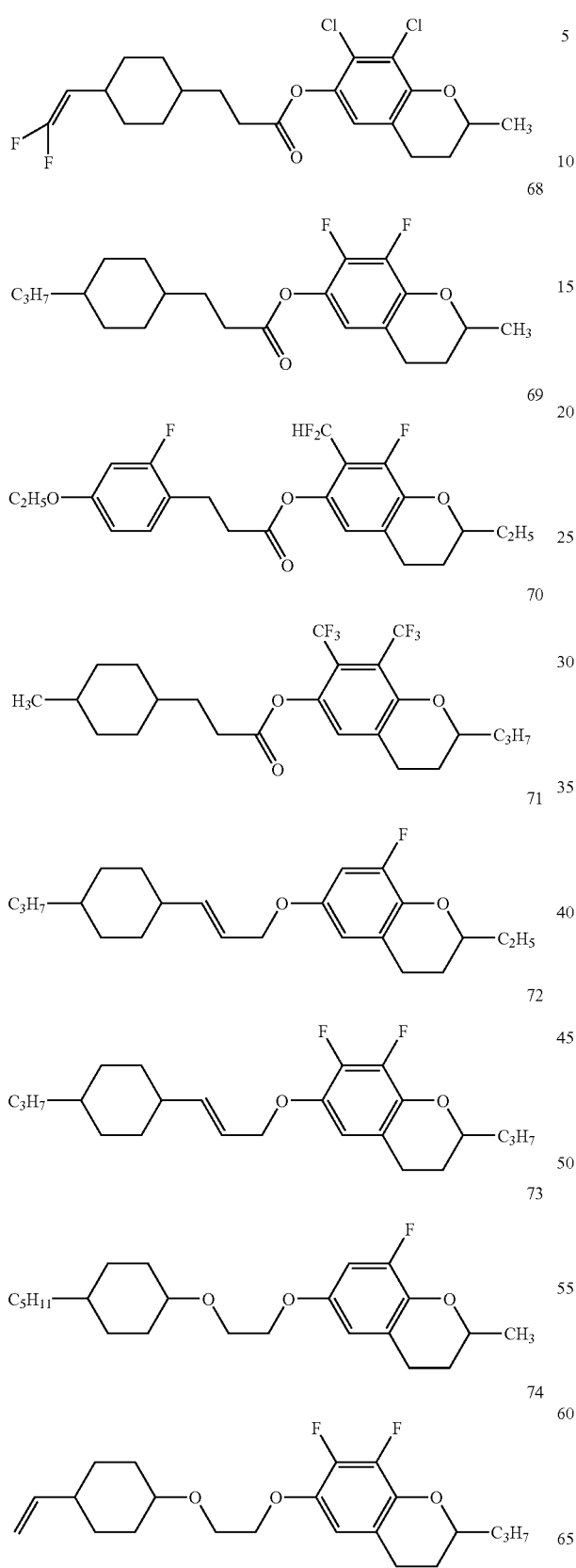

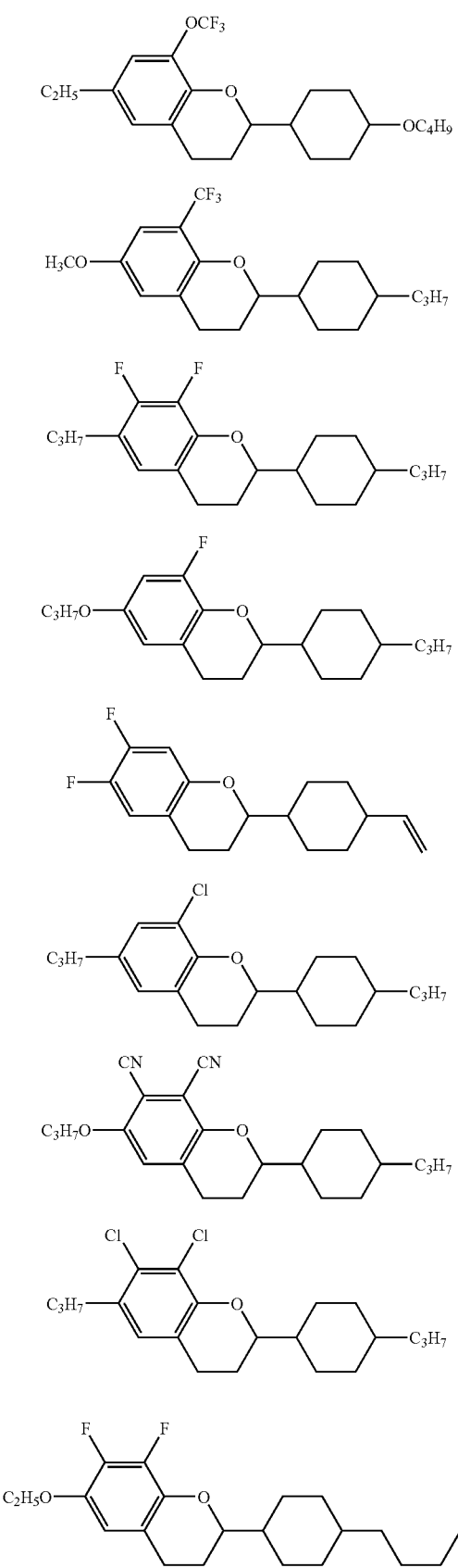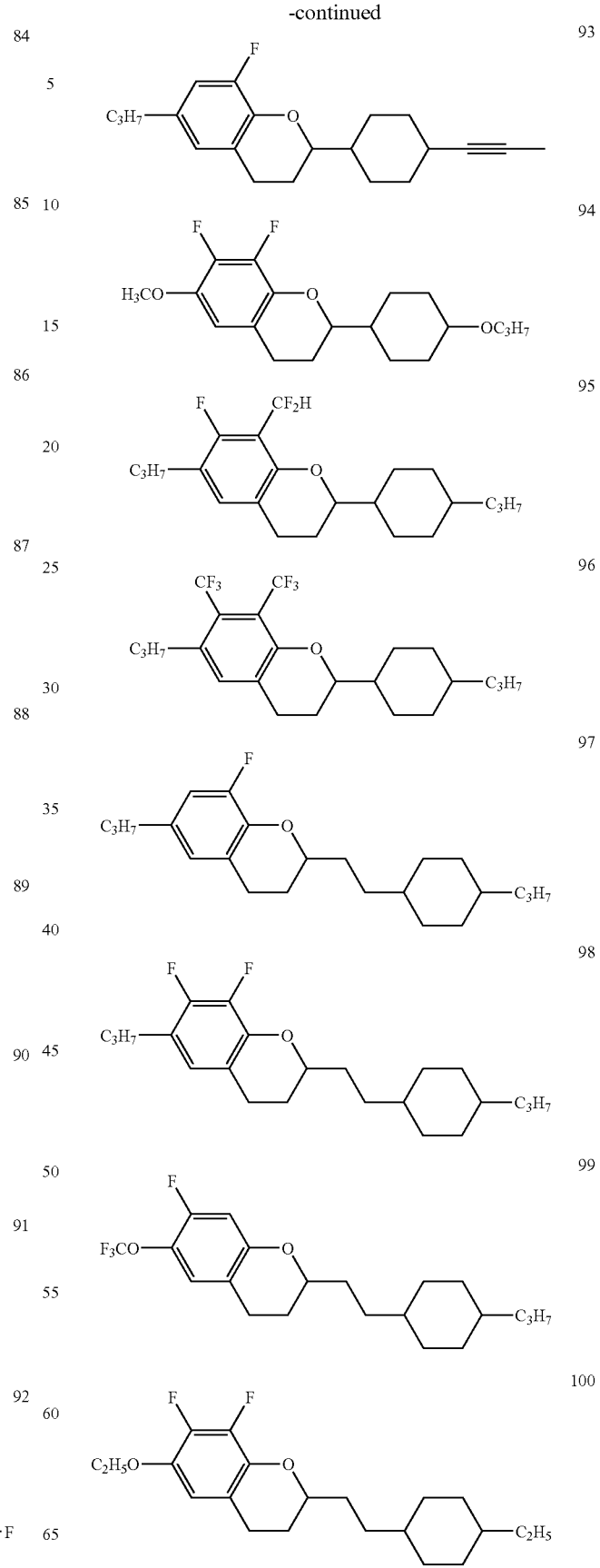

-continued
101
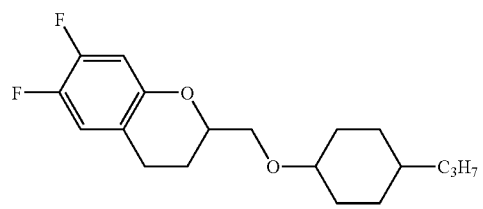
102
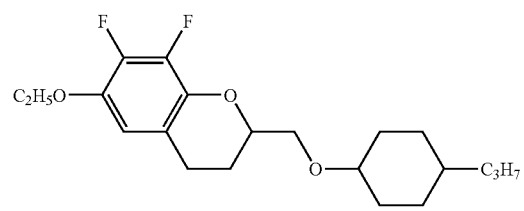
103
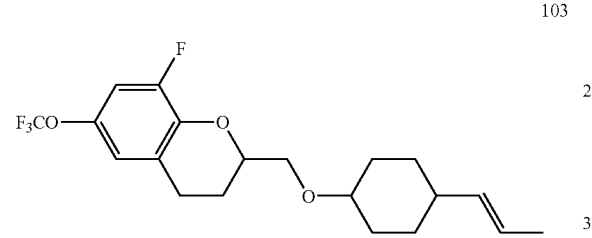
104
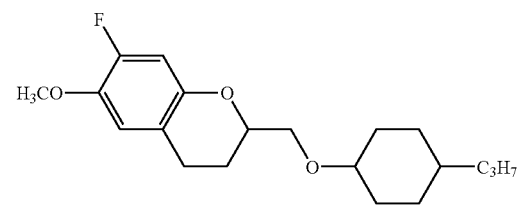
105
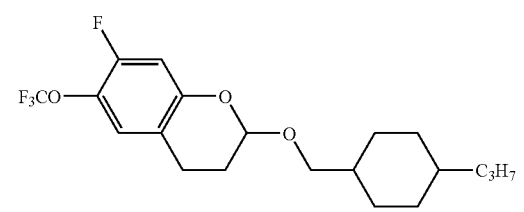
106
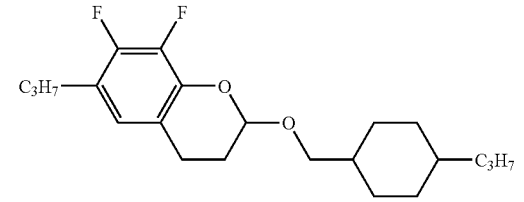
107
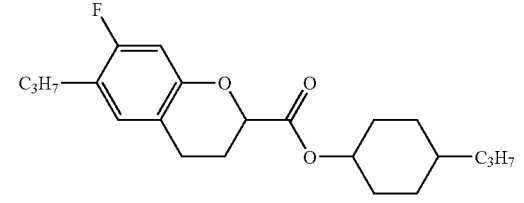
-continued
108
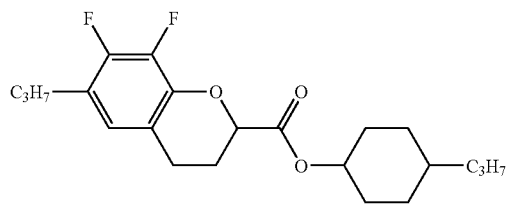
109
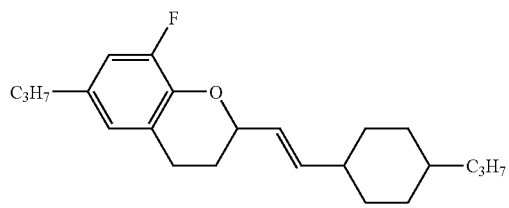
110
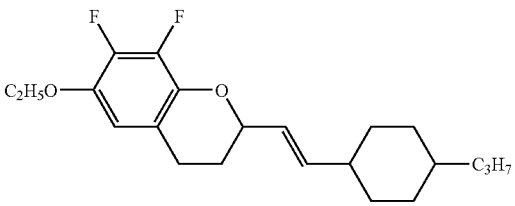
111
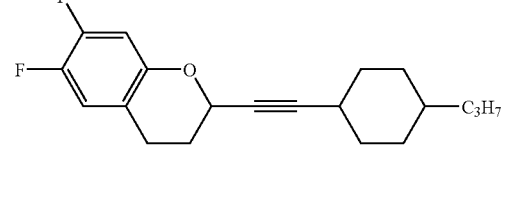
112
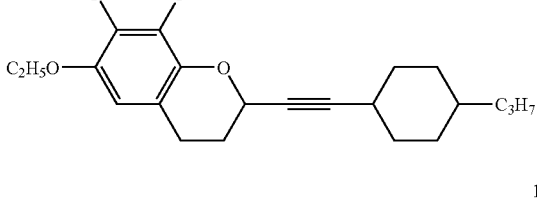
113
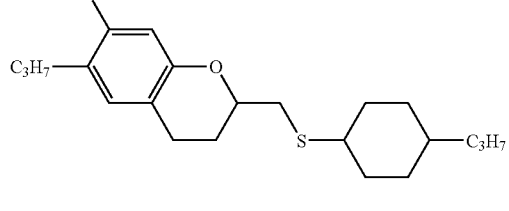
114
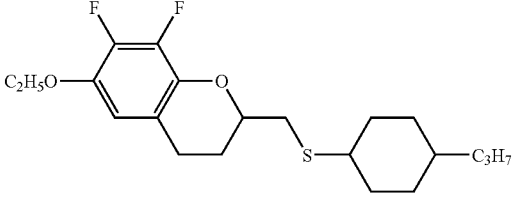

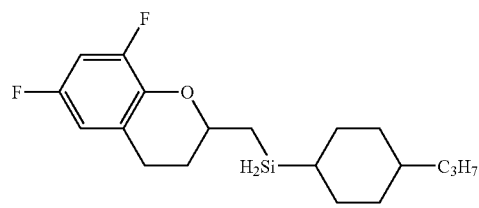
115
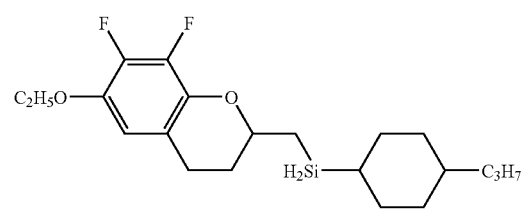
116
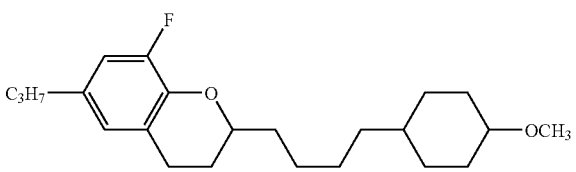
117
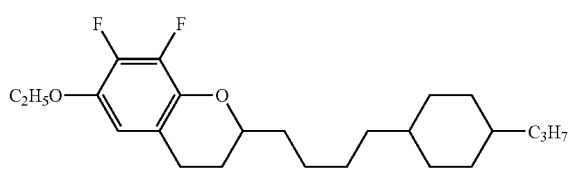
118
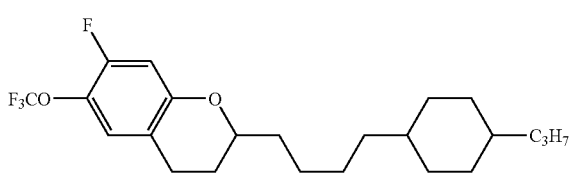
119
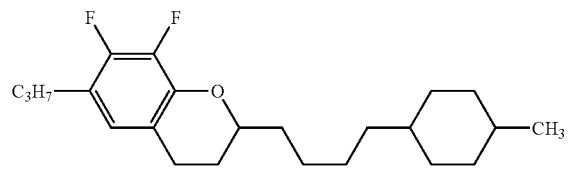
120
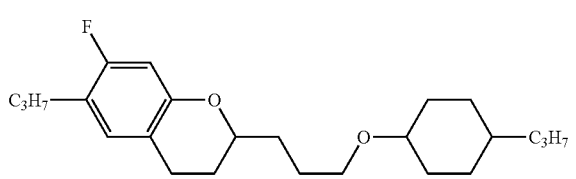
121
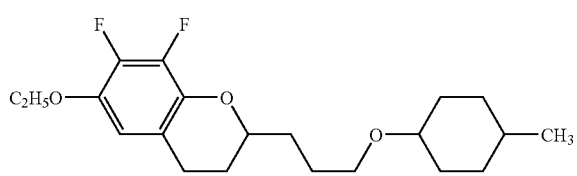
122
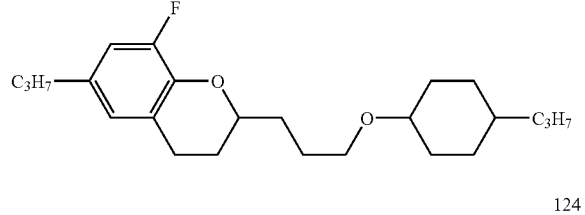
123
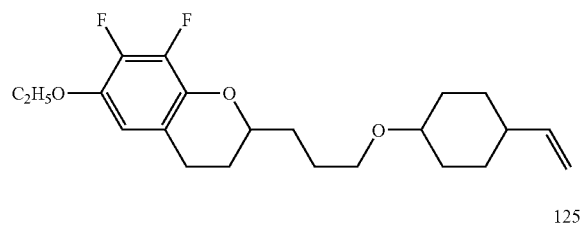
124
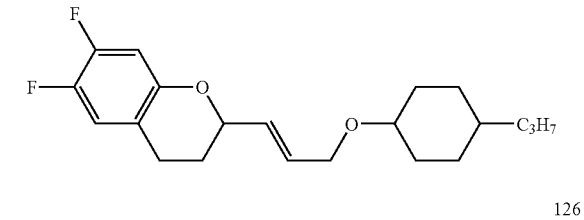
125
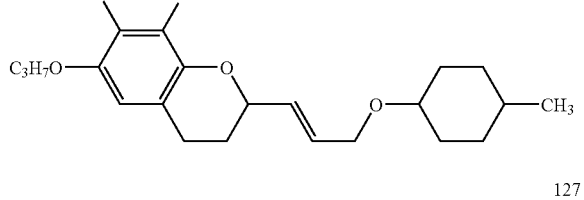
126
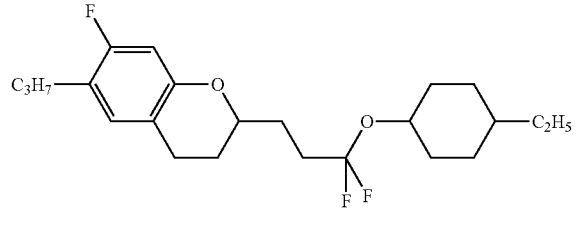
127
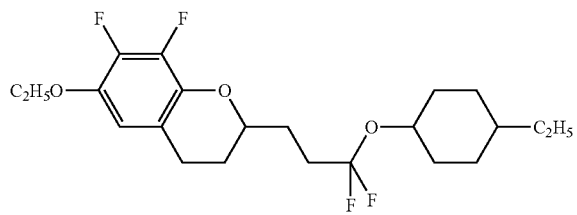
128

-continued
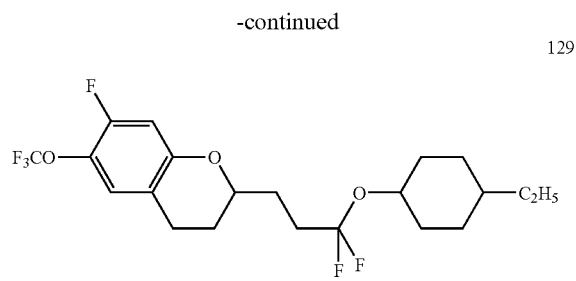
129
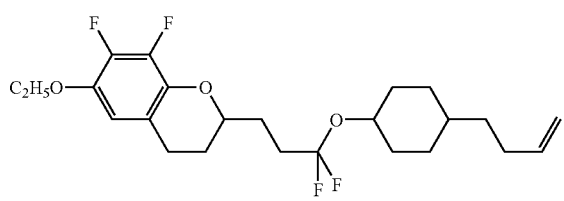
130
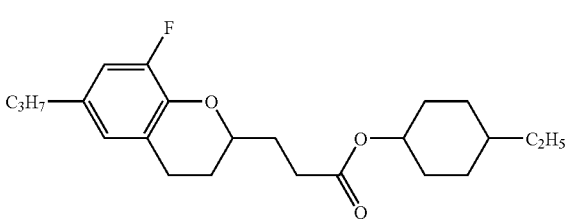
131
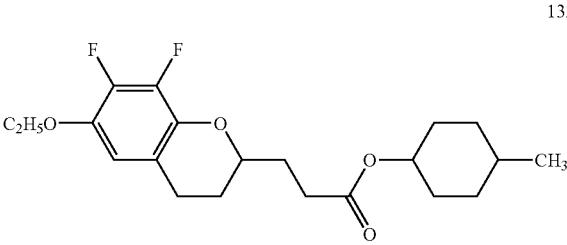
132
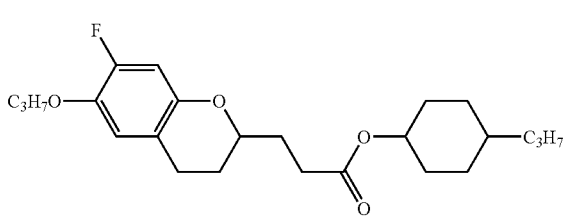
133
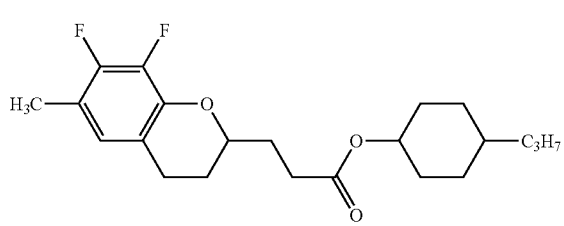
134
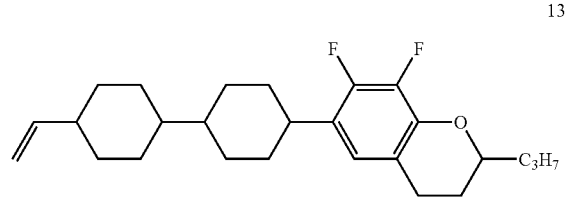
135
-continued
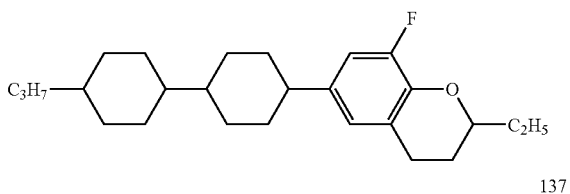
136
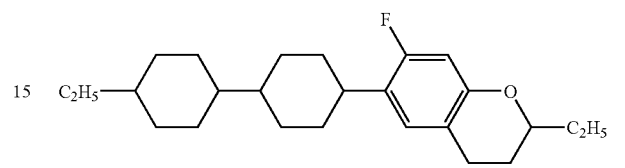
137
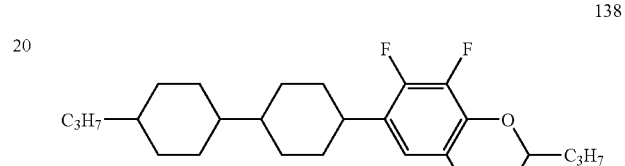
138
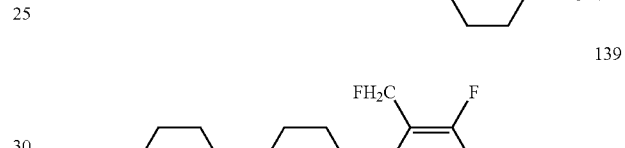
139
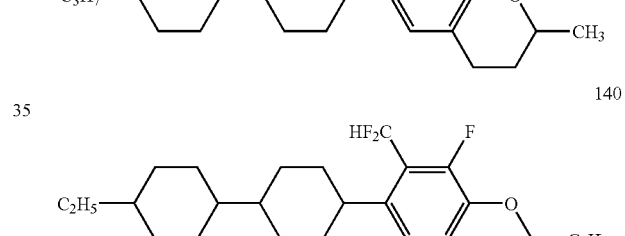
140
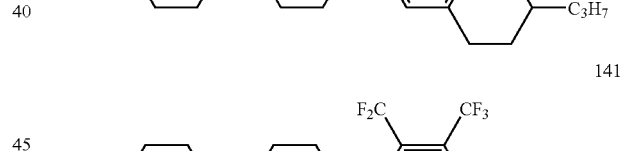
141
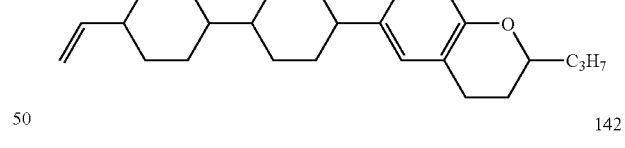
142
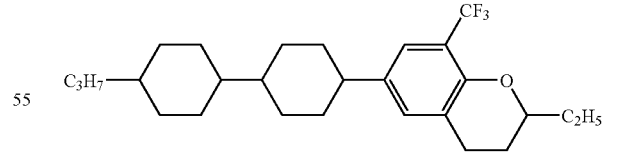
143
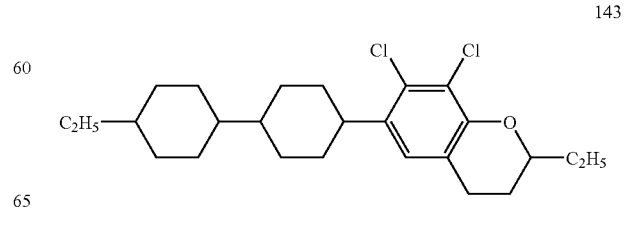

-continued
144
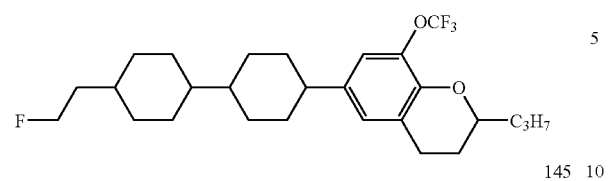
145
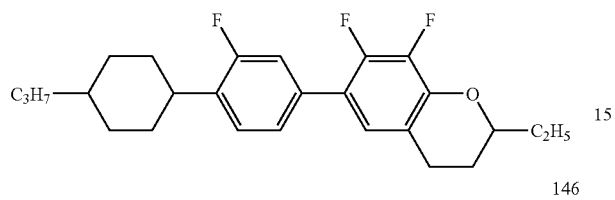
146
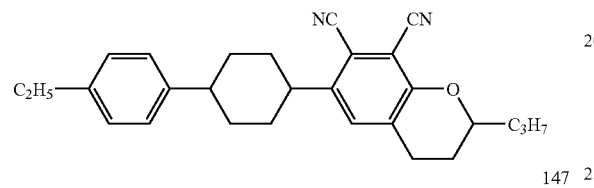
147
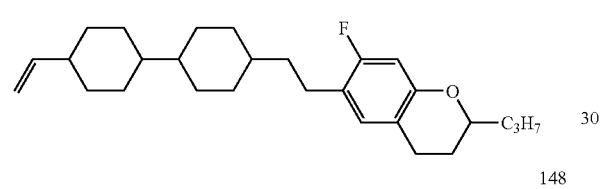
148
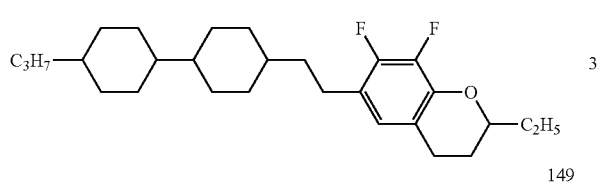
149
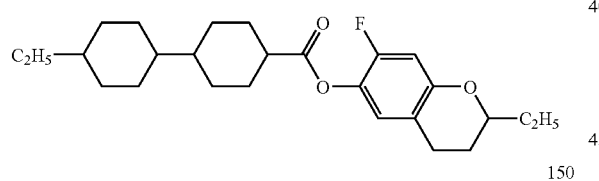
150
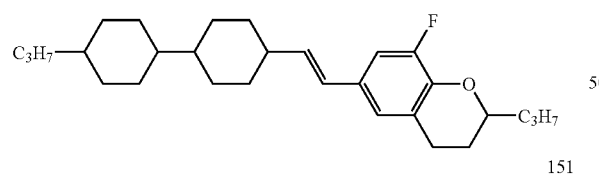
151
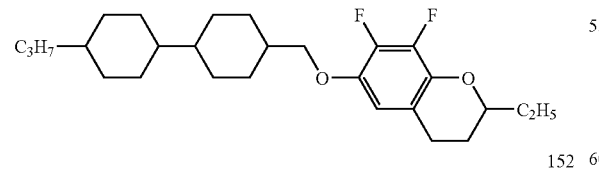
152
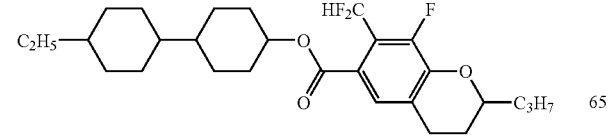
-continued
153
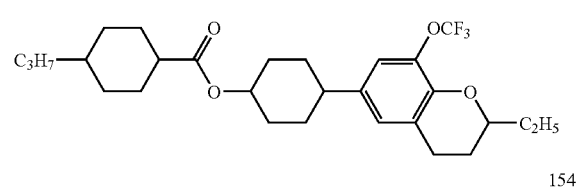
154
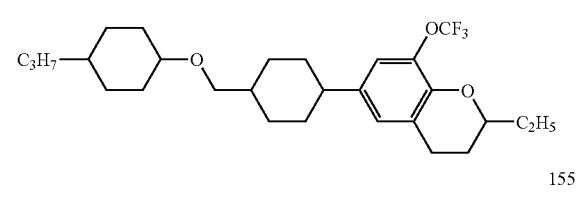
155
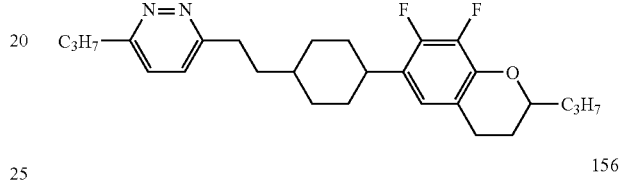
156
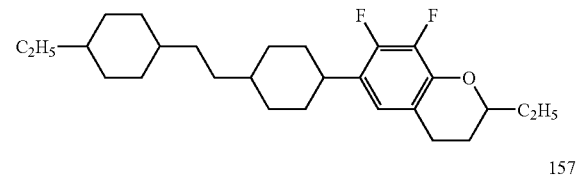
157
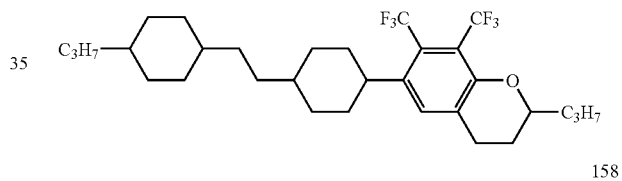
158
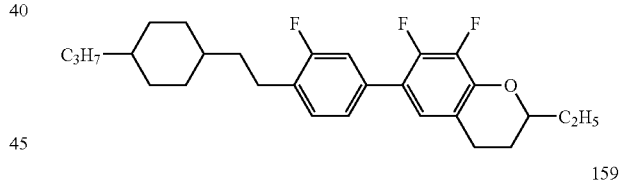
159
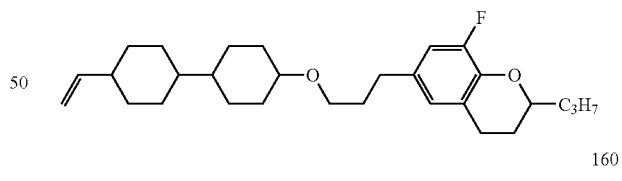
160
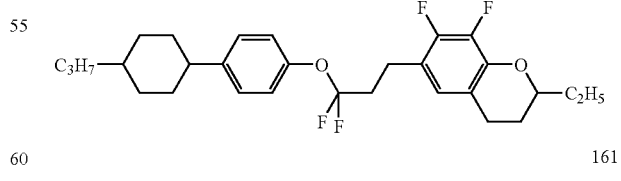
161

-continued
162
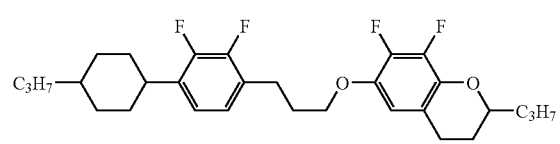
163
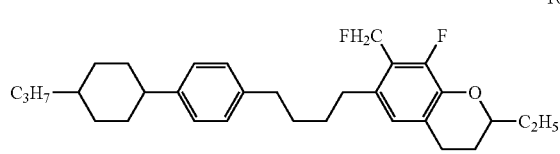
164
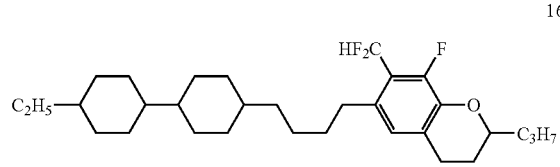
165
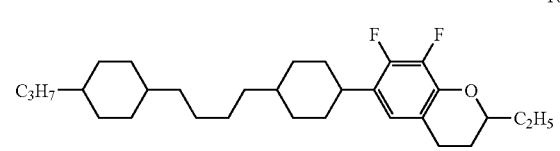
166
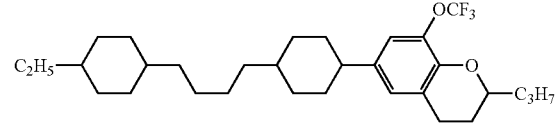
167
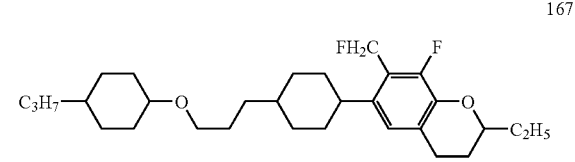
168
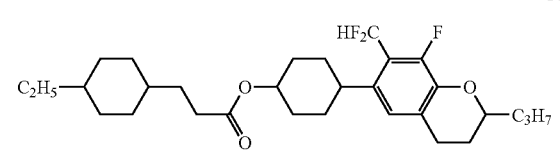
169
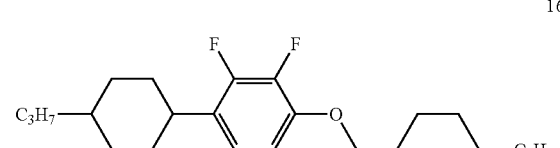
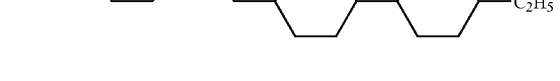
-continued
170
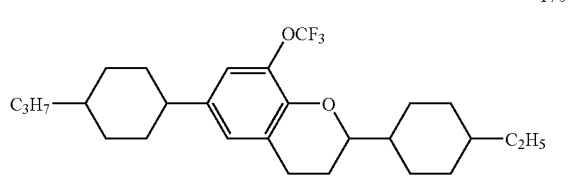
171
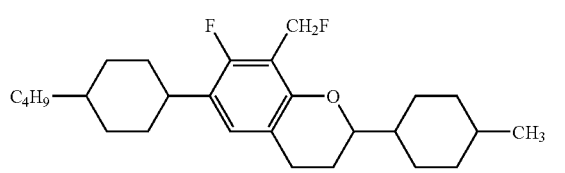
172
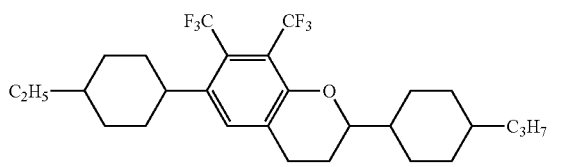
173
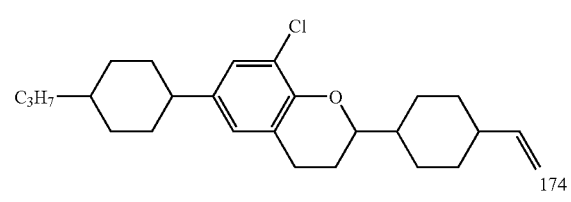
174
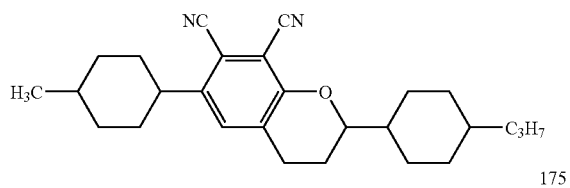
175
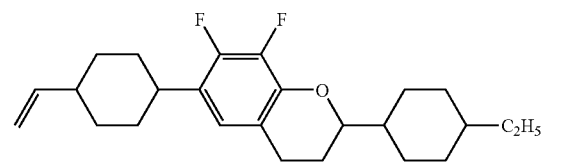
176
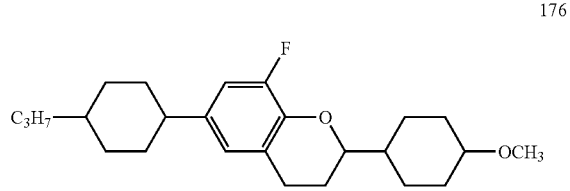
177
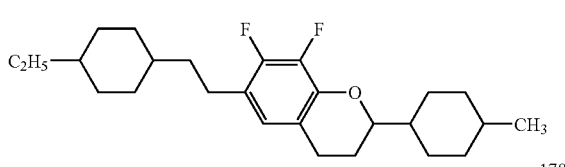
178
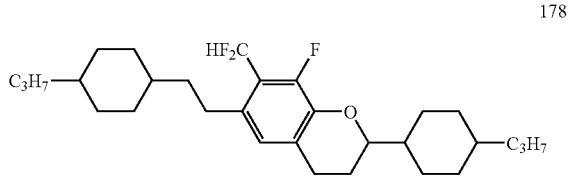

-continued
179
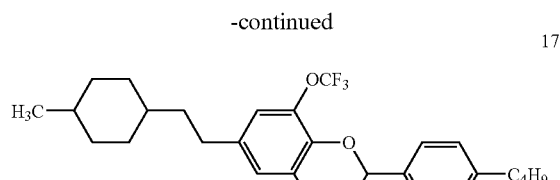
180
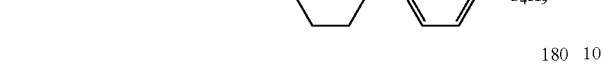
181
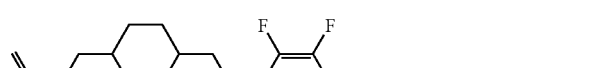
182
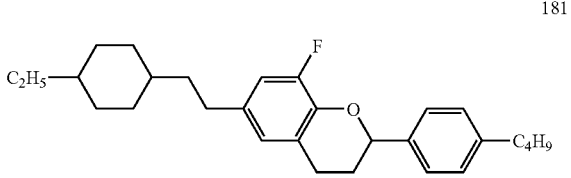
183
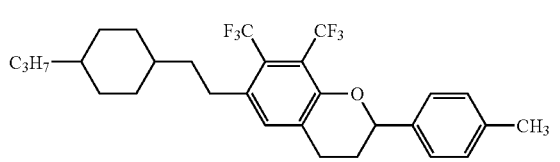
184
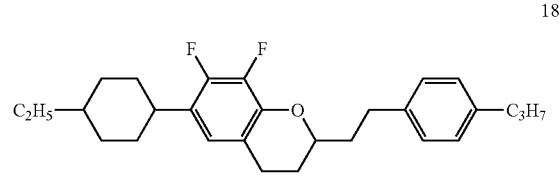
185
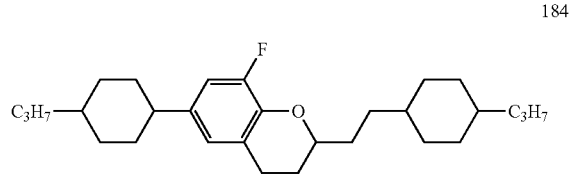
186
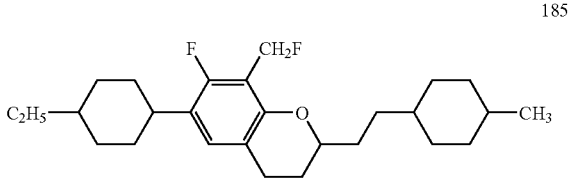
187
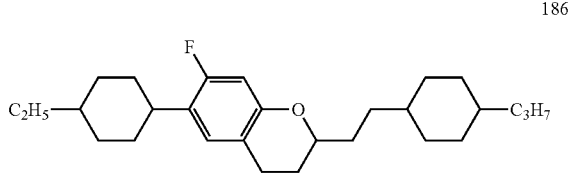
-continued
188
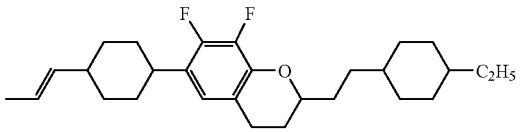
189
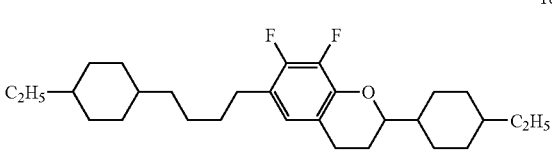
190
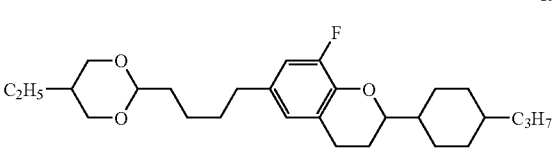
191
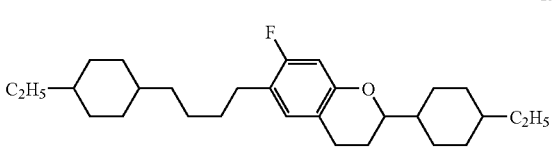
192
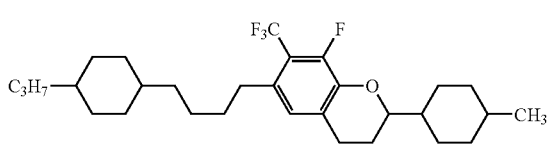
193
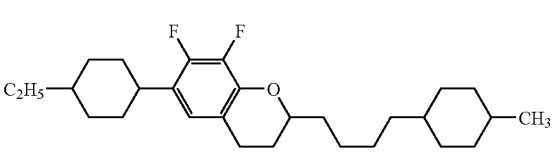
194
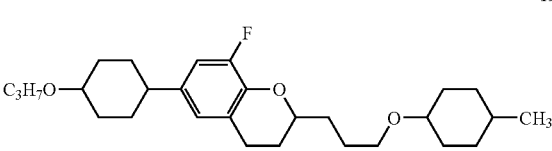
195
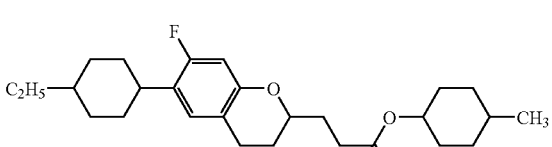
196
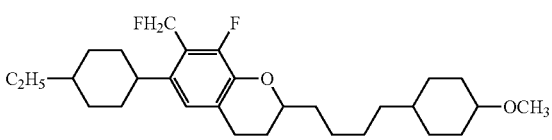

-continued
197
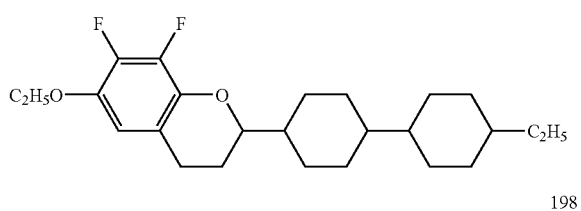
198
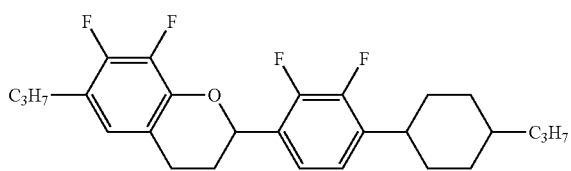
199
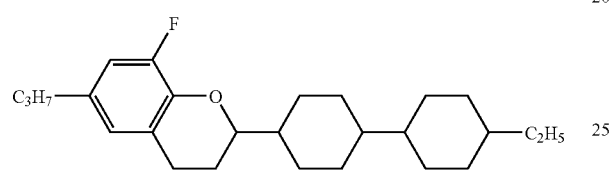
200
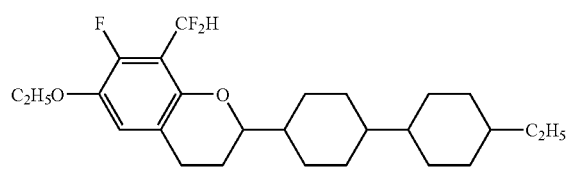
201
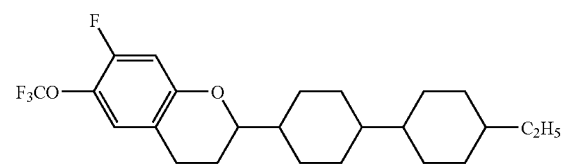
202
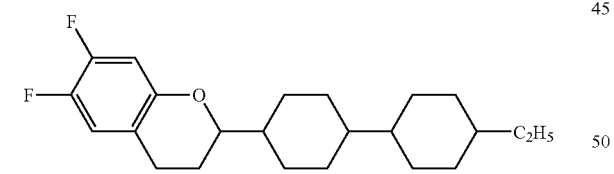
203
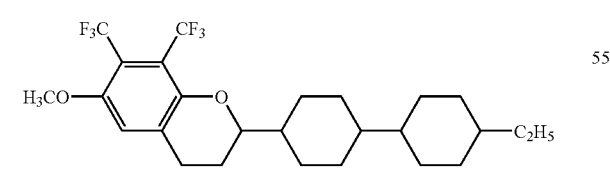
204
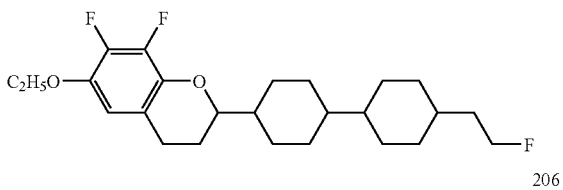
-continued
205
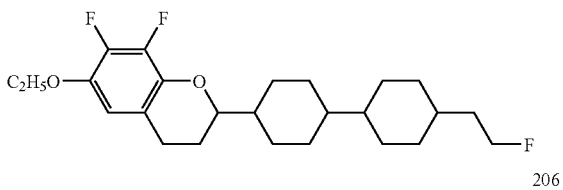
206
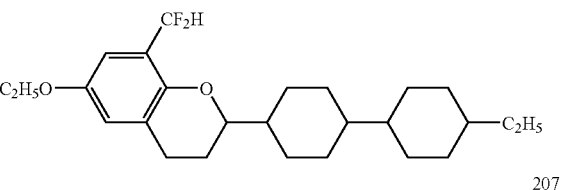
207
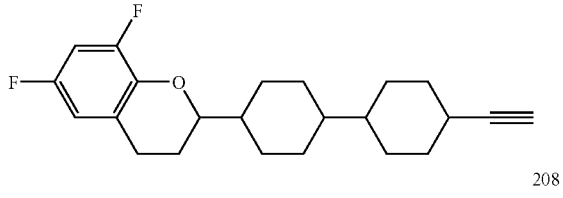
208
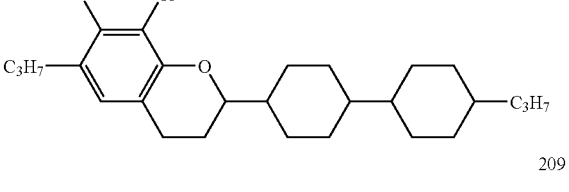
209
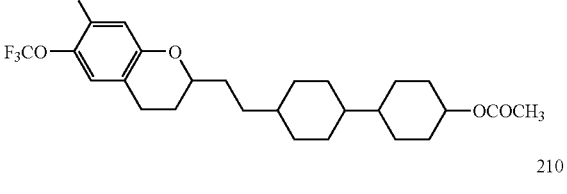
210
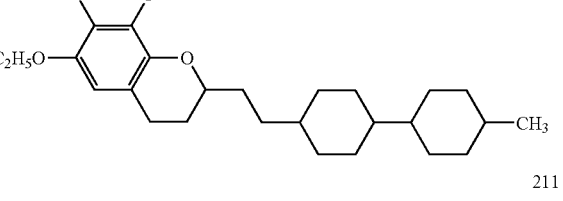
211
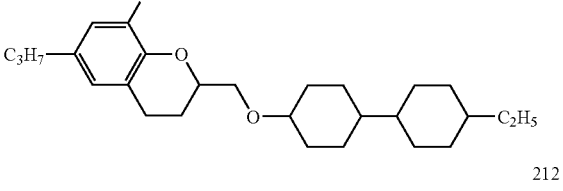
212
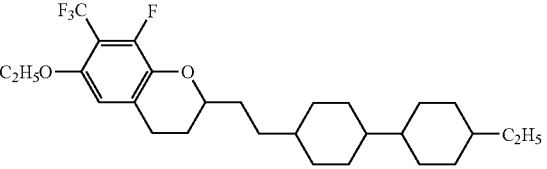

-continued
213
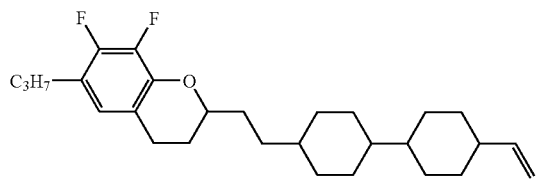
214
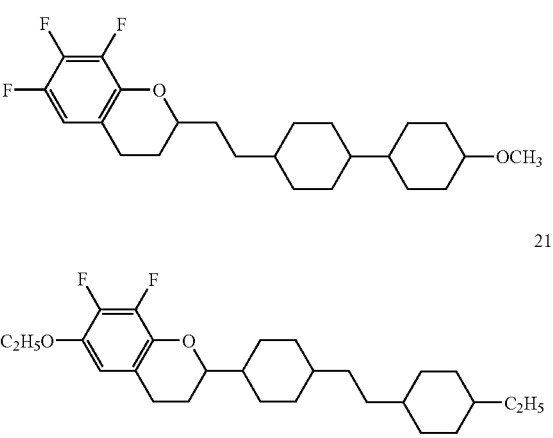
215
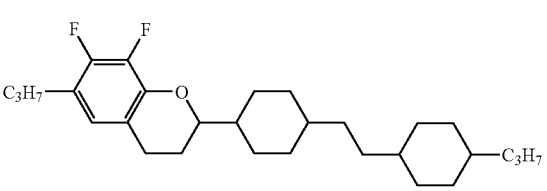
216
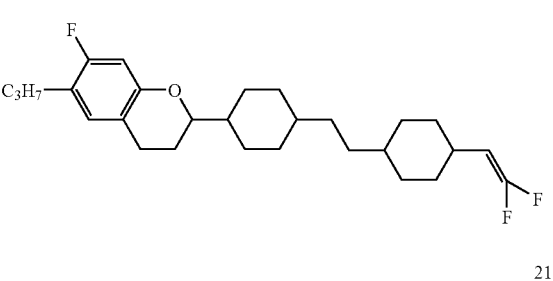
217
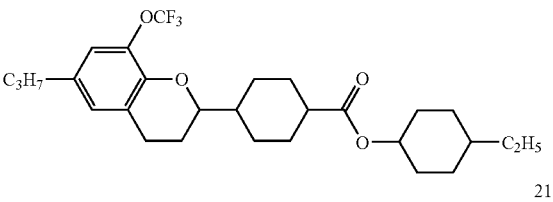
218
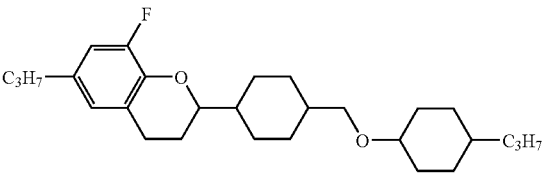
219
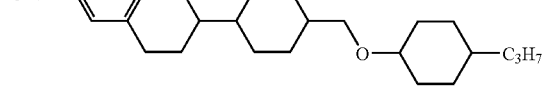
-continued
220
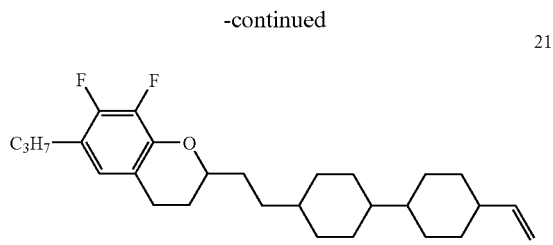
221
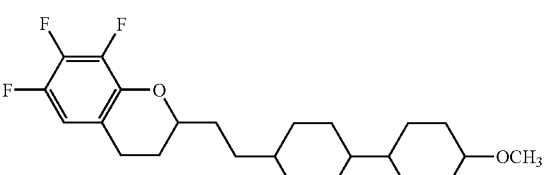
222
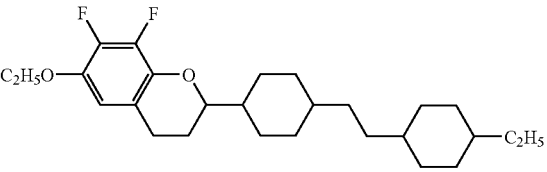
223
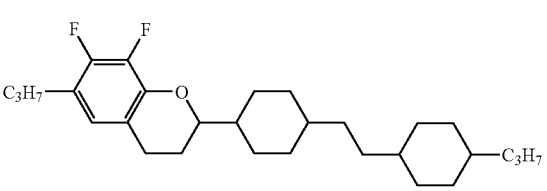
224
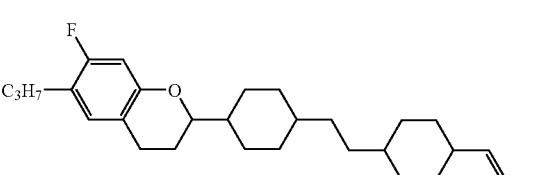
225
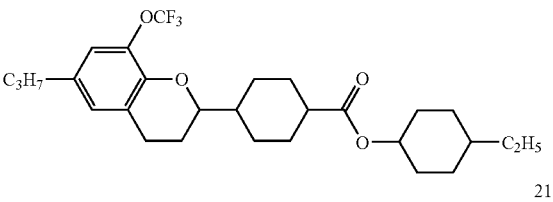
226
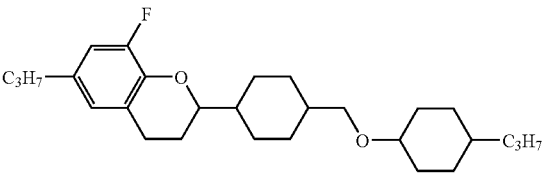
227
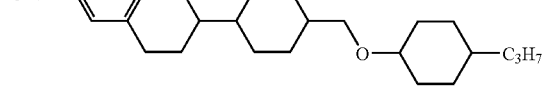

-continued

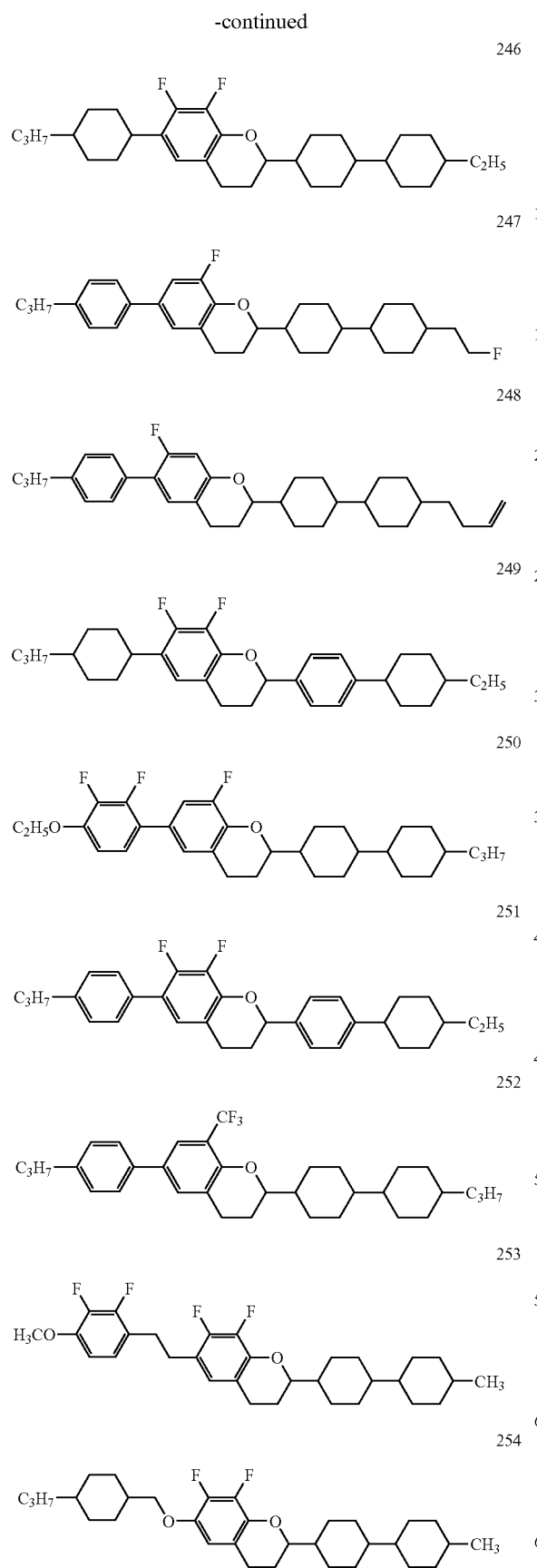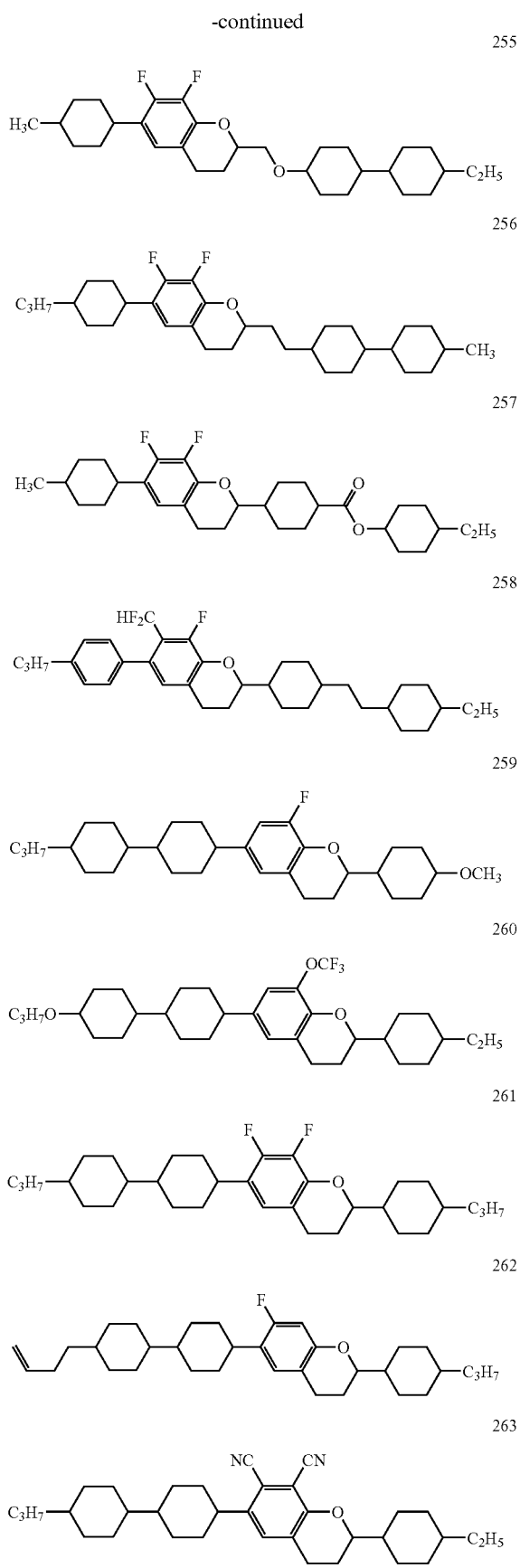

-continued

-continued
284
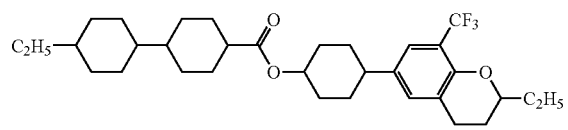
285
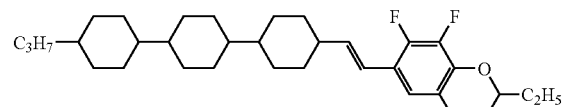
286
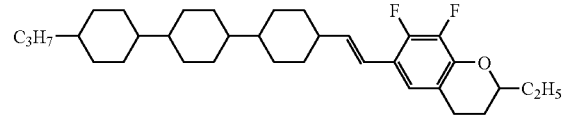
287
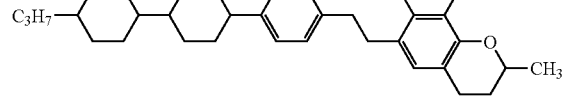
288
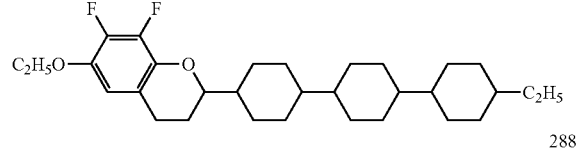
289
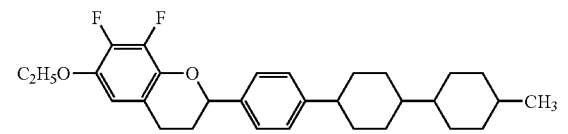
290
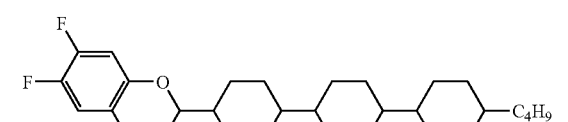
291
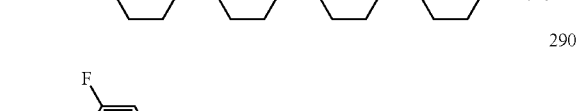
292
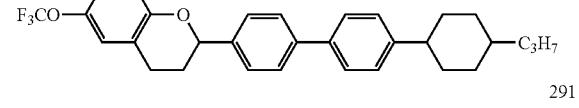
293
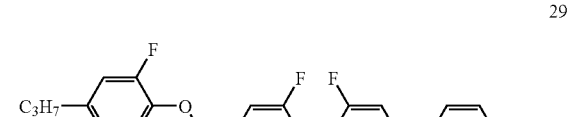
-continued
294
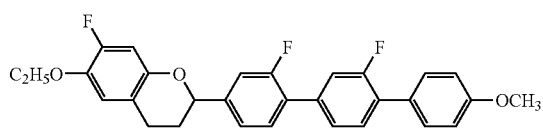
295
296
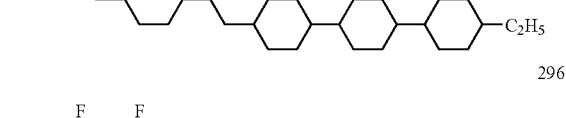
297
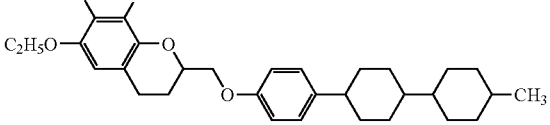
298
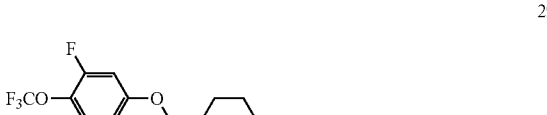
299
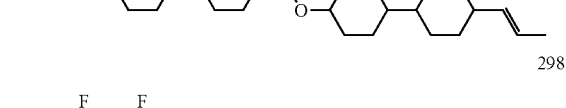
300
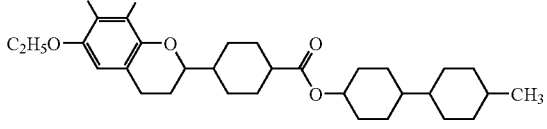
301
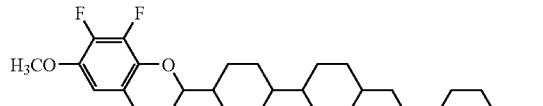
302
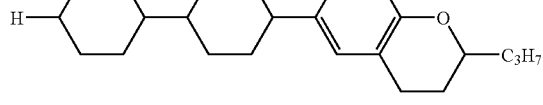

-continued

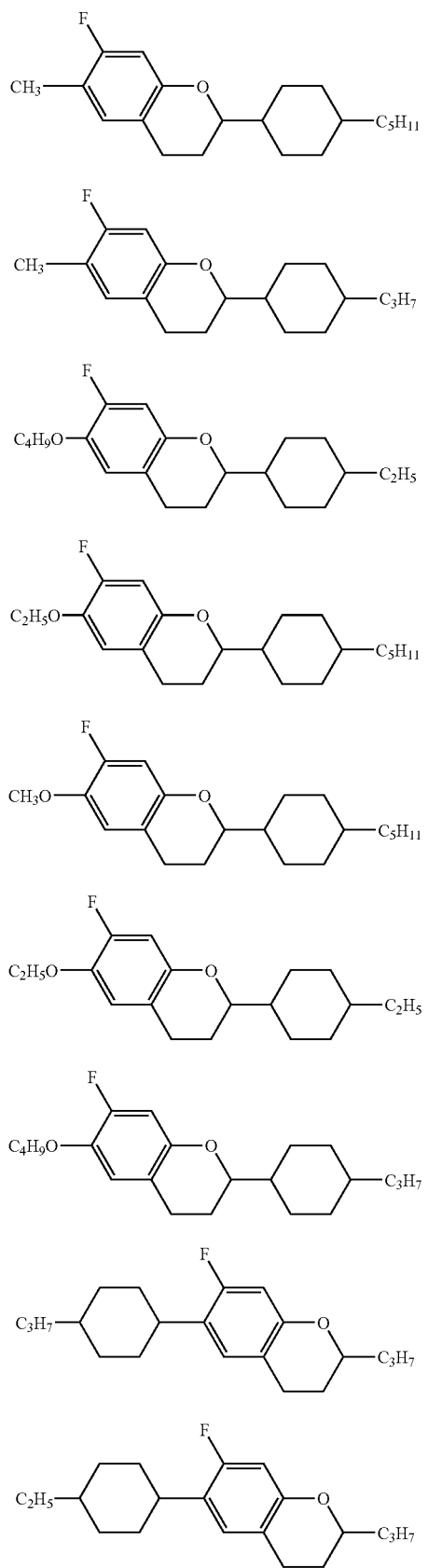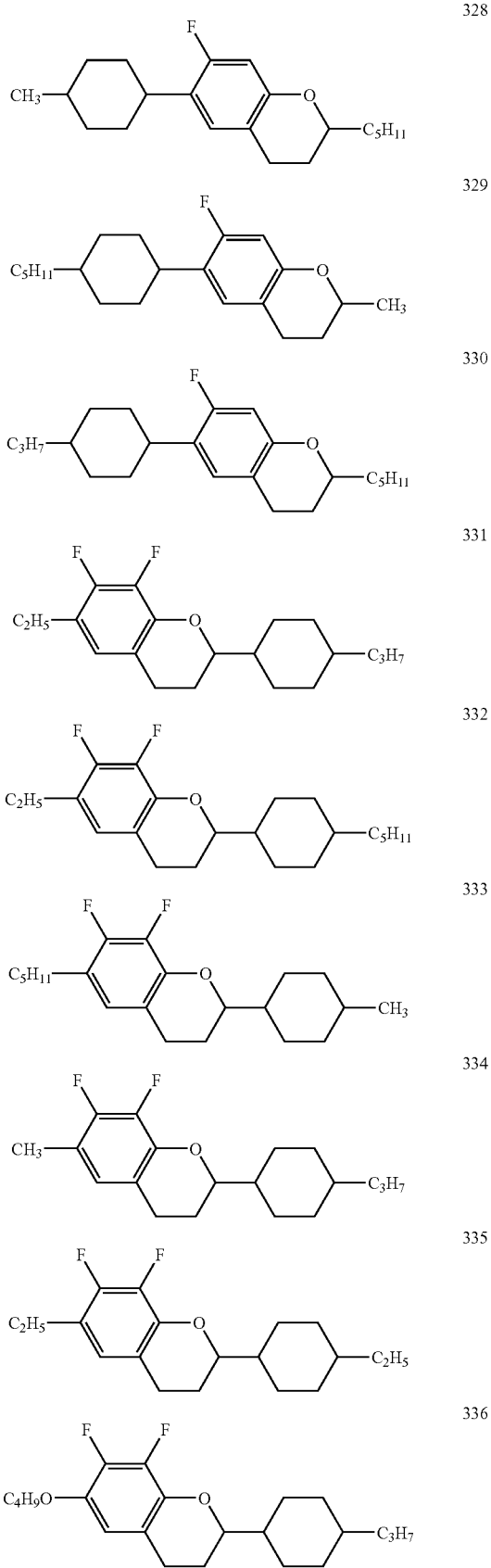

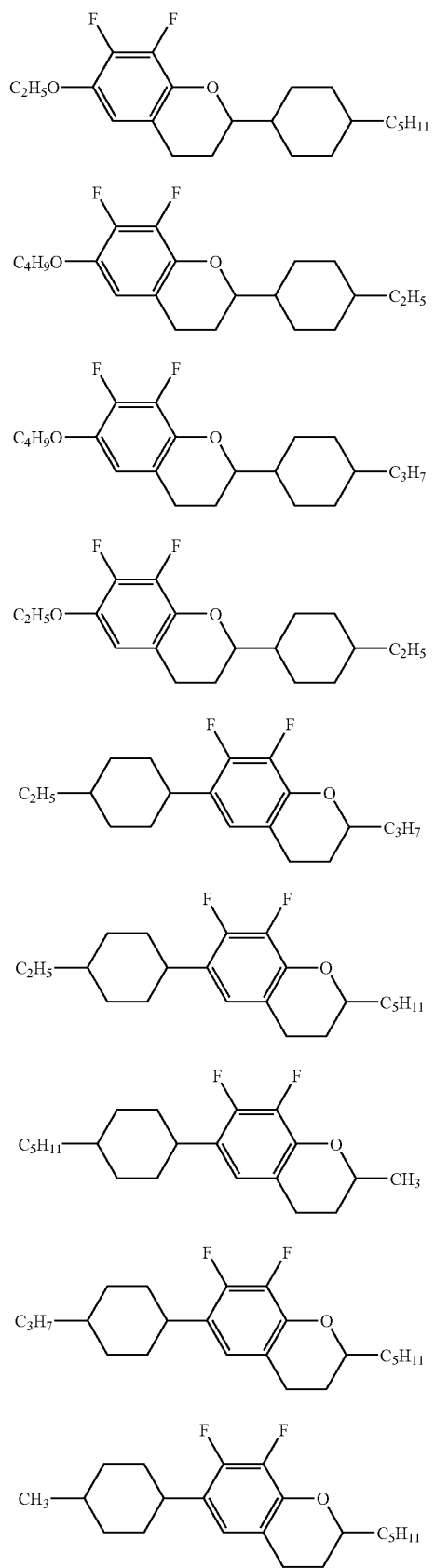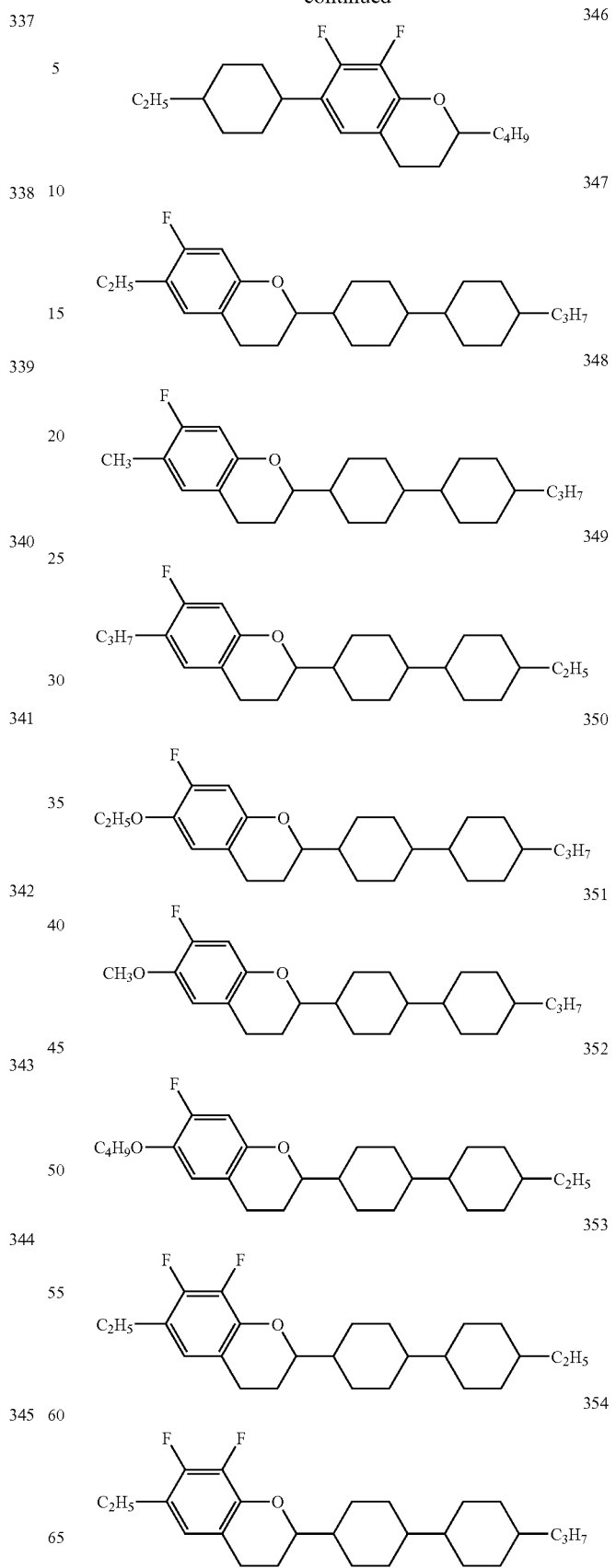

-continued

355
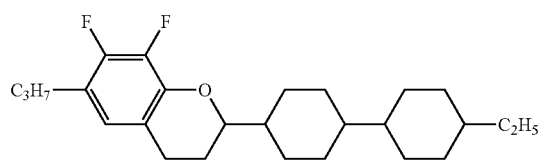

356
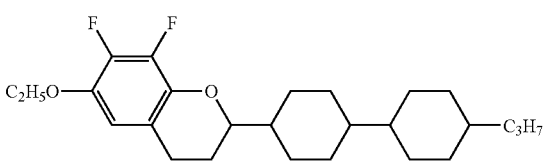

357
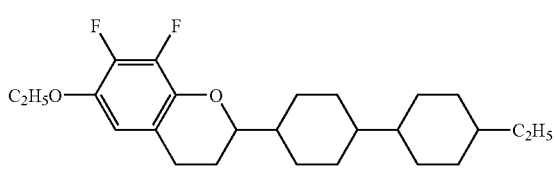

358
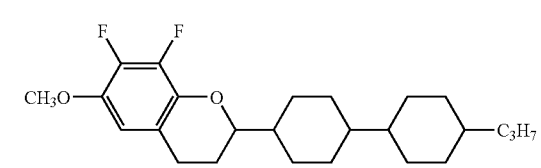

359
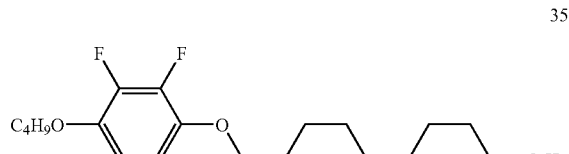

360
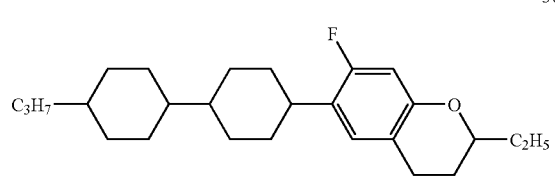

361
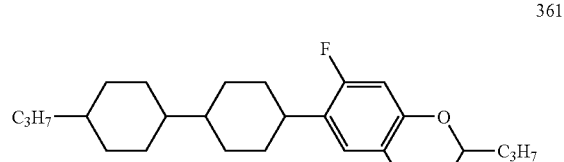

362
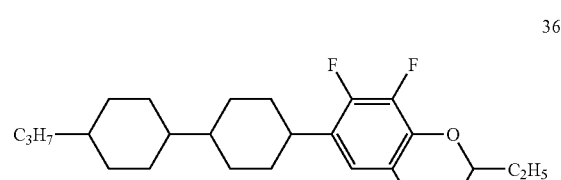

-continued

363
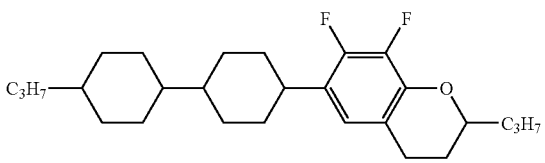

364
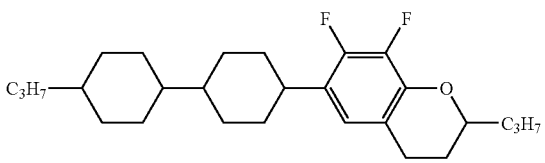

Example 10

Five compounds were mixed to prepare composition A (mother liquid crystals) with a nematic phase. The five compounds were 4-ethoxyphenyl=4-propylcyclohexane carboxylate (17.2%), 4-butoxyphenyl=4-propylcyclohexane carboxylate (27.6%), 4-ethoxyphenyl=4-butylcyclohexane carboxylate (20.7%), 4-methoxyphenyl=4-pentylcyclohexane carboxylate (20.7%), and 4-ethoxyphenyl=4-pentylcyclohexane carboxylate (13.8%). Values of physical properties of composition A were as follows: upper limit temperature (NI)=74.0° C.; viscosity ($\eta_{20}$)=18.9 mPa·s; optical anisotropy ($\Delta n$)=0.087; and dielectric anisotropy ($\Delta \in$)=−1.3.

Composition B consisting of 85% of composition A and 15% of 7,8-difluoro-2-propyl-6-(4-propylcyclohexyl)chroman (compound No. 4) obtained in Example 5 was prepared. Values of physical properties of compound No. 4 was calculated by extrapolating measured values of physical properties of composition B. Optical anisotropy ($\Delta n$)=0.096; dielectric anisotropy ($\Delta \in$)=−7.1. It was revealed that addition of compound No. 4 resulted in a large negative dielectric anisotropy, and a low drive voltage when used for a liquid crystal display element.

Example 11

Composition C consisting of 95% of composition A described in Example 10 and 5% of 7,8-difluoro-6-ethoxy-2-(4-propylcyclohexyl)chroman (compound No. 78) obtained in Example 6 was prepared. Values of physical properties of compound No. 78 was calculated by extrapolating measured values of physical properties of composition C. Optical anisotropy ($\Delta n$)=0.087; dielectric anisotropy ($\Delta \in$)=−9.8. It was revealed that addition of compound No. 78 resulted in a large negative dielectric anisotropy, and a low drive voltage when used for a liquid crystal display element.

Example 12

Composition D consisting of 85% of composition A described in Example 10 and 15% of 7,8-difluoro-6-ethyl-2-(4-propylcyclohexyl)chroman (compound No. 331) obtained in Example 7 was prepared. Values of physical properties of compound No. 331 was calculated by extrapolating measured values of physical properties of composition D. Optical anisotropy ($\Delta n$)=0.031; dielectric anisotropy ($\Delta \in$)=−5.2. It was revealed that addition of compound No. 331 resulted in a large negative dielectric anisotropy, and a low drive voltage when used for a liquid crystal display element.

Example 13

Composition E consisting of 85% of composition A described in Example 10 and 15% of 7-fluoro-6-ethoxy-2-(4-propylcyclohexyl)chroman (compound No. 76) obtained in Example 8 was prepared. Values of physical properties of compound No. 76 was calculated by extrapolating measured values of physical properties of composition E. Optical anisotropy ($\Delta n$)=0.081; dielectric anisotropy ($\Delta \in$)=−5.9. It was revealed that addition of compound No. 76 resulted in a large negative dielectric anisotropy, and a low drive voltage when used for a liquid crystal display element.

Comparative Example 1

Composition F consisting of 85% of composition A described in Example 10 and 15% of 2-propyl-6-(4-propylcyclohexyl)choman was prepared. Values of physical properties of 2-propyl-6-(4-propylcyclohexyl)choman was calculated by extrapolating measured values of physical properties of composition F. Optical anisotropy ($\Delta n$)=0.099; dielectric anisotropy ($\Delta \in$)=−2.3. It was revealed that addition of 2-propyl-6-(4-propylcyclohexyl)choman did not result in a large negative dielectric anisotropy.

Example 14

Typical compositions according to the invention are gathered up as composition examples 1 to 5. First, compounds as an ingredient of the composition and amount (weight %) thereof are listed. According to an agreement for the aforementioned Table 1, compounds are represented by symbols of a left terminal group, a bonding group, a ring structure and a right terminal group. 1,4-cyclohexylene and 1,3-dioxane-2,5-diyl is in trans-configuration. No symbol in relation to the terminal group means that the terminal group is hydrogen. Next, values of physical properties of compositions are listed. Measurement of physical properties was conducted according to the method described in Standard of Electronic Industries Association of Japan, EIAJ.ED-2521A, or a modified method thereof.

The upper limit temperature of a nematic phase (NI; ° C.): a sample was put on a hotplate of a melting-point apparatus provided with a polarization microscope and was heated at a rate of 1° C./min. A temperature at which a part of the sample changed from a nematic phase to isotropic liquid was measured. The upper limit temperature of a nematic phase is sometimes abbreviated as "the upper limit temperature."

The lower limit temperature of a nematic phase ($T_c$; ° C.: a sample having a nematic phase was stored in a freezer at 0° C., −10° C., −20° C., −30° C. and −40° C. respectively for 10 days, then a liquid crystalline phase thereof was observed. For example, when a sample stored at −20° C. is left in a nematic phase and changes to crystals (or a smectic phase) at −30° C., $T_c$ is denoted as <−20° C. The lower limit temperature of a nematic phase is sometimes abbreviated as "the lower limit temperature."

Compatibility of compounds: a few compounds having similar constructions were mixed to prepare mother liquid crystals with a nematic phase. A composition was prepared by mixing a compound to be measured with the mother liquid crystals. An example of a mixing ratio was 15% of the compound and 85% of the mother liquid crystals. The composition was stored at low temperatures such as −20° C. or −30° C. for 30 days. Whether a part of the composition had changed to crystals (or a smectic phase) or not was observed. According to need, the mixing ratio or storage temperature was changed. From the result of such measurements, conditions in which crystals (or a smectic phase) precipitated and conditions in which crystals (or a smectic phase) did not precipitate were determined. These conditions are a measure of compatibility.

Viscosity ($\eta$; measured at 20° C.; mPa·s): an E-type viscometer was used for measuring viscosity.

Optical anisotropy (refractive index anisotropy; $\Delta n$; measured at 25° C.): measurement was conducted by using Abbe refractometer provided with a polarization plate on an eyepiece with light of 589 nm in wavelength. After rubbing the surface of a principal prism in one direction, a sample was dropped to the principal prism. A refraction index n∥ was measured when orientation of polarized light was parallel to that of rubbing. A refraction index n⊥ was measured when orientation of polarized light was perpendicular to that of rubbing. The value of optical anisotropy was calculated based on the formula $\Delta n$=n∥−n⊥. When a sample was a composition, the optical anisotropy was measured by this method. When a sample was a compound, the compound was mixed into a suitable composition and optical anisotropy thereof was measured. The optical anisotropy of the compound is an extrapolated value.

Dielectric anisotropy ($\Delta \in$; measured at 25° C.): when a sample was a compound, the compound was mixed into a suitable composition and dielectric anisotropy thereof was measured. The dielectric anisotropy of the compound is an extrapolated value.

1) A composition with a positive dielectric anisotropy: a sample was put into a liquid crystal cell of which gap of two glass substrates was about 9 µm and twist angle was 80 degrees. The cell was applied with 20 volts to measure a dielectric constant ($\in$∥) in a major axis direction of a liquid crystal molecule. By applying 0.5 volt, a dielectric constant ($\in$⊥) in a minor axis direction of a liquid crystal molecule was measured. The value of dielectric anisotropy was calculated based on the formula $\Delta \in$=$\in$∥−$\in$⊥.

2) A composition with a negative dielectric anisotropy: a sample was put into a liquid crystal cell treated in a homeotropic alignment and applied with 0.5 volt to measure a dielectric constant ($\in$∥). The sample was put into a liquid crystal cell treated in a homogeneous alignment and applied with 0.5 volt to measure a dielectric constant ($\in$⊥). The value of dielectric anisotropy was calculated based on the formula $\Delta \in$=$\in$∥−$\in$⊥.

Threshold voltage (Vth; measured at 25° C.; V): when a sample was a compound, the compound was mixed with a suitable composition and the threshold voltage thereof was measured. The threshold voltage of the compound is an extrapolated value.

1) A composition with a positive dielectric anisotropy: a sample was put into a liquid crystal display element of normally white mode of which gap of two glass substrates was (0.5/$\Delta n$) µm and twist angle was 80 degrees. $\Delta n$ is a value of an optical anisotropy measured by the aforementioned method. The element was applied with rectangular waves having a frequency of 32 Hz. The voltage of the rectangular waves was raised and measured when transmittance of light passing through the element became 90%.

2) A composition with a negative dielectric anisotropy: a sample was put into a liquid crystal display element of normally black mode having been treated in a homeotropic alignment of which gap of two glass substrates was about 9 µm. The element was applied with rectangular waves having a frequency of 32 Hz. The voltage of the rectangular waves was raised and measured when transmittance of light passing through the element became 10%.

TABLE 1

Method for Description of Compounds Using Symbols
Ra—(A1)-Zl- . . . -Zn-(An)-Rb

1) Left terminal group

| Ra— | Symbol |
|---|---|
| CnH2n + 1- | n- |
| CnH2n + 10- | nO— |
| CnH2n + 10CmH2m + 1- | nOm- |
| CH2=CH— | V— |
| CH2=CHCnH2n- | Vn- |
| CnH2n + 1CH=CHCmH2m- | nVm- |
| CnH2n + 1CH=CHCmH2mCH=CHCkH2k- | nVmVk- |
| CF2=CH— | VFF— |
| CF2=CHCnH2n- | VFFn- |

2) Ring structure

| -An- | Symbol |
|---|---|
| 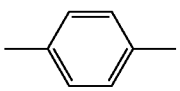 | B |
| 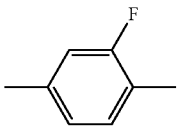 | B(F) |
| 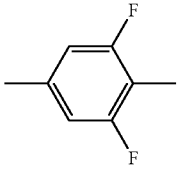 | B(F,F) |
|  | H |
| 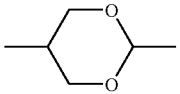 | G |
| 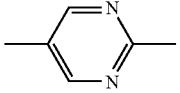 | Py |
| 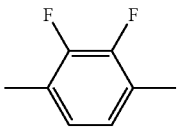 | B(2F,3F) |
|  | Cro(7F) |
| 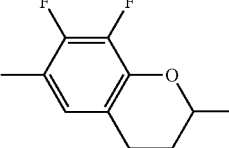 | Cro(7F,8F) |

3) Bonding group

| —Zn— | Symbol |
|---|---|
| —C2H4— | 2 |
| —C4H8— | 4 |
| —COO— | E |
| —OCO— | Er |
| —C≡C— | T |
| —CH=CH— | V |
| —CF2O— | CF2O |
| —OCF2— | OCF2 |

4) Right terminal group

| —Rb | Symbol |
|---|---|
| —F | —F |
| —Cl | —CL |
| —CN | —C |
| —CF3 | —CF3 |
| —OCF3 | —OCF3 |
| —OCF2H | —OCF2H |
| —CnH2n + 1 | -n |
| —OCnH2n + 1 | —On |
| —COOCH3 | -EMe |
| —CH=CH2 | -V |
| —CnH2nCH=CH2 | -nV |
| —CmH2mCH=CHCnH2n + 1 | -mVn |
| —CH=CF2 | —VFF |
| —CnH2nCH=CF2 | -nVFF |

5) Examples of Description

Example 1. 3-HB(2F,3F)-O2

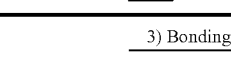

Example 2. 4O-Cro(7F,8F)H-3

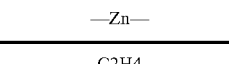

Example 3. 2O-Cro(7F)H-3

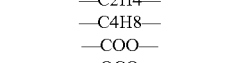

Composition Example 1

| | |
|---|---|
| 2-HCro(7F)-4 (No. 2) | 5% |
| 3-HCro(7F,8F)-3 (No. 4) | 5% |
| 4O-Cro(7F,8F)H-3 (No. 336) | 7% |
| 3-HH-4 | 5% |
| 3-HH-5 | 5% |
| 3-HH—O1 | 3% |
| 3-HH—O3 | 3% |
| 3-HB—O1 | 5% |
| 3-HB—O2 | 5% |
| 3-HB(2F,3F)—O2 | 10% |
| 5-HB(2F,3F)—O2 | 10% |
| 3-HHEH-3 | 3% |
| 3-HHEH-5 | 2% |
| 4-HHEH-3 | 2% |
| 2-HHB(2F,3F)-1 | 4% |
| 3-HHB(2F,3F)-2 | 4% |
| 3-HHB(2F,3F)—O2 | 12% |
| 5-HHB(2F,3F)—O2 | 10% |
| NI = 71.1° C.; Δn = 0.080; η (20° C.) = 32.3 mPa·s; Δε = −4.6. | |

When 100 parts of the aforementioned composition was added with 0.25 part of (Op-5), a pitch was 60.0 μm.

Composition Example 2

| | |
|---|---|
| 2O-Cro(7F)H-3 (No. 76) | 4% |
| 2O-Cro(7F,8F)H-3 (No. 78) | 4% |
| 4O-Cro(7F,8F)H-3 (No. 336) | 6% |
| 3-HH-4 | 5% |
| 3-HH-5 | 5% |
| 3-HH—O1 | 6% |
| 3-HH—O3 | 6% |
| 3-HB—O1 | 5% |
| 3-HB—O2 | 5% |
| 3-HB(2F,3F)—O2 | 10% |
| 3-HHEH-3 | 5% |
| 3-HHEH-5 | 5% |
| 4-HHEH-3 | 5% |
| 2-HHB(2F,3F)-1 | 4% |
| 3-HHB(2F,3F)—O2 | 12% |
| 5-HHB(2F,3F)—O2 | 13% |
| NI = 83.0° C.; Δn = 0.077; η (20° C.) = 32.6 mPa·s; Δε = −3.8. | |

Composition Example 3

| | |
|---|---|
| 4O-Cro(7F,8F)H-3 (No. 336) | 6% |
| 2-Cro(7F,8F)H-3 (No. 331) | 3% |
| 2-Cro(7F,8F)HH-2 (No. 335) | 3% |
| 3-HH-4 | 5% |
| 3-HH-5 | 5% |
| 3-HH—O1 | 4% |
| 3-HH—O3 | 4% |
| 3-HB—O1 | 4% |
| 3-HB—O2 | 3% |
| 3-HB(2F,3F)—O2 | 10% |
| 5-HB(2F,3F)—O2 | 5% |
| 3-HHEH-3 | 5% |
| 3-HHEH-5 | 5% |
| 4-HHEH-3 | 5% |
| 2-HHB(2F,3F)-1 | 4% |
| 3-HHB(2F,3F)-2 | 4% |
| 3-HHB(2F,3F)—O2 | 12% |
| 5-HHB(2F,3F)—O2 | 13% |
| NI = 88.2° C.; Δn = 0.081; η (20° C.) = 35.5 mPa·s; Δε = −4.3. | |

Composition Example 4

| | |
|---|---|
| 2-HCro(7F)-4 (No. 2) | 4% |
| 3-HCro(7F,8F)-3 (No. 4) | 4% |
| 2O-Cro(7F,8F)H-3 (No. 78) | 4% |
| 3-HH-4 | 5% |
| 3-HH-5 | 5% |
| 3-HH—O1 | 6% |
| 3-HH—O3 | 6% |
| 3-HB—O1 | 5% |
| 3-HB—O2 | 5% |
| 3-HB(2F,3F)—O2 | 10% |
| 5-HB(2F,3F)—O2 | 10% |
| 3-HHEH-3 | 4% |
| 3-HHEH-5 | 3% |
| 2-HHB(2F,3F)-1 | 4% |
| 3-HHB(2F,3F)-2 | 4% |
| 3-HHB(2F,3F)—O2 | 12% |
| 5-HHB(2F,3F)—O2 | 9% |
| NI = 70.0° C.; Δn = 0.077; η (20° C.) = 28.9 mPa·s; Δε = −4.2. | |

Composition Example 5

| | |
|---|---|
| 2O-Cro(7F)H-3 (No. 76) | 5% |
| 4O-Cro(7F,8F)H-3 (No. 336) | 5% |
| 2-Cro(7F,8F)HH-2 (No. 335) | 5% |
| 3-HH-4 | 5% |
| 3-HH-5 | 5% |
| 3-HH—O1 | 3% |
| 3-HH—O3 | 3% |
| 3-HB—O1 | 5% |
| 3-HB—O2 | 3% |
| 3-HB(2F,3F)—O2 | 10% |
| 5-HB(2F,3F)—O2 | 10% |
| 3-HHEH-3 | 5% |
| 3-HHEH-5 | 5% |
| 4-HHEH-3 | 5% |
| 2-HHB(2F,3F)-1 | 4% |
| 3-HHB(2F,3F)-2 | 4% |
| 3-HHB(2F,3F)—O2 | 10% |
| 5-HHB(2F,3F)—O2 | 8% |
| NI = 80.7° C.; Δn = 0.081; η (20° C.) = 35.7 mPa·s; Δε = −4.3. | |

What is claimed is:

1. A compound represented by formula (1):

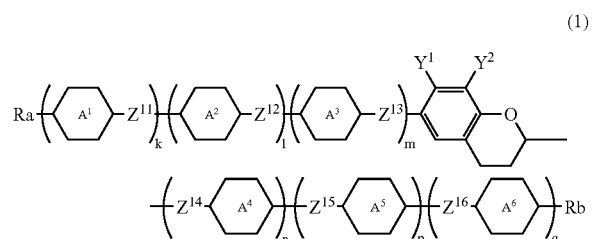

wherein Ra and Rb independently are hydrogen, alkyl having 1 to 20 carbons, halogen, —CN, —C≡C—CN, —NCO, or —NCS, any —CH$_2$— in the alkyl may be replaced with —O—, —S—, —CO— or —SiH$_2$—, any —(CH$_2$)$_2$— may be replaced by —CH═CH— or —C≡C—, and any of hydrogen may be replaced by halogen; rings $A^1$, $A^2$, $A^3$, $A^4$, $A^5$ and $A^6$ independently are 1,4-cyclohexylene, 1,4-phenylene, decahydronaphthalene-2,6-diyl, 1,2,3,4-tetrahydronaphthalene-2,6-diyl, or naphthalene-2,6-diyl and, any —CH$_2$— in these rings may be replaced by —O—, —S—, —CO— or —SiH$_2$—, any —(CH$_2$)$_2$— may be replaced by —CH=CH—, any —CH= in 1,4-phenylene may be replaced by —N=, and any hydrogen in these rings may be replaced by halogen, —CF$_3$, —CHF$_2$, —CH$_2$F, —OCF$_3$, —OCHF$_2$, or —OCH$_2$F; $Z^{11}$, $Z^{12}$, $Z^{13}$, $Z^{14}$, $Z^{15}$ and $Z^{16}$ independently are a single bond or alkylene having 1 to 4 carbons and, any —CH$_2$— in the alkylene may be replaced by —O—, —S—, —CO—, or —SiH$_2$—, any —(CH$_2$)$_2$— may be replaced by —CH=CH— or —C≡C—, and any hydrogen may be replaced by halogen; $Y^1$ and $Y^2$ independently are hydrogen, halogen, —CN, —CF$_3$, —CHF$_2$, —CH$_2$F, —OCF$_3$, —OCHF$_2$, or —OCH$_2$F, and $Y^1$ and $Y^2$ are not hydrogen at the same time; k, l, m, n, p and q independently are 0 or 1, and the sum of k, l, m, n, p and q is 1, 2 or 3; with the proviso that at least one of $Z^{11}$, $Z^{12}$, $Z^{13}$, $Z^{14}$, $Z^{15}$ and $Z^{16}$ is a group (q1), (q2) or (q3), in the case that $Y^1$ is fluorine, chlorine, —CF$_3$, —CHF$_2$, —OCF$_3$ or —OCHF$_2$ and $Y^2$ is fluorine, chlorine, —CF$_3$, —CHF$_2$, —OCF$_3$ or —OCHF$_2$ at the same time,

(q1)

-continued

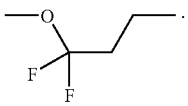
(q2)

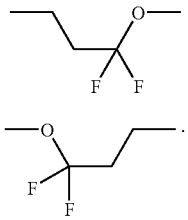
(q3)

2. The compound described in claim 1 wherein, in formula (1), one of $Y^1$ and $Y^2$ is hydrogen and the other is halogen, —CN, —CF$_3$, —CHF$_2$, —CH$_2$F, —OCF$_3$, —OCHF$_2$, or —OCH$_2$F.

3. The compound described in claim 1 wherein, in formula (1), $Y^1$ and $Y^2$ independently are halogen, —CN, —CF$_3$, —CHF$_2$, —CH$_2$F, —OCF$_3$, —OCHF$_2$, or —OCH$_2$F.

4. The compound described in claim 1 wherein, in formula (1), one of $Y^1$ and $Y^2$ is hydrogen and the other is fluorine.

5. The compound described in claim 1 wherein, in formula (1), $Y^1$ and $Y^2$ are fluorine.

6. A compound represented by any one of formulas (1-1) to (1-9):

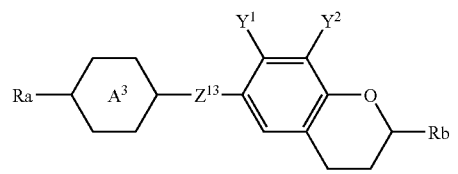
(1-1)

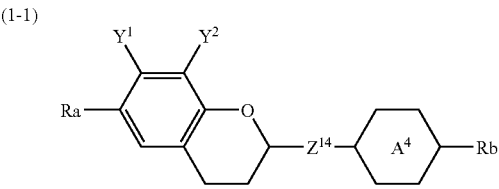
(1-2)

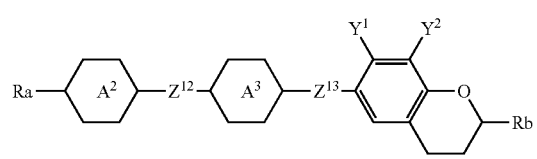
(1-3)

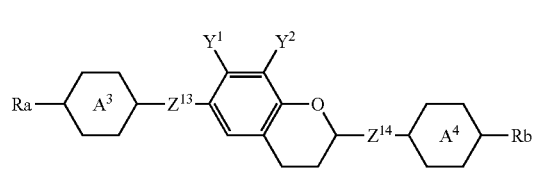
(1-4)

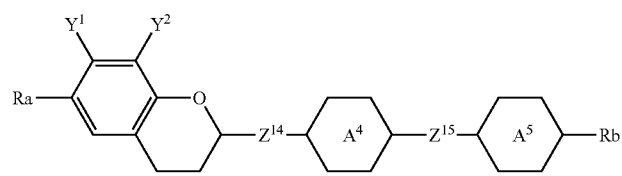
(1-5)

(1-6)

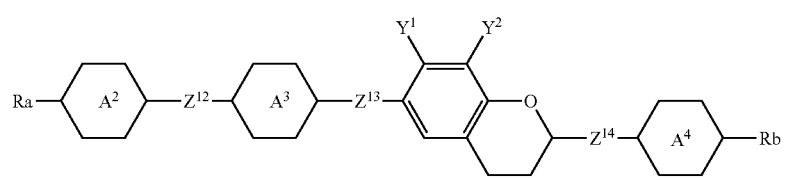
(1-7)

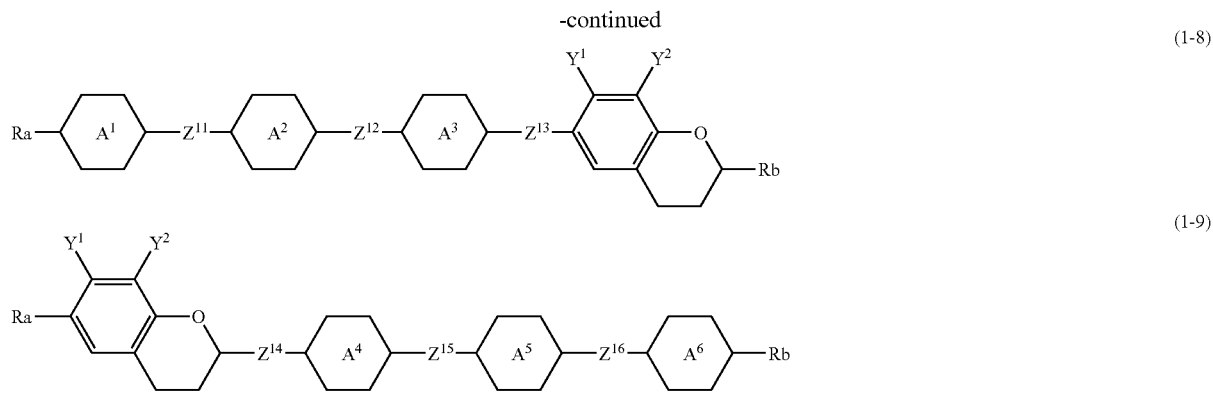

in formula (1-1) to formula (1-9), Ra and Rb independently are hydrogen, alkyl having 1 to 20 carbons, fluorine, chlorine, —CN, or —C≡C—CN, and any —CH$_2$— in the alkyl may be replaced by —O—, any —(CH$_2$)$_2$— may be replaced by —CH=CH— or —C≡C—, and any hydrogen may be replaced by fluorine; rings $A^1$, $A^2$, $A^3$, $A^4$, $A^5$ and $A^6$ independently are 1,4-cyclohexylene, 1,4-cyclohexenylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyridine-2,5-diyl, 3-fluoropyridine-2,5-diyl, pyrimidine-2,5-diyl, pyridadine-2,5-diyl, decahydronaphthalene-2,6-diyl, 1,2,3,4-tetrahydronaphthalene-2,6-diyl or naphthalene-2,6-diyl; $Z^{11}$, $Z^{12}$, $Z^{13}$, $Z^{14}$, $Z^{15}$ and $Z^{16}$ independently are a single bond, —(CH$_2$)$_2$—, —COO—, —OCO—, —CH$_2$O—, —OCH$_2$—, —CF$_2$O—, —OCF$_2$—, —CH=CH—, —CF=CF—, —C≡C—, —CH$_2$CO—, —COCH$_2$—, —CH$_2$SiH$_2$—, —SiH$_2$CH$_2$—, —(CH$_2$)$_2$—, —(CH$_2$)$_2$COO—, —OCO(CH$_2$)$_2$—, —(CH$_2$)$_2$CF$_2$O—, —OCF$_2$(CH$_2$)$_2$—, —CH=CH—CH$_2$O— or —OCH$_2$—CH=CH—; and $Y^1$ and $Y^2$ independently are hydrogen, halogen, —CF$_3$, —CHF$_2$, —CH$_2$F, —OCF$_3$, —OCHF$_2$, or —OCH$_2$F, and $Y^1$ and $Y^2$ are not hydrogen at the same time; with the proviso that at least one of $Z^{11}$, $Z^{12}$, $Z^{13}$, $Z^{14}$, $Z^{15}$ and $Z^{16}$ is a group (q2) or (q3), in the case that $Y^1$ is fluorine, chlorine, —CF$_3$, —CHF$_2$, —OCF$_3$ or —OCHF$_2$ and $Y^2$ is fluorine, chlorine, —CF$_3$, —CHF$_2$, —OCF$_3$ or —OCHF$_2$ at the same time,

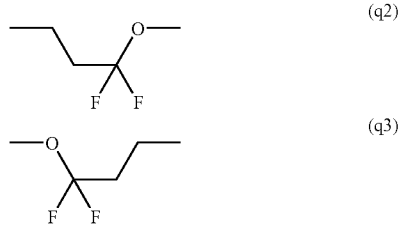

7. The compound described in claim 6 wherein, in formulas (1-1) to (1-9), Ra and Rb independently are alkyl, alkoxy, alkoxyalkyl, alkenyl, —OCF$_3$, —OCHF$_2$, —CF$_3$, —CHF$_2$, —CH$_2$F, —OCF$_2$CHF$_2$, —OCF$_2$CHFCF$_3$, fluorine, chlorine, or —CN; rings $A^1$, $A^2$, $A^3$, $A^4$, $A^5$ and $A^6$ independently are 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl or pyrimidine-2,5-diyl; $Z^{11}$, $Z^{12}$, $Z^{13}$, $Z^{14}$, $Z^{15}$ and $Z^{16}$ independently are a single bond, —(CH$_2$)$_2$—, —COO—, —OCO—, —CH$_2$O—, —OCH$_2$—, —CF$_2$O—, —OCF$_2$—, —CH=CH— or —C≡C—; and $Y^1$ and $Y^2$ independently are hydrogen or florine; with the proviso that at least one of $Z^{11}$, $Z^{12}$, $Z^{13}$, $Z^{14}$, $Z^{15}$ and $Z^{16}$ is the group (q2) or (q3), in the case that $Y^1$ is fluorine and $Y^2$ is fluorine at the same time.

8. The compound described in claim 6 wherein, in formulas (1-1) to (1-9), Ra and Rb independently are alkyl, alkoxy, alkoxyalkyl, or alkenyl.

9. The compound described in claim 6 wherein, in formulas (1-1) to (1-9), one of Ra and Rb is alkyl, alkoxy, alkoxyalkyl or alkenyl, and the other is —OCF$_3$, —OCHF$_2$, —CF$_3$, —CHF$_2$, —CH$_2$F, —OCF$_2$CHF$_2$, or —OCF$_2$CHFCF$_3$.

10. The compound described in claim 6 wherein, in formulas (1-1) to (1-9), one of Ra and Rb is alkyl, alkoxy, alkoxyalkyl, or alkenyl, and the other is fluorine or chlorine.

11. The compound described in claim 6 wherein, in formulas (1-1) to (1-9), one of Ra and Rb are alkyl, alkoxy, alkoxyalkyl, or alkenyl, and the other is —CN.

12. The compound described in claim 6 wherein, in formulas (1-1) to (1-9), rings $A^1$, $A^2$, $A^3$, $A^4$, $A^5$ and $A^6$ independently are 1,4-cyclohexylene, 1,4-phenylene, 2-fluoro-1,4-phenylene, 2,3-difluoro-1,4-phenylene, 2,5-difluoro-1,4-phenylene or 2,6-difluoro-1,4-phenylene.

13. The compound described in claim 6 wherein, in formulas (1-1) to (1-9), rings $A^1$, $A^2$, $A^3$, $A^4$, $A^5$ and $A^6$ independently are 1,4-cyclohexylene, 1,4-phenylene, 2-fluoro-1,4-phenylene, or 2,3-difluoro-1,4-phenylene.

14. The compound described in claim 6 wherein, in formulas (1-1) to (1-9), rings $A^1$, $A^2$, $A^3$, $A^4$, $A^5$ and $A^6$ independently are 1,4-cyclohexylene, 1,4-phenylene, 2-fluoro-1,4-phenylene, 2,5-difluoro-1,4-phenylene, or 2,6-difluoro-1,4-phenylene.

15. The compound described in claim 6 wherein, in formulas (1-1) to (1-9), $Z^{11}$, $Z^{12}$, $Z^{13}$, $Z^{14}$, $Z^{15}$ and $Z^{16}$ independently are a single bond or —(CH$_2$)$_2$—.

16. The compound described in claim 6 wherein, in formulas (1-1) to (1-9), one of $Y^1$ and $Y^2$ is hydrogen, and the other is fluorine, —CF$_3$, —CHF$_2$, —CH$_2$F, —OCF$_3$, —OCHF$_2$, or —OCH$_2$F.

17. The compound described in claim 6 wherein, in formulas (1-1) to (1-9), one of $Y^1$ and $Y^2$ is hydrogen, and the other is fluorine.

18. The compound described in claim 6 wherein, in formulas (1-1) to (1-9), $Y^1$ and $Y^2$ independently are halogen, —CF$_3$, —CHF$_2$, —CH$_2$F, —OCF$_3$, —OCHF$_2$, or —OCH$_2$F.

19. The compound described in claim 6 wherein, in formulas (1-1) to (1-9), $Y^1$ and $Y^2$ are fluorine.

20. The compound described in claim 19 wherein, in formulas (1-1) to (1-5), Ra and Rb independently are alkyl or alkenyl.

21. The compound described in claim 20 wherein, in formulas (1-1) to (1-5), rings $A^2$, $A^3$, $A^4$, and $A^5$ independently are 1,4-cyclohexylene or 1,4-phenylene.

22. The compound described in claim 21 wherein, in formulas (1-1) to (1-5), $Z^{12}$, $Z^{13}$, $Z^{14}$ and $Z^{15}$ independently are a single bond or —$(CH_2)_2$—.

23. A liquid crystal composition containing at least one compound described in claim 1.

24. The liquid crystal composition described in claim 23 further including at least one compound selected from the group consisting of compounds represented by formulas (2), (3) and (4):

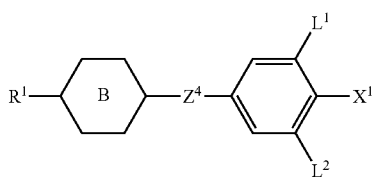

(2)

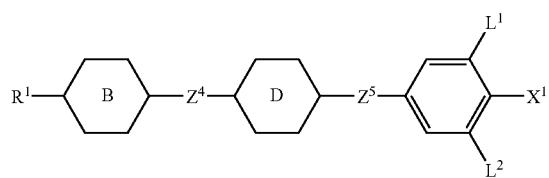

(3)

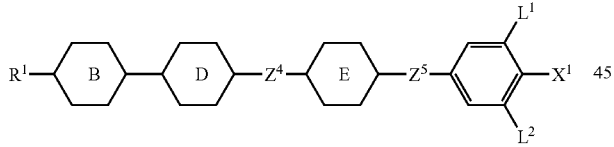

(4)

wherein $R^1$ is alkyl having 1 to 10 carbons, and any —$CH_2$— in the alkyl may be replaced by —O— or —CH=CH—, and any hydrogen may be replaced by fluorine; $X^1$ is fluorine, chlorine, —$OCF_3$, —$OCHF_2$, —$CF_3$, —$CHF_2$, —$CH_2F$, —$OCF_2CHF_2$ or —$OCF_2CHFCF_3$; rings B and D independently are 1,4-cyclohexylene, 1,3-dioxane-2,5-diyl or 1,4-phenylene in which any hydrogen may be replaced by fluorine, ring B is 1,4-cyclohexylene or 1,4-phenylene in which any hydrogen may be replaced by fluorine; $Z^4$ and $Z^5$ independently are —$(CH_2)_2$—, —$(CH_2)_4$—, —COO—, —$CF_2O$—, —$OCF_2$—, —CH=CH— or a single bond; and $L^1$ and $L^2$ independently are hydrogen or fluorine.

25. The liquid crystal composition described in claim 23 further including at least one compound selected from the group consisting of compounds represented by formulas (5) and (6):

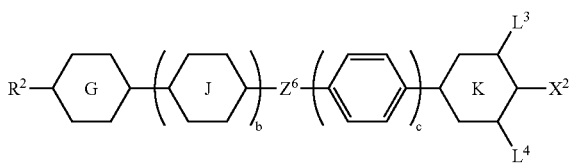

(5)

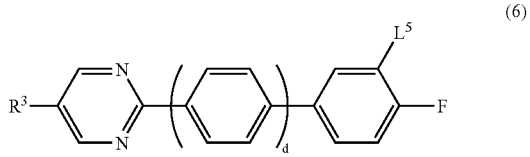

(6)

wherein $R^2$ and $R^3$ independently are alkyl having 1 to 10 carbons and, any —$CH_2$— in the alkyl may be replaced by —O— or —CH=CH—, and any hydrogen may be replaced by fluorine; $X^2$ is —CN or —C≡C—CN; ring G is 1,4-cyclohexylene, 1,4-phenylene, 1,3-dioxane-2,5-diyl or pyrimidine-2,5-diyl; ring J is 1,4-cyclohexylene, pyrimidine-2,5-diyl or 1,4phenylene in which any hydrogen may be replaced by fluorine; ring K is 1,4-cyclohexylene or 1,4-phenylene; $Z^6$ is —$(CH_2)_2$—, —COO—, —$CF_2O$—, —$OCF_2$—, or a single bond; $L^3$, $L^4$ and $L^5$ independently are hydrogen or fluorine; and b, c and d independently are 0 or 1.

26. The liquid crystal composition described in claim 23 further including at least one compound selected from the group consisting of compounds represented by formulas (7), (8), (9), (10) and (11):

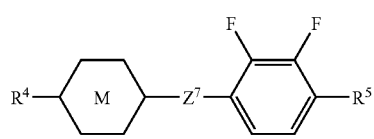

(7)

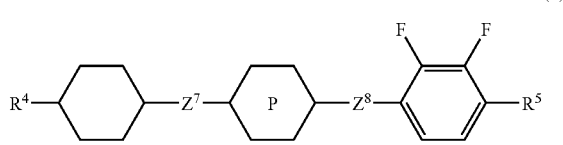

(8)

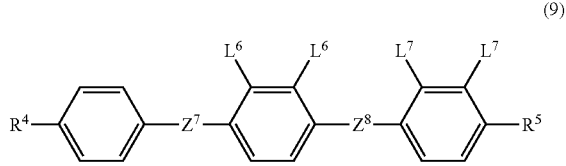

(9)

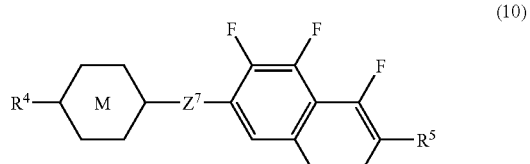

(10)

(11)

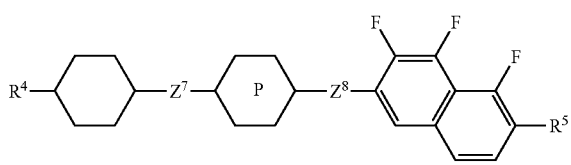

wherein $R^4$ is alkyl having 1 to 10 carbons, any —$CH_2$— in the alkyl may be replaced by —O— or —CH=CH—, and any hydrogen may be replaced by fluorine; $R^5$ is fluorine or alkyl having 1 to 10 carbons, any —$CH_2$— in the alkyl may be replaced by —O— or —CH=CH—, and any hydrogen may be replaced by fluorine; rings M and P independently are 1,4-cyclohexylene, 1,4-phenylene or decahydro-2,6-naphthylene; $Z^7$ and $Z^8$ is —$(CH_2)_2$—, —COO— or a single bond; and $L^6$ and $L^7$ independently are hydrogen or fluorine, wherein at least one of $L^6$ and $L^7$ is fluorine.

27. The liquid crystal composition described in claim 23 further comprising at least one compound selected from the group consisting of compounds represented by formulas (12), (13) and (14):

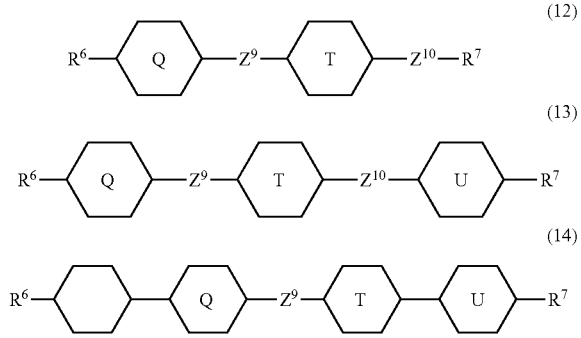

(12)

(13)

(14)

wherein $R^6$ and $R^7$ independently are alkyl having 1 to 10 carbons and, any —$CH_2$— in the alkyl may be replaced by —O— or —CH=CH—, and any hydrogen may be replaced by fluorine; rings Q, T and U independently are 1,4-cyclohexylene, pyrimidine-2,5-diyl or 1,4-phenylene in which any hydrogen may be replaced by fluorine; and $Z^9$ and $Z^{10}$ independently are —C≡C—, —COO—, —$(CH_2)_2$—, —CH=CH— or a single bond.

28. The liquid crystal composition described in claim 24 further including at least one compound selected from the group consisting of compounds represented by formulas (5) and (6):

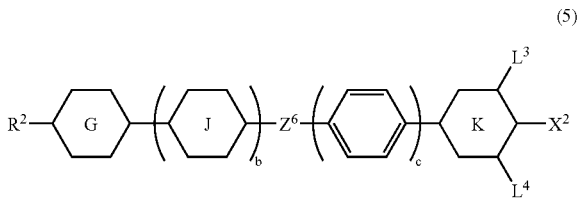

(5)

(6)

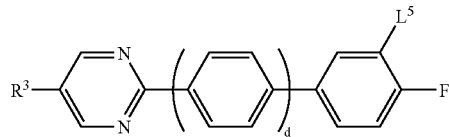

wherein $R^2$ and $R^3$ independently are alkyl having 1 to 10 carbons and, any —$CH_2$— in the alkyl may be replaced by —O— or —CH=CH—, and any hydrogen may be replaced by fluorine; $X^2$ is —CN or —C≡C—CN; ring G is 1,4-cyclohexylene, 1,4-phenylene, 1,3-dioxane-2,5-diyl or pyrimidine-2,5-diyl; ring J is 1,4-cyclohexylene, pyrimidine-2,5-diyl or 1,4-phenylene in which any hydrogen may be replaced by fluorine; ring K is 1,4-cyclohexylene or 1,4-phenylene; $Z^6$ is —$(CH_2)_2$—, —COO—, —$CF_2O$—, —$OCF_2$—, or a single bond; $L^3$, $L^4$ and $L^5$ independently are hydrogen or fluorine; and b, c and d independently are 0 or 1.

29. The liquid crystal composition described in claim 24 further including at least one compound selected from the group consisting of compounds represented by formulas (12), (13) and (14):

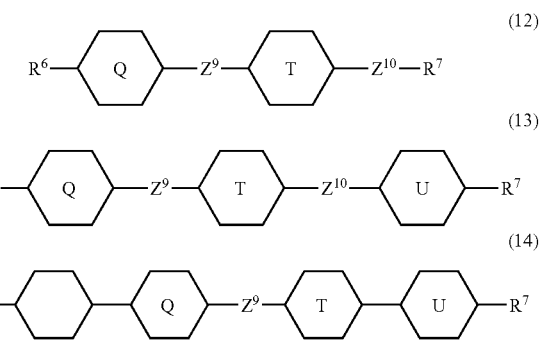

(12)

(13)

(14)

wherein $R^6$ and $R^7$ independently are alkyl having 1 to 10 carbons and, any —$CH_2$— in the alkyl may be replaced by —O— or —CH=CH—, and any hydrogen may be replaced by fluorine; rings Q, T and U independently are 1,4-cyclohexylene, pyrimidine-2,5-diyl or 1,4-phenylene in which any hydrogen may be replaced by fluorine; and $Z^9$ and $Z^{10}$ independently are —C≡C—, —COO—, —$(CH_2)_2$—, —CH=CH— or a single bond.

30. The liquid crystal composition described in claim 25 further including at least one compound selected from the group consisting of compounds represented by formulas (12), (13) and (14):

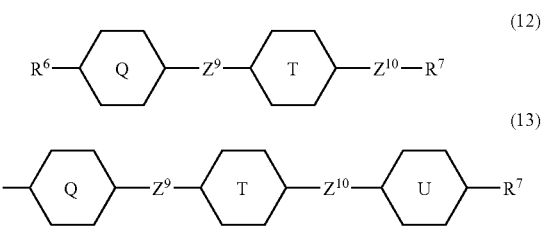

(12)

(13)

-continued

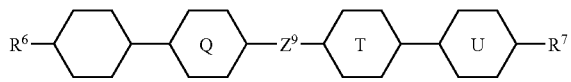
(14)

wherein $R^6$ and $R^7$ independently are alkyl having 1 to 10 carbons and, any —CH$_2$— in the alkyl may be replaced by —O— or —CH=CH—, and any hydrogen may be replaced by fluorine; rings Q, T and U independently are 1,4-cyclohexylene, pyrimidine-2,5-diyl or 1,4-phenylene in which any hydrogen may be replaced by fluorine; and $Z^9$ and $Z^{10}$ independently are —C≡C—, —COO—, —(CH$_2$)$_2$—, —CH=CH— or a single bond.

31. The liquid crystal composition described in claim 26 further including at least one compound selected from the group consisting of compounds represented by formulas (12), (13) and (14):

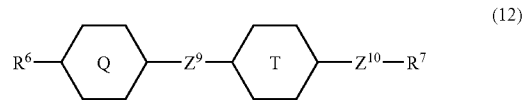
(12)

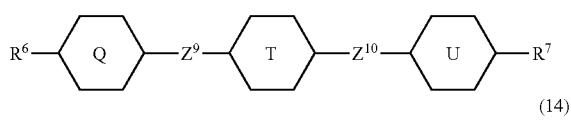
(13)

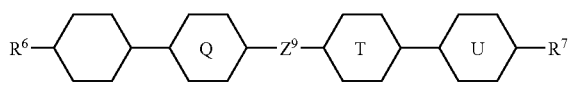
(14)

wherein $R^6$ and $R^7$ independently are alkyl having 1 to 10 carbons and, any —CH$_2$— in the alkyl may be replaced by —O— or —CH=CH—, and any hydrogen may be replaced by fluorine; rings Q, T and U independently are 1,4-cyclohexylene, pyrimidine-2,5-diyl or 1,4-phenylene in which any hydrogen may be replaced by fluorine; and $Z^9$ and $Z^{10}$ independently are —C≡C—, —COO—, —(CH$_2$)$_2$—, —CH=CH— or a single bond.

32. The liquid crystal composition described in claim 23 further including at least one optically active compound.

33. A liquid crystal display element including the liquid crystal composition described in claim 23.

34. A compound represented by formula (41):

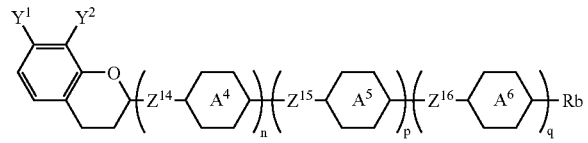
(41)

wherein Rb is hydrogen, alkyl having 1 to 20 carbons, halogen, —CN, —C≡C—CN, —NCO, or —NCS, any —CH$_2$— in the alkyl may be replaced by —O—, —S—, —CO—, or —SiH$_2$—, any —(CH$_2$)$_2$— may be replaced by —CH=CH— or —C≡C—, and any hydrogen may be replaced by halogen; rings $A^{4,\,45}$ and $A^6$ independently are 1,4-cyclohexylene, 1,4-phenylene, decahydronaphthalene-2,6-diyl, 1,2,3,4-tetrahydronaphthalene-2,6-diyl, or naphthalene-2,6-diyl, any —CH$_2$— in these rings may be replaced by —O—, —S—, —CO— or —SiH$_2$—, any —(CH$_2$)$_2$— may be replaced by —CH=CH—, any —CH= in 1,4-phenylene may be replaced by —N=, and any hydrogen in these rings may be replaced by halogen, —CF$_3$, —CHF$_2$, —CH$_2$F, —OCF$_3$, —OCRF$_2$, or —OCH$_2$F; $Z^{14}$, $Z^{15}$ and $Z^{16}$ independently are a single bond or alkylene having 1 to 4 carbons, any —CH$_2$— in the alkylene may be replaced by —O—, —S—, —CO—, or —SiH$_2$—, any —(CH$_2$)$_2$— may be replaced by —CH=CH— or —C≡C—, and any hydrogen may be replaced by halogen; $Y^1$ and $Y^2$ independently are hydrogen, halogen, —CN, —CF$_3$, —CHF$_2$, —CH$_2$F, —OCF$_3$, —OCHF$_2$, or —OCH$_2$F, and $Y^1$ and $Y^2$ are not hydrogen at the same time; n, p and q independently are 0 or 1, and the sum of n, p and q is 1, 2 or 3; with the proviso that at least one of $Z^{14}$, $Z^{15}$ and $Z^{16}$ is a group (q1), (q2) or (q3), in the case that $Y^1$ is fluorine, chlorine, —CF$_3$, —CHF$_2$, —OCF$_3$ or —OCRF$_2$ and $Y^2$ is fluorine, chlorine, —CF$_3$, —CRF$_2$, —OCF$_3$ or —OCHF$_2$ at the same time,

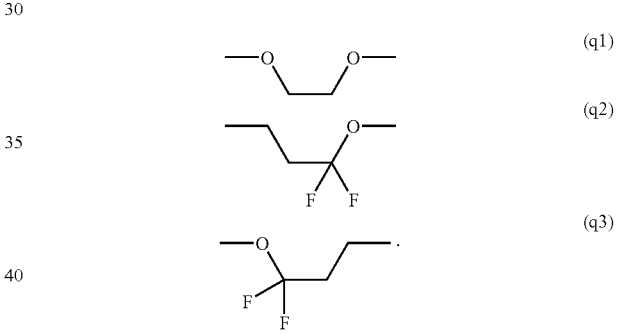

35. The compound described in claim 34 wherein, in formula (41), one of $Y^1$ and $Y^2$ is hydrogen, and the other is halogen, —CN, —CF$_3$, —CHF$_2$, —CH$_2$F, —OCF$_3$, —OCHF$_2$, or —OCH$_2$F.

36. The compound described in claim 34 wherein, in formula (41), each of $Y^1$ and $Y^2$ independently are halogen, —CN, —CF$_3$, —CHF$_2$, —CH$_2$F, —OCF$_3$, —OCHF$_2$, or —OCH$_2$F.

37. The compound described in claim 34 wherein, in formula (41), one of $Y^1$ and $Y^2$ is hydrogen, and the other is fluorine.

38. The compound described in claim 34 wherein, in formula (41), each of $Y^1$ and $Y^2$ is fluorine.

* * * * *